United States Patent
Ferrucci et al.

(10) Patent No.: US 10,621,285 B2
(45) Date of Patent: *Apr. 14, 2020

(54) ARCHITECTURE AND PROCESSES FOR COMPUTER LEARNING AND UNDERSTANDING

(71) Applicant: Elemental Cognition LLC, Westport, CT (US)

(72) Inventors: David Ferrucci, Westport, CT (US); Mike Barborak, Westport, CT (US); David Buchanan, Westport, CT (US); Greg Burnham, Westport, CT (US); Jennifer Chu-Carroll, Westport, CT (US); Aditya Kalyanpur, Westport, CT (US); Adam Lally, Westport, CT (US); Stefano Pacifico, Westport, CT (US); Chang Wang, Westport, CT (US)

(73) Assignee: ELEMENTAL COGNITION LLC, Wilton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/464,076

(22) Filed: Mar. 20, 2017

(65) Prior Publication Data

US 2020/0034423 A1 Jan. 30, 2020

Related U.S. Application Data

(63) Continuation of application No. 15/192,796, filed on Jun. 24, 2016.

(51) Int. Cl.
*G06F 17/27* (2006.01)
*G06N 20/00* (2019.01)

(52) U.S. Cl.
CPC ......... *G06F 17/279* (2013.01); *G06F 17/271* (2013.01); *G06N 20/00* (2019.01)

(58) Field of Classification Search
CPC ........ G10L 15/22; G10L 15/265; H03M 7/30; G06F 17/30864; G06F 17/30592;
(Continued)

(56) References Cited

U.S. PATENT DOCUMENTS 5,657,256 A 8/1997 Swanson et al.
5,748,841 A 5/1998 Morin et al.
(Continued)

OTHER PUBLICATIONS

Fan, James, et al. "Automatic knowledge extraction from documents." IBM Journal of Research and Development 56.3.4 (2012): 5-1. (Year: 2012).*

(Continued)

*Primary Examiner* — Jialong He
(74) *Attorney, Agent, or Firm* — Lee & Hayes, P.C.

(57) ABSTRACT

An architecture and processes enable computer learning and developing an understanding of arbitrary natural language text through collaboration with humans in the context of joint problem solving. The architecture ingests the text and then syntactically and semantically processes the text to infer an initial understanding of the text. The initial understanding is captured in a story model of semantic and frame structures. The story model is then tested through computer generated questions that are posed to humans through interactive dialog sessions. The knowledge gleaned from the humans is used to update the story model as well as the computing system's current world model of understanding. The process is repeated for multiple stories over time, enabling the computing system to grow in knowledge and thereby understand stories of increasingly higher reading comprehension levels.

21 Claims, 30 Drawing Sheets

(58) Field of Classification Search
CPC ............ G06F 17/2785; G06F 17/2735; G06F 17/30734; G06F 17/30286
See application file for complete search history.

(56) References Cited

U.S. PATENT DOCUMENTS

| | | | |
|---|---|---|---|
| 5,884,302 | A | 3/1999 | Ho |
| 5,960,384 | A | 9/1999 | Brash |
| 6,604,094 | B1 | 8/2003 | Harris |
| 6,618,715 | B1 | 9/2003 | Johnson et al. |
| 6,675,159 | B1 | 1/2004 | Lin et al. |
| 7,065,483 | B2 | 6/2006 | Decary et al. |
| 7,620,550 | B1 | 11/2009 | Gupta et al. |
| 8,060,534 | B1 | 11/2011 | Ansari et al. |
| 8,204,751 | B1 | 6/2012 | Di Fabbrizio et al. |
| 8,321,220 | B1 | 11/2012 | Chotimongkol et al. |
| 8,521,766 | B1 | 8/2013 | Hoarty |
| 8,533,169 | B1 | 9/2013 | Bailey et al. |
| 8,700,620 | B1 | 4/2014 | Lieberman |
| 8,764,455 | B1* | 7/2014 | Morrison ............. G09B 17/003 434/178 |
| 8,838,434 | B1 | 9/2014 | Liu |
| 9,235,806 | B2 | 1/2016 | Sweeney et al. |
| 9,275,341 | B2 | 3/2016 | Cruse et al. |
| 9,336,204 | B1 | 5/2016 | Amundsen et al. |
| 9,519,871 | B1 | 12/2016 | Cardonha et al. |
| 9,575,963 | B2 | 2/2017 | Pasupalak et al. |
| 9,659,560 | B2 | 5/2017 | Cao et al. |
| 9,737,255 | B2 | 8/2017 | Chen et al. |
| 9,858,927 | B2 | 1/2018 | Williams et al. |
| 2002/0042707 | A1 | 4/2002 | Zhao et al. |
| 2003/0050927 | A1 | 3/2003 | Hussam |
| 2003/0215067 | A1 | 11/2003 | Ordille et al. |
| 2004/0034633 | A1 | 2/2004 | Rickard |
| 2005/0005266 | A1 | 1/2005 | Datig |
| 2005/0015363 | A1 | 1/2005 | Dessloch et al. |
| 2005/0165607 | A1* | 7/2005 | Di Fabbrizio ...... G06F 17/2785 704/256 |
| 2005/0243986 | A1* | 11/2005 | Kankar ................. H04M 3/493 379/201.01 |
| 2005/0256700 | A1* | 11/2005 | Moldovan ............. G06F 17/271 704/9 |
| 2006/0004561 | A1 | 1/2006 | Zhang et al. |
| 2006/0036430 | A1 | 2/2006 | Hu |
| 2006/0053000 | A1 | 3/2006 | Moldovan et al. |
| 2007/0018953 | A1 | 1/2007 | Kipersztok |
| 2007/0050191 | A1 | 3/2007 | Weider et al. |
| 2007/0067361 | A1 | 3/2007 | Bailey et al. |
| 2007/0106499 | A1 | 5/2007 | Dahlgren et al. |
| 2007/0118519 | A1 | 5/2007 | Yamasawa et al. |
| 2007/0203693 | A1 | 8/2007 | Estes |
| 2008/0154581 | A1 | 6/2008 | Lavi et al. |
| 2008/0168421 | A1 | 7/2008 | Meijer et al. |
| 2008/0195601 | A1 | 8/2008 | Ntoulas et al. |
| 2008/0201132 | A1* | 8/2008 | Brown ................ G06F 16/3329 704/9 |
| 2008/0275694 | A1 | 11/2008 | Varone |
| 2009/0012842 | A1 | 1/2009 | Srinivasan et al. |
| 2009/0016599 | A1 | 1/2009 | Eaton et al. |
| 2009/0089047 | A1 | 4/2009 | Pell et al. |
| 2009/0094019 | A1 | 4/2009 | Snow et al. |
| 2009/0162824 | A1 | 6/2009 | Heck |
| 2010/0030553 | A1 | 2/2010 | Ball |
| 2010/0228693 | A1 | 9/2010 | Dawson et al. |
| 2010/0299139 | A1 | 11/2010 | Ferrucci et al. |
| 2011/0112921 | A1 | 5/2011 | Kennewick et al. |
| 2011/0119047 | A1 | 5/2011 | Ylonen |
| 2011/0123967 | A1 | 5/2011 | Perronnin et al. |
| 2011/0125734 | A1 | 5/2011 | Duboue et al. |
| 2011/0161073 | A1 | 6/2011 | Lesher et al. |
| 2011/0307435 | A1 | 12/2011 | Overell et al. |
| 2012/0011141 | A1 | 1/2012 | Park et al. |
| 2012/0016878 | A1 | 1/2012 | Peng |
| 2012/0059779 | A1 | 3/2012 | Syed et al. |
| 2012/0131015 | A1 | 5/2012 | Al Badrashiny et al. |
| 2012/0166372 | A1 | 6/2012 | Ilyas et al. |
| 2012/0185415 | A1 | 7/2012 | Chenthamarakshan et al. |
| 2012/0209606 | A1 | 8/2012 | Gorodetsky et al. |
| 2013/0017523 | A1 | 1/2013 | Barborak et al. |
| 2013/0035931 | A1 | 2/2013 | Ferrucci et al. |
| 2013/0246328 | A1 | 9/2013 | Sweeney et al. |
| 2013/0275138 | A1 | 10/2013 | Gruber et al. |
| 2014/0024008 | A1 | 1/2014 | Sathy |
| 2014/0058986 | A1* | 2/2014 | Boss ...................... G06Q 50/00 706/12 |
| 2014/0059417 | A1 | 2/2014 | Bernelas et al. |
| 2014/0122622 | A1 | 5/2014 | Castera et al. |
| 2014/0134588 | A1 | 5/2014 | Capone et al. |
| 2014/0257794 | A1 | 9/2014 | Gandrabur et al. |
| 2014/0278363 | A1 | 9/2014 | Allen et al. |
| 2014/0280072 | A1 | 9/2014 | Coleman |
| 2014/0280087 | A1 | 9/2014 | Isensee et al. |
| 2014/0280314 | A1 | 9/2014 | Coleman et al. |
| 2014/0295384 | A1 | 10/2014 | Nielson et al. |
| 2014/0316764 | A1 | 10/2014 | Ayan et al. |
| 2014/0337257 | A1 | 11/2014 | Chatterjee et al. |
| 2015/0006158 | A1 | 1/2015 | Allen et al. |
| 2015/0032443 | A1 | 1/2015 | Karov et al. |
| 2015/0032444 | A1 | 1/2015 | Hamada |
| 2015/0039295 | A1 | 2/2015 | Soschen |
| 2015/0052126 | A1 | 2/2015 | Bordino et al. |
| 2015/0088888 | A1 | 3/2015 | Brennan et al. |
| 2015/0140525 | A1 | 5/2015 | Metuki |
| 2015/0142704 | A1 | 5/2015 | London |
| 2015/0149177 | A1 | 5/2015 | Kalns et al. |
| 2015/0154177 | A1 | 6/2015 | Allen et al. |
| 2015/0161106 | A1 | 6/2015 | Barbetta et al. |
| 2015/0178270 | A1 | 6/2015 | Zuev et al. |
| 2015/0193428 | A1 | 7/2015 | Lim et al. |
| 2015/0243179 | A1 | 8/2015 | Zaslavsky et al. |
| 2015/0248398 | A1 | 9/2015 | Weiss et al. |
| 2015/0261849 | A1 | 9/2015 | Chu-Carroll et al. |
| 2015/0312200 | A1 | 10/2015 | Brav et al. |
| 2015/0331850 | A1 | 11/2015 | Ramish |
| 2015/0340033 | A1 | 11/2015 | Di Fabbrizio et al. |
| 2015/0356073 | A1 | 12/2015 | Vion-Drury |
| 2015/0379072 | A1 | 12/2015 | Dirac et al. |
| 2015/0379429 | A1 | 12/2015 | Lee et al. |
| 2016/0004766 | A1 | 1/2016 | Danielyan et al. |
| 2016/0042735 | A1 | 2/2016 | Vibbert et al. |
| 2016/0070693 | A1 | 3/2016 | Carrier et al. |
| 2016/0085743 | A1 | 3/2016 | Haley |
| 2016/0099010 | A1 | 4/2016 | Sainath et al. |
| 2016/0117314 | A1 | 4/2016 | Kantor et al. |
| 2016/0125013 | A1 | 5/2016 | Barborak et al. |
| 2016/0147737 | A1 | 5/2016 | Ryu et al. |
| 2016/0162806 | A1 | 6/2016 | Beigman Klebanov et al. |
| 2016/0171373 | A1* | 6/2016 | Allen .................... G06F 16/907 706/50 |
| 2016/0196497 | A1* | 7/2016 | Allen ................ G06F 16/24522 706/11 |
| 2016/0217701 | A1 | 7/2016 | Brown et al. |
| 2016/0224537 | A1 | 8/2016 | Starostin et al. |
| 2016/0259779 | A1 | 9/2016 | Labsk et al. |
| 2016/0259863 | A1 | 9/2016 | Allen et al. |
| 2016/0275073 | A1 | 9/2016 | Poon et al. |
| 2016/0293045 | A1 | 10/2016 | Wang et al. |
| 2016/0299785 | A1 | 10/2016 | Anghel et al. |
| 2016/0306791 | A1* | 10/2016 | Allen ................ G06F 17/30654 |
| 2016/0350280 | A1 | 12/2016 | Lavallee et al. |
| 2016/0357854 | A1 | 12/2016 | Hashimoto et al. |
| 2016/0358072 | A1* | 12/2016 | Hermann ............. G06N 3/0427 |
| 2016/0358126 | A1 | 12/2016 | Bostick et al. |
| 2016/0358489 | A1 | 12/2016 | Canter et al. |
| 2016/0364377 | A1 | 12/2016 | Krishnamurthy |
| 2016/0364608 | A1 | 12/2016 | Sengupta et al. |
| 2017/0004129 | A1 | 1/2017 | Shalaby et al. |
| 2017/0018268 | A1 | 1/2017 | Quast |
| 2017/0031893 | A1 | 2/2017 | Ball |
| 2017/0032689 | A1 | 2/2017 | Beason et al. |
| 2017/0032791 | A1 | 2/2017 | Elson et al. |
| 2017/0039482 | A1 | 2/2017 | Bishop et al. |
| 2017/0039873 | A1 | 2/2017 | Watanabe et al. |
| 2017/0046625 | A1 | 2/2017 | Takaai |

(56) References Cited

U.S. PATENT DOCUMENTS

| | | | |
|---|---|---|---|
| 2017/0060848 | A1 | 3/2017 | Liu et al. |
| 2017/0060994 | A1 | 3/2017 | Byron et al. |
| 2017/0061330 | A1 | 3/2017 | Kurata |
| 2017/0068659 | A1 | 3/2017 | Rothwell et al. |
| 2017/0075877 | A1 | 3/2017 | Lepeltier |
| 2017/0083792 | A1 | 3/2017 | Rodríguez-Serrano et al. |
| 2017/0091331 | A1 | 3/2017 | Tober et al. |
| 2017/0091664 | A1 | 3/2017 | Sanchez et al. |
| 2017/0092143 | A1 | 3/2017 | Brennan et al. |
| 2017/0124174 | A1 | 5/2017 | Starr et al. |
| 2017/0132187 | A1 | 5/2017 | Contreras et al. |
| 2017/0132371 | A1 | 5/2017 | Amarasingham et al. |
| 2017/0147635 | A1 | 5/2017 | McAteer et al. |
| 2017/0147686 | A1 | 5/2017 | Chainani et al. |
| 2017/0147924 | A1 | 5/2017 | Ajmera et al. |
| 2017/0148073 | A1 | 5/2017 | Nomula et al. |
| 2017/0154015 | A1 | 6/2017 | O'Keeffe et al. |
| 2017/0161255 | A1 | 6/2017 | Starostin et al. |
| 2017/0169009 | A1 | 6/2017 | Lim et al. |
| 2017/0169334 | A1 | 6/2017 | Sweeney et al. |
| 2017/0169717 | A1 | 6/2017 | Allen et al. |
| 2017/0177715 | A1 | 6/2017 | Chang et al. |
| 2017/0178626 | A1 | 6/2017 | Gruber et al. |
| 2017/0180499 | A1 | 6/2017 | Gelfenbeyn et al. |
| 2017/0185919 | A1 | 6/2017 | Chawla et al. |
| 2017/0193088 | A1 | 7/2017 | Boguraev et al. |
| 2017/0193093 | A1 | 7/2017 | Byron et al. |
| 2017/0193387 | A1* | 7/2017 | Lavallee ................. G06F 17/28 |
| 2017/0200093 | A1 | 7/2017 | Motahari Nezhad |
| 2017/0286399 | A1 | 10/2017 | Popescu et al. |
| 2017/0372630 | A1 | 12/2017 | Janes et al. |
| 2018/0011903 | A1 | 1/2018 | Abolhassani et al. |
| 2018/0018322 | A1 | 1/2018 | Mukherjee et al. |
| 2018/0018582 | A1 | 1/2018 | Unsal et al. |

OTHER PUBLICATIONS

Wang, Chang, et al. "Relation extraction and scoring in DeepQA." IBM Journal of Research and Development 56.3.4 (2012): 9-1. (Year: 2012).*

Hermann, et. al., "Teaching Machines to Read and Comprehend" University of Oxford, Nov. 19, 2015, 14 pages.

Office action for U.S. Appl. No. 15/192,796, dated Aug. 15, 2017, Inventor Mike Barborak, Architecture and Processes for Computer Learning and Understanding, 73 pages.

Office Action for U.S. Appl. No. 15/464,042, dated Aug. 17, 2017, Barborak, "Architecture and Processes for Computer Learning and Understanding", 65 pages.

Office Action for U.S. Appl. No. 15/464,137, dated Aug. 21, 2017, Barborak, "Architecture and Processes for Computer Learning and Understanding", 57 Pages.

Officec Action for U.S. Appl. No. 15/192,796, dated Aug. 23, 2017, Barborak, "Architecture and Processes for Computer Learning and Understanding", 84 pages.

Office Action for U.S. Appl. No. 15/464,001, dated Aug. 25, 2017, Barborak, "Architecture and Processes for Computer Learning and Understanding", 43 pages.

Office action for U.S. Appl. No. 15/192,796, dated Aug. 9, 2017, Inventor Mike Barborak, Architecture and Processes for Computer Learning and Understanding, 76 pages.

Office Action for U.S. Appl. No. 15/463,884, dated Aug. 17, 2017, Barborak, "Architecture and Processes for Computer Learning and Understanding" 74 pages.

The PCT Search Report and Written Opinion dated Aug. 28, 2017 for PCT application No. PCT/US2017/034323, 18 pages.

Office action for U.S. Appl. No. 15/463,731, dated Feb. 14, 2018, Inventor Mike Barborak, Architecture and Processes for Computer Learning and Understanding, 80 pages.

Office action for U.S. Appl. No. 15/192,796, dated Feb. 14, 2018, Inventor Mike Barborak, Architecture and Processes for Computer Learning and Understanding, 83 pages.

Office Action for U.S. Appl. No. 15/464,042, dated Feb. 22, 2018, Barborak, "Architecture and Processes for Computer Learning and Understanding", 71 pages.

Officec Action for U.S. Appl. No. 15/463,936, dated Feb. 23, 2018, Barborak, "Architecture and Processes for Computer Learning and Understanding", 91 pages.

Office Action for U.S. Appl. No. 15/464,137, dated Feb. 23, 2018, Barborak, "Architecture and Processes for Computer Learning and Understanding", 63 Pages.

Office Action for U.S. Appl. No. 15/464,001, dated Feb. 27, 2018, Barborak, "Architecture and Processes for Computer Learning and Understanding", 49 pages.

Office Action for U.S. Appl. No. 15/464,111, dated Feb. 7, 2018, Mike Barborak"Architecture and Processes for Computer Learning and Understanding", 33 pages.

Office Action for U.S. Appl. No. 15/463,884, dated Feb. 27, 2018, Barborak, "Architecture and Processes for Computer Learning and Understanding" 77 pages.

Office Action for U.S. Appl. No. 15/192,796, dated Sep. 14, 2018, Mike Barborak, et al., "Architecture and Processes for Computer Learning and Understanding," 92 pages.

Office Action for U.S. Appl. No. 15/463,731, dated Sep. 17, 2018, Mike Barborak, et al., "Architecture and Processes for Computer Learning and Understanding," 87 pages.

Office Action for U.S. Appl. No. 15/463,936, dated Sep. 19, 2018, Mike Barborak, et al., "Architecture and Processes for Computer Learning and Understanding," 96 pages.

Office Action for U.S. Appl. No. 15/464,001, dated Sep. 19, 2018, Mike Barborak, et al., "Architecture and Processes for Computer Learning and Understanding," 52 pages.

Office Action for U.S. Appl. No. 15/464,042, dated Sep. 20, 2018, Mike Barborak, et al., "Architecture and Processes for Computer Learning and Understanding," 78 pages.

Office Action for U.S. Appl. No. 15/464,076, dated Sep. 21, 2018, Mike Barborak, et al., "Architecture and Processes for Computer Learning and Understanding," 89 pages.

Office Action for U.S. Appl. No. 15/464,137, dated Sep. 21, 2018, Mike Barborak, et al., "Architecture and Processes for Computer Learning and Understanding," 66 pages.

Office Action for U.S. Appl. No. 15/464,111, dated Sep. 27, 2018, Mike Barborak, et al., "Architecture and Processes for Computer Learning and Understanding," 45 pages.

Office Action for U.S. Appl. No. 15/463,884, dated Sep. 17, 2018, Mike Barborak, et al., "Architecture and Processes for Computer Learning and Understanding," 81 pages.

Ferrucci, et al., "Building Watson: An Overview of the DeepQA Project", AI Magazine, Fall 2010, pp. 59-79.

Ferrucci, "Introduction to This is Watson", IBM Journal of Research and Development, vol. 56, No. 3/4, Paper 1, May/Jul. 2012, 15 pages.

Ferrucci, et al., "Watson: Beyond Jeopardy", IBM Research Center, Elsevier, Artificial Intelligence, 2012, pp. 99-105.

Franz, et al., "TripleRank: Ranking Semantic Web Data by Tensor Decomposition", Springer-Verlag Berlin Heidelberg 2009, pp. 213-228.

Gondek, et al., "A Framework for Merging and Ranking of Answers in DeepQA", IBM Journal of Research and Development, vol. 56, No. 3/4, Paper 14, May/Jul. 2012, 12 pages.

Helbig, "Knowledge, Representation, and the Semantics of Natural Language", Springer, 2006, 652 pages.

Hirschman, et al., "Deep Read: A Reading Comprehension System", Association for Computational Linguistics, 1999, pp. 325-332.

Kalyanpur, et al., "Structured data and inference in DeepQA", IBM Journal of Research and Development, vol. 56, No. 3/4, Paper 10, May/Jul. 2012, 14 pages.

Lally, et al., "WatsonPaths: Scenario-based Question Answering and Inference over Unstructured Information", IBM Research Report, Sep. 2014, 20 pages.

Lassila, et al., "The Role of Frame-Based Representation on the Semantic Web", Linkoping Electronic Articles in Computer and Information Science, 2001, 10 pages.

Moschitti, et al., "Using Syntactic and Semantic Structural Kernels for Clasifying Definition Questions in Jeopardy!", Proceedings of

(56) References Cited

OTHER PUBLICATIONS the 2011 conference on Empirical Methods in Natural Language Processing, 2011, Association for Computational Linguistics, pp. 712-724.

Office Action for U.S. Appl. No. 15/463,731, dated Jun. 24, 2019, Barborak, "Architecture and Processes for Computer Learning and Understanding", 22 pages.

Office Action for U.S. Appl. No. 15/463,936, dated Jun. 28, 2019, Barborak, "Architecture and Processes for Computer Learning and Understanding", 22 pages.

Office Action for U.S. Appl. No. 15/463,884, dated Jun. 28, 2019, Barborak, "Architecture and Processes for Computer Learning and Understanding", 44 pages.

Office Action for U.S. Appl. No. 15/464,042, dated Jun. 28, 2019, Barborak, "Architecture and Processes for Computer Learning and Understanding", 22 pages.

Office Action for U.S. Appl. No. 15/464,137, dated Jun. 28, 2019, Barborak, "Architecture and Processes for Computer Learning and Understanding", 18 pages.

Office Action for U.S. Appl. No. 15/464,001, dated Jul. 2, 2019, Barborak, "Architecture and Processes for Computer Learning and Understanding", 10 pages.

Petersen, "Representation of Concepts as Frames", Baltic International Yearbook of Cognition, Logic, and Communication, 2007, pp. 151-170.

\* cited by examiner

ARCHITECTURE AND PROCESSES FOR COMPUTER LEARNING AND UNDERSTANDING

RELATED APPLICATIONS

This application is a continuation of and claims priority to U.S. patent application Ser. No. 15/192,796 filed Jun. 24, 2016, entitled "Architecture and Processes for Computer Learning and Understanding", which is incorporated by reference.

BACKGROUND

The world has long dreamed of robots, machines, and computers that are artificially intelligent. From Hal in Arthur C. Clarke's Space Odyssey series and Rosie the maid in the Jetsons cartoon series to the shipboard computer in the Star Trek series and R2D2 and C3PO in the Star Wars saga, we have been fascinated by machines that can inherently learn, understand, and think.

While this makes for very good entertainment and may hold aspirational goals for future generations of machines, the problems associated with artificial intelligence and building intelligent machines are very complex. For instance, no system exists today that can satisfactorily engage in an open dialog with humans over arbitrary text, much less a system that can independently "learn" from such interactions and explain justified answers to complex questions.

There has been progress in this space. Well-known systems like IBM's Watson enjoyed success on the TV game show Jeopardy and Apple's Siri has certainly made it easier to find music and locations on Apple products. But these systems merely apply massive data, large training sets, shallow linguistic techniques, and machine learning techniques to the task of automatic question answering. These systems lack deep understanding. More recent work on the Reading Comprehension task remains focused on shallow statistical approaches with narrow answer-based metrics rather than requirements for logical understanding and fluent explanation. Still today, however, no computer system can autonomously read, build, and communicate a logical understanding and explanation of even an arbitrary 2nd-grade text.

Accordingly, there is an ongoing need for smarter machines that can learn and understand.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 7 illustrates one implementation of select components that may be used to syntactically process a text string, such as a story, to produce linguistic analysis results.

FIG. 9 illustrates select components that may be used to semantically process the linguistic analysis results of the story.

FIG. 13 illustrates select components that may be implemented to generate resources to aid in the inference of semantic information of the story.

FIG. 15 illustrates select components in the framework that may be used to support operation of the architecture, including a knowledge representation language and inference and learning mechanisms for contextual differentiation and semantic primitives.

FIG. 16 illustrates select components in the dialog engine that generate user questions to challenge or validate the system's current understanding of the story, and receive user responses for updating the system's understanding.

DETAILED DESCRIPTION

Figure 1:
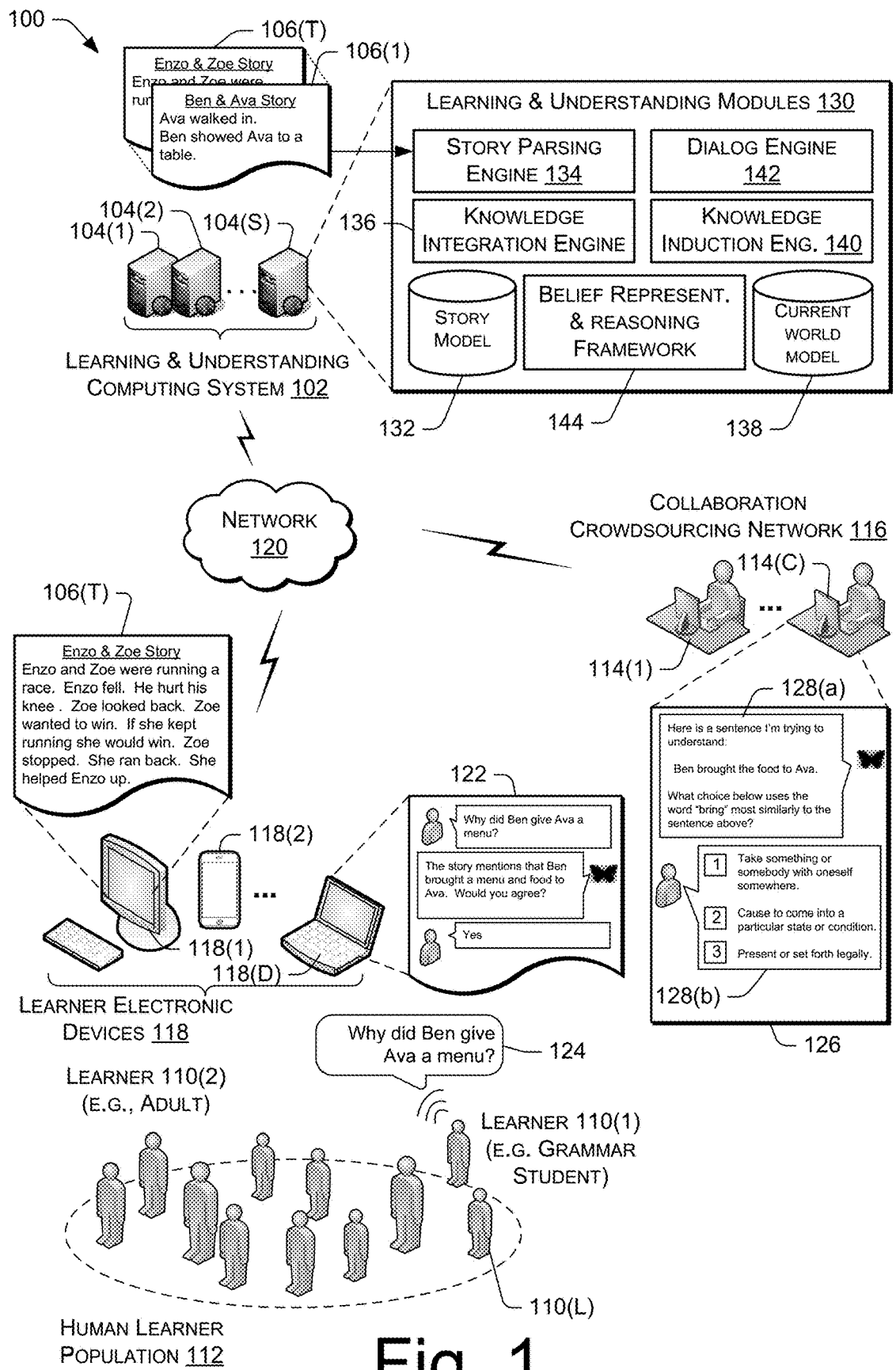
FIG. 1 illustrates an architecture and environment in which computing machines engage with humans through dialog to learn and understand arbitrary text, such as that found in stories.

This disclosure describes an architecture and processes for computer learning and understanding. The architecture enables learning and developing an understanding of arbitrary text through collaboration with humans. This collaboration may be in the context of joint problem solving or where the humans are used to teach the system or help the system understand the text it is reading. An architecture that can independently acquire and transform knowledge from text into a form that allows the system to reason, evolve, and meaningfully dialog would change the world by greatly accelerating access to task-relevant knowledge and aiding in human research, learning, discovery, and problem solving.

The computing architecture addresses the problem of deep natural language understanding in which a computer system can autonomously read, build, and communicate a logical understanding and explanation of a broad range of natural language text. Much of what is needed for deep understanding is not explicitly present in the text (or in any text) but is instead implicit and learned through interacting with the world or through interactive dialog with humans. The processes described herein include engaging in dialog with humans in an interactive problem-solving task, such as reading comprehension, such that the computing system iteratively learns to consistently, accurately, and independently assign intended meaning (validated by the interaction) to increasingly complex language.

Deep natural language understanding is difficult because language itself is hard. Language is infinitely composable, as there are many ways to say the same thing and subtle differences in meaning exist. For instance, the word "touchdown" may refer to an airplane landing or to a score in American football. Someone can be "mad about you" or "mad at you", which have two entirely different meanings. Imagine being able to engage in a conversation with a computer along the following script:

tation of the story, in which the meaning of the story is expressed in terms of generative semantic primitives (GSPs). GSPs are a small set of structures that express basic facts about the world, such as time, space, logic, number, change, cause, association, belief, perception, representation, and intention. GSPs can be composed to represent a very wide range of meaning of natural language.

The computing system maintains and continuously updates a current world model that contains its beliefs about what is true about the world. The current world model can be made of a collection of frames, where each frame is a collection of propositions, such as GSPs, that are likely to be true in some common context. For example, in the Enzo and Zoe story, frame structures may provide what generally occurs during a race. The computing system constructs the story model drawing upon the knowledge in its current world model and on knowledge induced automatically from large language corpora.

After the initial story model is built, the computing system tests the story model through dialog with humans who have also read the story. This process may involve going through a reading comprehension exercise together, answering questions, and providing valid explanations. The human dialog enables the computer system to discover additional implicit semantics and background knowledge implicit in the story and uses this implicit knowledge to understand the story and future new stories. Human responses may be used to update the story model and adjust the computing system's selection of certain understandings. After revisions to the model, the new understanding may further be tested through additional dialog with humans.

In this manner, through dialog with humans, the computing system learns over time to answer questions on successively more difficult reading comprehension texts and demonstrates its ability to understand what it read by answering questions and by explaining why those answers are correct. For example, the system may start at a kindergarten level and work up through higher grade levels. In some applications, the system may engage in a dialog with students who are also at the appropriate grade level for the text. The computer system generates and asks questions to humans whose answers are subsequently used by the computer system to learn how to map language into a logical model that represents its understanding.

In addition, the computer system may be configured to teach people through the interactive process. The system helps a human student build a logical model of what they are reading and learn to think critically by evaluating the system's understanding and by logically validating the system's answers, to ultimately arrive at a mutual understanding of the given story. The system learns and teaches analogical reasoning by generating analogies connecting story elements to other analogical content that the computer system detects on background corpora and by asking the students to consider and validate those analogies. Through multiple such interactions, the students learn how to question, critique, explore, and extend their own knowledge, and the computer system learns to consistently, accurately, and independently assign intended meaning (validated by the interaction) to increasingly complex language.

In some situations, the computing system may further engage in dialog with other computing systems in addition to human interaction. For instance, a first computing system may have gained an understanding of a story that the second computing system has not yet encountered. The first and second computing systems may be able to engage in dialog over the story so that the first computing system essentially teaches the second computing system. In this manner, as computer systems evolve separately over time to develop expertise in different domains by learning and understanding texts in those domains, the computer systems can learn from each other to integrate the other system's knowledge. The dialog between computer systems may be at a very different level, such as communicating their respective semantic representations.

This architecture employs techniques from artificial intelligence, such as knowledge representation and machine learning. In addition, it employs techniques from natural language processing, such as, syntactic parsing, predicate argument structure, entity type assignment, co-reference analysis, and statistical techniques such as distributional semantics (e.g. latent semantic analysis, random indexing and topic modeling).

Illustrative Architectural Environment

FIG. 1 illustrates an example architecture 100 in which machines, such as computing systems, can engage with humans through dialog to learn and understand arbitrary natural language, such as that found in stories. For discussion purposes, the architecture is described in part in an exemplary environment of education where the computing system interacts with students of various levels for purposes of learning from them and/or teaching them by answering questions that the students ask. However, the architecture may be implemented in essentially any environment and is not intended to be limited to education.

The architecture 100 includes a learning and understanding computing system 102 that is configured to ingest and analyze arbitrary natural language and to learn and understand the meaning and sense of words and concepts through collaborative interactions with humans. The human collaboration may be done in the context of joint problem solving or where humans are used to teach or help the system understand the text it is reading. The learning and understanding computing system 102 may be hosted on one or more servers 104(1), 104(2), . . . , 104(S), which have processing and storage capabilities to ingest natural language input that may be in the form of arbitrary text strings, such as stories 106(1), . . . , 106(T). The servers 104(1)-(S) process the natural language input and engage with humans through user interfaces to improve mutual understanding of the natural language input for both the humans and the computing system. The servers 104(1)-(S) may be embodied in any number of ways, including as a single server, a cluster of servers, a server farm or data center, and so forth, although other server architectures (e.g., a mainframe architecture) may also be used.

In the illustrated implementation, the stories 106(1)-(T) are shown being input into the learning and understanding computing system 102. Generally, the stories may originate in any modality (speech, text, OCR, etc.) and are ultimately transformed into a digital format representation of the text (e.g., ASCII) for processing by the computing system 102. The stories may be accompanied by a number of reading-comprehension questions. The stories may be stored by the computing system 102 and used by the system 102 to gain a deeper understanding of language. In this example, two stories are shown: a "Ben and Ava" story 106(1) and an "Enzo and Zoe" story 106(T). The Enzo and Zoe story 106(T) is provided above. Similarly, the Ben and Ava story 106(1) is also a short story suitable for a younger student, as follows:

Ava walked in.
Ben showed Ava to a table.
Ava sat down.

Ben gave Ava a menu.
Ava ordered spaghetti.
Ben brought the food to Ava.
Ava ate and left.

According to the architecture 100, the computing system 102 shares the stories 106(1)-(T) with humans and engages in a dialog with people at times to test the system's understanding of the stories. The learning and computing system 102 builds an initial model, which contains a semantic representation of the story to represent an initial understanding of the story. This first model is referred to herein as the "story model" and described below in more detail. Generally, the initial story model expresses the initial understanding in terms of data structures that include syntax elements and/or sets of generative semantic primitives (GSPs). Generative semantic primitives are a small set of structures that express basic facts about the world and that can be composed to represent the full range of meaning of natural language. For instance, for the sentence, "Ben brought the food to Ava", the syntax elements may be identifying "brought" as the verb and the semantic primitives may include facts about the entities in the sentence, such as Ben causing an action that results in the food being located near Ava or Ben's intention that Ava possess the food. The GSPs can be used, among other things, for answering reading comprehension questions.

Understanding language is more about what is unsaid and part of human experience than what is explicit in the written word. Typically, the best interpretation of a natural language statement is the one that "makes the most sense" with respect to our knowledge about the world. The computing system 102 maintains and continuously updates another model that contains beliefs about what is true about the world. This second model is referred to herein as the "current world model" and described below in more detail. The current world model is composed of a collection of frames, where each frame is a collection of propositions, such as GSPs, that are likely to be true in some common context. The computing system 102 constructs an initial story model, drawing upon the knowledge in the current world model and on knowledge induced automatically from other sources, such as large language corpora.

After the initial story model is constructed, the learning and understanding computing system 102 may engage in a dialog with users who have also read the story. The computing system 102 forms one or more user questions to pose to humans to test this initial understanding of the story. For example, the computing system 102 may generate questions in cases where the story model is known to be incomplete, where the system does not have high confidence in its semantic representation, or where there are reading comprehension questions that cannot be confidently answered. The system may ask questions to validate its understanding or to acquire missing knowledge. For example, the user questions may offer other possible sets of generative semantic primitives to challenge whether the generative semantic primitives in the initial story model convey an accurate meaning of the story. The user questions are provided in natural language transformed from the generative semantic primitives and sent to human users for their input. The users' responses to the questions is returned to the system 102 and used to augment the current world model and to modify or produce a new iteration of the story model that represents a new and enhanced understanding of the story. The new model expresses the new understanding as data structures that associate a different set of generative semantic primitives that may further be assembled into frame structures that provide even more meaning. This process can be repeated multiple times until the computing system 102 has worked through the various scenarios and its understanding of the story aligns with how the human users would understand the story. The updated current world model is retained for use in processing other natural language stories that might be ingested in the future. The individual story models may also be stored, to be recalled later if necessary. As the computing system goes through multiple user interactions on multiple stories, the current world model is incrementally enriched in each interaction, and the system learns to consistently, accurately, and independently determine semantic representations for natural language text. The system can read progressively more difficult stories, documents, and other texts over time and engage humans to learn and understand increasingly more difficult subject matter. As a result, the system continues to build and grow the current world model 138 with new GSPs and new frames, as well as other resources used in the system.

With reference again to FIG. 1, the computing system 102 may interact with many human users as part of the dialog process, and these users may have different purposes for engaging with the system. For discussion purposes, two groups of human users are illustrated, including human students 110(1), 110(2), . . . , 110(L), who are illustrated as belonging to a human student population 112, and human collaborators 114(1), . . . , 114(C), who belong to a human-based collaboration crowdsourcing network 116. The students 110(1)-(L) interact with the computing system 102 to learn as much from the computing system 102 as the computing system learns from them. The students and the computing system 102 engage in joint problem solving tasks as they work through a story 106, thereby learning aspects from each through the process. The students 110(1)-(L) may be of any age, reading level, or essentially any demographic. For discussion purposes, two of the students 110 include a grammar student 110(1), such as a first grade student, and an adult 110(2), such as a college student or professional. In some applications, the computing system 102 may engage in a dialog with students who are at the appropriate grade level for the text.

The human collaborators 114(1)-(C) are engaged by the computing system 102 primarily to test the system's understanding of text strings, such as those found in the stories 106(1)-(T). The human collaborators 114(1)-(C) may be formal collaborators, or untrained people who simply answer questions posed by the computing system 102. In one implementation, the collaborators 114 may be part of an organized crowdsourcing network 116, such as the Mechanical Turk™ crowdsourcing platform from Amazon. Use of crowd interactions allows collaborative aspects of the architecture 100 to scale, enabling the computing system to learn more at a faster pace.

Both the students 110(1)-(L) and the human collaborators 114(1)-(C) may be distributed, have no formal relationship with one another, and merely interact with the learning and understanding computing system 102 using their own electronic devices. In some implementations, the system 102 processes the story (particularly longer stories) into different parts and distributes different user questions for the different parts to different students or collaborators, thereby allowing the system to learn about words and concepts in parallel and more quickly assimilate the story.

The students 110(1)-(L) may interact with the learning and understanding computing system 102 in many ways, including directly with the system 102 or through user-based electronic devices 118(1), 118(2), . . . , 118(D) (collectively, devices 118) that communicate with the system 102 via a network 120. The network 120 is representative of any one or combination of multiple different types of networks, such as the Internet, cable networks, wireless networks, and wired networks. The student devices 118 have processing, storage, network and display/audio capabilities that enable the students 110(1)-(L) to interact with the system 102. The devices 118 can be essentially any type of computing device, including for example, a computer 118(1), a multifunction communication device 118(2), and a portable computer 118(D). Apart from those illustrated, other types of electronic devices may be used, such as portable digital assistants (PDAs), cellular telephones, portable media players, tablet computers, netbooks, notebooks, desktop computers, set-top boxes, entertainment devices, cable boxes, gaming systems, and the like.

The students 110 may interact with the learning and understanding computing system 102 through different or multiple modalities, including text, audio, and/or visual. As shown in FIG. 1, the story 106(T) about "Enzo and Zoe" may be depicted on a display of the student device 118(1) for reading by one of the students, such as the adult student 110(2).

Similarly, the student 110(1) has read the "Ben and Ava" story 106(1) and is now discussing the story with the learning and understanding computing system 102, as shown by a dialog user interface 122 presented on the student's device 118(D). The student 110(1) may have read the story on the same screen earlier, or listened to the story via a text-to-speech converter that outputs an audio representation of the story over a speaker. During the story, or after its completion, the student 110(1) may ask questions about the story by typing questions/comments into the user interface 122 or by speaking to the device 118(D) to verbally ask questions or make comments. In FIG. 1, the student 110(1) asks a verbal question "Why did Ben give Ava a menu?" depicted in the bubble 124. The computer 118(D) converts that audio question to a text format and presents the question in text format on the UI 122. The computer 118(D) also sends the student question in digital form over the network 120 to the computing system 102, where the question is processed. The computing system 102 examines its current understanding of the story and this particular element of the story and provides a reply to the student. At this stage of the learning interaction in this example, suppose the computing system 102 has recognized that the story includes actions such as Ben bringing a menu and food (spaghetti) to Ava. The computing system 102 identifies these actions as possibly belonging to a frame that might involve a restaurant where Ben is the waiter and Ava is the customer. Accordingly, the learning and understanding computing system 102 formulates a response that assumes the implication of a restaurant. In FIG. 1, an exemplary response is sent to the device 118(D) and presented in the UI 122 as "The story mentions that Ben brought a menu and food to Ava. I believe Ben and Ava are in a restaurant". The computing system can further use this interaction not only to teach the student 110(1) but also evaluate the system's own understanding by adding a second statement, such as "Would you agree?". If the system's responsive explanation is accurate to the student, the student can confirm that understanding, such as by answering "yes" as shown in UI 122.

In this manner, the learning and understanding computing system 102 may use human interactions for the dual purposes of teaching the students and also learning from them to increase the computing machine's understanding. From the student's perspective, the human and computer are learning together and solving problems. While this example assumes an elementary story, consider that this same interaction could play out over complex subjects, such as physics, life sciences, medicine, and music theory. The student 110 may be interested in learning a new topic that he or she knows nothing about. While information can be found through traditional searches, the student still needs to read and try to understand myriad results from such searches. In this architecture 100, the human student can interact with a computing system 102 that is or becomes an expert on the topic through its deep understanding processes of various texts on the topic (e.g., white papers, research documents, etc.). The human student can ask the system questions in a natural dialog and be taught about the topic through discussions about the texts.

In another implementation, the architecture 100 allows for the collaborators 114(1)-(C) to answer queries posed by the computing system 102 as part of the process for learning to understand the stories 106(1)-(T). Each of the collaborators 114(1)-(C) may use a computer or electronic device of some kind, such as desktop computers, laptops, smart phones, PDAs, set top boxes, entertainment devices, gaming systems, and the like. The learning and understanding computing system 102 interacts with the collaborators 114(1)-(C) of the collaboration network 116 for the primary purpose of improving understanding, and not for instructing the collaborators. Accordingly, the computing system 102 may present a different UI 126 when engaging the collaborators 114(1)-(C) that poses questions to confirm or challenge the system's understanding. In this example, the UI 126 shows a simple interaction in which the computing system 102 is attempting to better understand an excerpt from the Ben and Ava story 106(1) regarding the sentence, "Ben brought the food to Ava." In the UI 126, one dialog box 128(a) attributed to the computing system 102 (as represented by the butterfly icon) provides a user query:

Here is a sentence I'm trying to understand:
      Ben brought the food to Ava.
    What choice below uses the word "bring" most similarly
      to the sentence above?

The computing system 102 also offers multiple options, and provides those options in a second dialog box 128(b) that is attributed to the collaborator's response (as represented by the user icon). The system can rank the answer choices in the generated question based on its internal confidence of each of the choices. In this example, there are three options from which the collaborator can choose.

1. Take something or somebody with oneself somewhere.
    2. Cause to come into a particular state or condition.
    3. Present or set forth legally.

One of the collaborators, such as collaborator 114(C), reviews the system-generated user query in box 128(a) and the choices in box 128(b), and then makes the selection by clicking on the option or speaking the answer (e.g., option 1). The response is returned to the computing system 102 and used to improve its understanding of the story by potentially modifying the story model and the set of semantic primitives that support the model. The responses may be further used for future interpretations of the words or phrases, such as the word "bring", in similar contexts that are read in the future.

As shown in FIG. 1, the learning and understanding computing system 102 has multiple modules 130 that are stored and executed on the servers 104(1)-(S). The modules 130 comprise programs, applications, data structures, data stores, algorithms, and other processing logic and memory to implement the computer learning and understanding processes described herein. Select modules are shown in FIG. 1 to provide a high level overview, while additional modules and more detailed discussions are provided below in this document with reference to later figures.

The learning and understanding modules 130 work together through joint inference and dialog with humans to produce a story model 132 that accurately portrays a story, such as stories 106(1)-(T). The story model 132 evolves over time from an early syntactic representation of sentences in the story to data structures that contain instantiated generative semantic primitives and frame structures composed of the semantic structures to accurately convey higher levels of meaning about the story.

The modules 130 include a story parsing engine 134 that receives the story (e.g., stories 106(1)-(T)) and performs syntactic analysis of sentences in the story to generate several linguistic analysis results. In one implementation, the linguistic analysis results include (1) a syntactic parse to provide sentence structure, (2) a predicate argument structure (PAS), (3) an entity type assignment that assigns a type to each entity in the sentences; and (4) co-reference chains produced by co-reference analysis of the story. Potentially, multiple sets of linguistic analysis results will be produced, because language is in general ambiguous and it may not be possible to determine a single analysis that is certain to be correct. The linguistic analysis results and how they are produced are described below in more detail with reference to FIGS. 4 and 7.

A knowledge integration engine 136 receives as input the story and the linguistic analysis results from the story parsing engine 134. The knowledge integration engine 136 builds an initial, probabilistic semantic representation of the story that makes sense with respect to the system's current knowledge about the world, which is maintained in a current world model 138. The initial semantic representation forms the first version of the story model 132 that is then evolved over time by the knowledge integration engine 136 through use of human interaction and previously acquired knowledge resources. In a story, information is often left unsaid as it is assumed; unfortunately, this also can result in ambiguous meanings. As will be described below in more detail, the knowledge integration engine 136 infers relevant semantic structures that effectively predict what is likely unsaid, so the system can form better knowledge models and ask more intelligent questions of the human students or collaborators. When the story says, "Ben brought the food to Ava", the knowledge integration engine 136 assesses what information may be missing, like: "Is Ben a waiter?", "Is Ava in a restaurant?" and so on.

The knowledge integration engine 136 relies on the current world model 138 stored in memory and a knowledge induction engine 140 to assist in inferring the relevant semantic structures. The current world model 138 is a repository of all semantic knowledge the system has learned and built up over time. The current world model 138 may include or be able to reference a collection of generative semantic primitives which are initially generic and uninstantiated. For instance, these generative semantic primitives may include pre-formed structures for simple concepts like location, time, action, and experience that are initially uninstantiated with any additional information. The knowledge integration engine 136 identifies pertinent uninstantiated semantic primitive structures from the current world model 138 and instantiates them with the words/phrases contained in the syntactic parses of the sentences in the story, such as mapping verbs (e.g., "go", "bring", "eat", etc.) and entities (e.g. "Ben", "Ava", "menu", "spaghetti") into the structures. The current world model 138 additionally contains a collection of frames. A frame is a probability distribution over propositions (including but not limited to GSPs) in a particular context. A simple case is a set of propositions that are likely to be true in a context, such as actions that typically occur in a particular place (e.g., a restaurant). In one possible approach, the knowledge integration engine 136 builds and iteratively aligns the inferred semantic structures and output of syntactic analysis to evolve the story model 132, preferring semantic structures that fit well with known frames. The knowledge integration engine 136 essentially iteratively aligns the story model 132 with knowledge embodied in the current world model 138.

The knowledge integration engine 136 queries the knowledge induction engine 140 to assist in making smart predictions. The knowledge induction engine 140 is configured to analyze large corpora and other sources offline and generate a resource repository, referred to herein as "induced knowledge resources", which captures information implied by or latent in the text of the story. The knowledge induction engine 140 uses the induced knowledge resources to implement multiple tasks, including but not limited to word sense disambiguation, relation detection, paraphrase generation, textual entailment, scene analysis, and missing text generation.

Among its various applied techniques, the knowledge induction engine 140 disambiguates the word sense of a word (e.g., the word "ball" may be a formal dance or a piece of sports equipment). The induction engine 140 can find/recognize paraphrases, where words and phrases can be rewritten but have roughly the same meaning (e.g., is "crowd erupted" approximately the same as "applause in the stands"?). The knowledge induction engine 140 may further detect relations among words or phrases (e.g., in the phrase "OPEC ramped up the price of oil", the phrase "ramped up" has a relation of increasing an amount). The knowledge induction engine 140 may perform other forms of word and phrase analysis to detect and unlock other related knowledge. In each of these cases, the knowledge induction engine 140 returns to the knowledge integration engine 136 a ranked list of candidates with associated inference probabilities that are used by the knowledge integration engine 136 to select proper word senses and build accurate semantic structures and frames that infuse meaning into the story model 132. More detailed discussion of the knowledge integration engine 136 and the knowledge induction engine 140 is provided below with references at least to FIGS. 4, 9, and 13.

The dialog engine 142 takes the story model 132 and identifies areas where the semantic representation is incomplete or where the system has low confidence in those representations. Confidence values may be calculated in various ways, and are task related and generally context dependent. The dialog engine 142 generates dialog questions for the human population of students 110(1)-(L) and/or collaborators 114(1)-(C) to answer the questions with information they possess that will help fill these gaps. The dialog engine 142 generates structured questions to challenge or confirm the system's current understanding, as represented by the story model 132, and sends these questions over the network 120 to one or more of the students 110(1)-(L) and/or one or more of the collaborators 114(1)-(C). One example question is shown in UI 126, where the dialog engine 142 crafts a question seeking user feedback on how to interpret the sentence "Ben brought the food to Ava." Reading comprehension questions may also be generated to help identify gaps where the story model 132 and the current world model 138 are insufficient to provide an answer to the question. The human student/collaborator returns feedback over the network 120 to the computing system 102, where the results are collected by the dialog engine 142 and passed to the knowledge integration engine 136 for analysis.

Based on the human-interaction results from the dialog engine 142, the knowledge integration engine 136 updates the current world model 138 with modified or new semantic structures and further defined frame structures that represent new/revised concepts of the story. In this manner, the system 102 continues to learn and gain deeper understanding of the language in the story. Moreover, the knowledge integration engine 136 continues to iteratively refine the story model 132 against the updated current world model 138. The knowledge integration engine 136 continues to probe its understanding with humans with the help of the dialog engine 142 until a termination condition is reached, such as the system having sufficient confidence in its semantic representation of the story. In one approach, the knowledge integration engine 136 and the dialog engine 142 continue to iterate until a threshold confidence level is reached that suggests the current understanding has a high probability of accurately portraying the story. The threshold may be set and adjusted according to various applications and use contexts.

Confidence levels may be computed in a variety of ways depending upon the goals of a given situation. The computing system 102 can be applied, for example, to many goals involving language understanding, such as summarizing a text or answering a question. A prerequisite for achieving such goals is that the computing system 102 be able to determine which of its beliefs are true. In one implementation, the mechanism used by the system for making this determination is to assign a confidence value to each belief, where the confidence value represents how sure the computing system 102 is that the belief is true. The system 102 iteratively adjusts the confidence values based on how well the system 102 achieves its goal such that each iteration is better than the last. Eventually, this process finds a set of confidences for the beliefs that maximizes the system's performance on the goal for the current set of beliefs. This approach leads to two strategies the computing system 102 can deploy to improve its performance on its goal and to decide when to stop improving.

First, the system can examine its beliefs independently from its goals. That is, the system can go from belief to belief seeking information from the dialog engine 142 or the knowledge induction engine 140 to correct its confidence that the belief is true. The computing system 102 can stop seeking more information either when it has exhausted its set of beliefs or when it finds that the confidence changes resulting from new information have dropped below a level of statistical significance.

Second, the computing system 102 can judge its ability to achieve a goal as adequate or inadequate and then act on that result. For example, if the system's question answering correctness accuracy were 60% and the system's goal is to achieve an accuracy of 70%, the system 102 would seek information from the dialog engine 142 or the knowledge induction engine 140 to improve the confidence in its beliefs until that goal is achieved. Once that goal is achieved, the computing system 102 can could stop improving. Alternatively, if desired, the computing system 102 could continue to iterate further until the changes in its accuracy had dropped below a level of statistical significance. An advantage of this latter approach over the former is that it also allows for an evaluation of the utility of adding new beliefs to the system vis-á-vis the goal at hand. That is, if new beliefs improved the system's performance on the goal, then the utility of the new beliefs is high. If the beliefs have no or a negative impact, then the utility of the new beliefs is low.

Once the knowledge integration engine 136 is confident that the story model 132 represents a likely understanding of the story 106, the story model 132 may be stored and indexed for future retrieval and use. The knowledge gained to produce the story model 132 is also captured in the current world model 138. In this manner, the understanding developed for each story may be kept for future consideration and perhaps even more refinement as more information is learned. Moreover, as the system goes through multiple user interactions on multiple stories, the current world model 138 is incrementally enriched in each interaction. As more stories are read, the current world model 138 grows with more inferred frames and is capable of assisting in the understanding of increasingly more complicated subject matter. More detailed discussion of the dialog engine 142 is provided below with references at least to FIGS. 4, 16, and 22.

In the illustrated implementation, the learning and understanding modules 130 further include a belief representation and reasoning framework 144 which provides a facility for working with knowledge models as one way to implement the story model 132 and the current world model 138. Knowledge models are formal, structured representations of knowledge, which can be expressed in a knowledge representation language (KRL) consisting of "entities" and "propositions." An entity represents a thing in the world, including things that are fictional, e.g. "Pegasus", or abstract, e.g. "philosophy". A proposition is a statement that can be true or false. A proposition has a predicate (which is a kind of entity) and a set of arguments, where each argument has a label (called a role) and a value that can either be entities or propositions. The same role can have multiple values. A belief is a proposition that an agent (often, but not necessarily, the system itself) thinks is true with some probability.

The framework 144 comprises functional components used by various modules in the system. The framework uses the knowledge representation language and provides inference and learning mechanisms for "contextual" differentiation and generative semantic primitives, which are a small set of structures that can be composed to represent the meaning of natural language texts. More particularly, the components of the framework 144 may include (1) a formal language to represent the entities and propositions, (2) common semantics components to provide a set of define proposition types that are expected to be frequently used, (3) a knowledge store to provide persistent storage of knowledge models and support queries over that knowledge, and (4) one or more reasoning engines that provide different reasoning capabilities over knowledge models. More detailed discussion of the belief representation and reasoning framework 144 is provided below with references at least to FIGS. 4 and 15.

FIG. 1 provides an overview of select modules 130 in the learning and understanding computing system 102. More detailed explanations and examples are provided below beginning with reference to FIG. 4. Before providing that more detailed explanation, however, high level processes implemented by the architecture 100 of engaging students 110(1)-(L) and collaborators 114(1)-(C) will be described with reference to FIGS. 2 and 3.

Furthermore, FIG. 1 illustrates the example dialogs with humans being conducted in English. However, it is noted that the architecture 100 described herein is language agnostic and can be configured to interact with humans in any language.

Illustrative General Operation

Figure 2A:
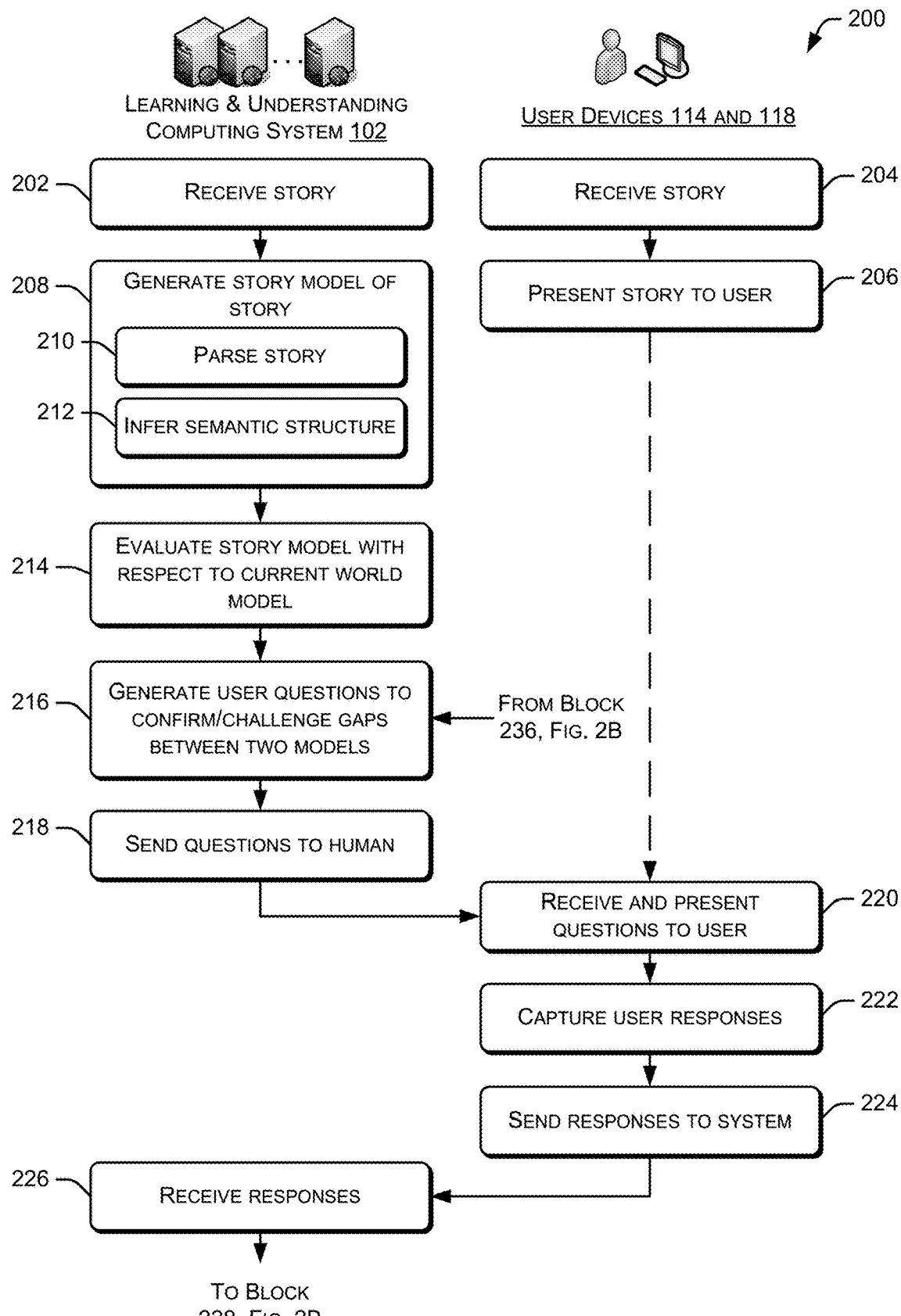
FIGS. 2A and 2B present a flow diagram of a process for learning and developing an understanding through human interaction that may be implemented by the architecture of FIG. 1.
Figure 2B:
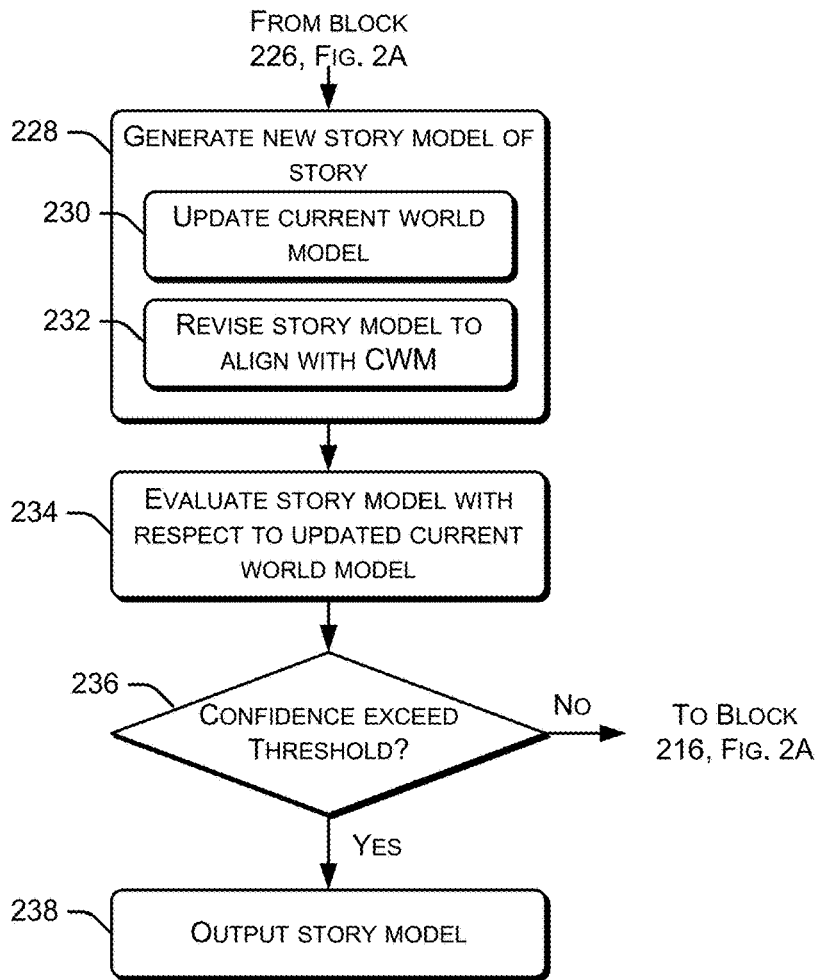

FIGS. 2A and 2B show a general process 200 implemented by the architecture 100 of FIG. 1 for learning and developing an understanding of language used in texts (e.g., stories) through human interaction. The process 200 (and all subsequent processes described with reference to flow diagrams) is illustrated as a collection of blocks in a logical flow graph, which represent a sequence of operations that can be implemented in hardware, software, or a combination thereof (e.g., such as that provided by servers 104(1)-(S)). In the context of software, the blocks represent computer-executable instructions that, when executed by one or more processors, perform the recited and referenced operations. Generally, computer-executable instructions include routines, programs, objects, components, data structures, and the like that perform particular functions or implement particular abstract data types. When executed by processors, the computing system is transformed into a machine specially configured to learn and gain understanding of text language as presented in stories. The order in which the operations are described is not intended to be construed as a limitation, and any number of the described blocks can be combined in any order and/or in parallel to implement the process or further separated into more blocks of more incremental steps.

For discussion purposes, the process 200 is described with reference to the architecture 100, the computing system 102, and the user devices 114 and 118 of FIG. 1. Further, the process 200 is shown in two columns to generally depict operations performed by the computing system 102 separately from operations performed by the user devices 114 and 118.

With reference to FIG. 2A, at 202, a story is received at the learning and understanding computing system 102. The story is formed of multiple text sentences, as exemplified by the short "Ben and Ava" story 106(1) and the short "Enzo and Zoe" story 106(T). The story is ingested in, or converted to, a digital format by the system 102. The same story is received by a user device 114/118, at 204, and presented to the user for him or her to read the story, at 206. The story may be displayed and/or converted to an audio output for the user to consume. The story may be accompanied by a number of reading-comprehension questions.

At 208, the computing system 102 generates a first or initial story model to represent a first understanding of the story. Generating the first story model involves a syntactic analysis (referred to as story parsing), producing linguistic analysis results (e.g., syntactic parse, predicate-argument structure, entity type assignment, co-reference) for each sentence, at 210. With reference to FIG. 1, the story parsing engine 134 is configured to perform this parsing operation. The parsing operation produces a set of linguistic analysis results, including a syntactic parse to provide sentence structure, a predicate argument structure (PAS), entity type assignments, and co-reference chains. The parsing operation and examples thereof are described in more detail below with reference to FIGS. 4-8.

Once the linguistic analysis results are produced, at 212, the computing system 102 infers a semantic structure as a representation of each parsed sentence by semantically processing the syntactic representation of the parsed sentence. The knowledge integration engine 136 and knowledge induction engine 140 perform the tasks in support of this act 212 of inferring a semantic structure. The resulting first story model is expressed as knowledge data structures of entities and propositions, such as through an associated set of instantiated generative semantic primitives and frame structures.

At 214, the system evaluates the story model with respect to the current world model. The system may identify areas where the story model does not contain a high-confidence semantic representation that fits well with the known frames in the current world model. The system may also identify deficiencies in the story model where there are reading comprehension questions that cannot be confidently answered. At 216, the computing system 102 generates one or more user questions to probe the user's understanding of the story, and/or to improve, test, or challenge the system's understanding of the story. The user questions include inquiries that offer other possible understandings based on different sets of generative semantic primitives to challenge whether the initial instantiated generative semantic primitives convey an accurate meaning of the story. The dialog engine 142 may be used to generate the user questions.

At 218, the user questions are sent from the computer system 102 to the user computing device 114/118 for presentation to the human user. At 220, the questions are received and presented to the user, such as via a UI 126 in FIG. 1, or audibly output for the user to hear. At 222, the user device captures the user responses, which may have been entered via the UI or spoken. Since the user has read the story presented at 206, the user has the story context to answer the questions. The user relies on his or her knowledge, background, and experiences to answer the questions, thereby potentially providing new information that can be added to the current world model. The computing system may not have had this information previously or perhaps may not have fully appreciated the information that it did have. At 224, the user device sends the user responses back to the computing system 102.

At 226, the user responses to the questions are received at the computing system 102. The interactions between the computing device 102 and user devices 114/118 may involve sending multiple questions and receiving multiple responses to adequately extract the knowledge from the human user.

With reference to FIG. 2B, at 228, a new story model is generated to represent a new understanding of the story. As part of this operation, the user responses are used to update the current world model, at 230, and the original story model 132 is revised to align with the updated current world model 138, at 232. The new story model expresses its new understanding as a knowledge data structure of entities and propositions, as represented by a new set of instantiated generative semantic primitives and frame structures. The new set of instantiated generative semantic primitives and frame structures are different, albeit maybe only slightly, than the first set of instantiated generative semantic primitives and frame structures.

At 234, after formation of the new story model 132, that story model is evaluated against the updated current world model. Confidence scores are calculated to determine how well the story model aligns with the current world model. Higher scores are given when a small number of frames match a large number of beliefs extracted from the story. Furthermore, a set of frame alignments scores poorly if newly predicated beliefs are contradictory with the system's other beliefs about the story. At 236, the confidence scores are compared to a threshold. If a termination condition has been reached, such as when the confidence scores satisfy a pre-established threshold (i.e., the "yes" branch from 236), the story model 132 is output as an accurate understanding of the story, at 238. Conversely, if the termination condition is not reached, such as when confidence scores fail to satisfy the pre-established threshold (i.e., the "no" branch from 236), the process 200 returns to generate a new set of user questions to further test the understanding of the new story model at 216 (FIG. 2A).

In the example of FIGS. 2A and 2B, the architecture 100 is described as engaging a human population to help the system learn and gain a deeper understanding of natural languages as represented in stories. The computing system 100 engages users either in an ad hoc learning environment or in a more formal collaboration environment where collaborators are posed questions for the purposes of improving the system's knowledge. However, the architecture 100 may be used in an education environment to teach humans about certain topics that are described in text-based works, while continuing to refine the system's own knowledge base. One such example is described with reference to FIG. 3.

Figure 3:
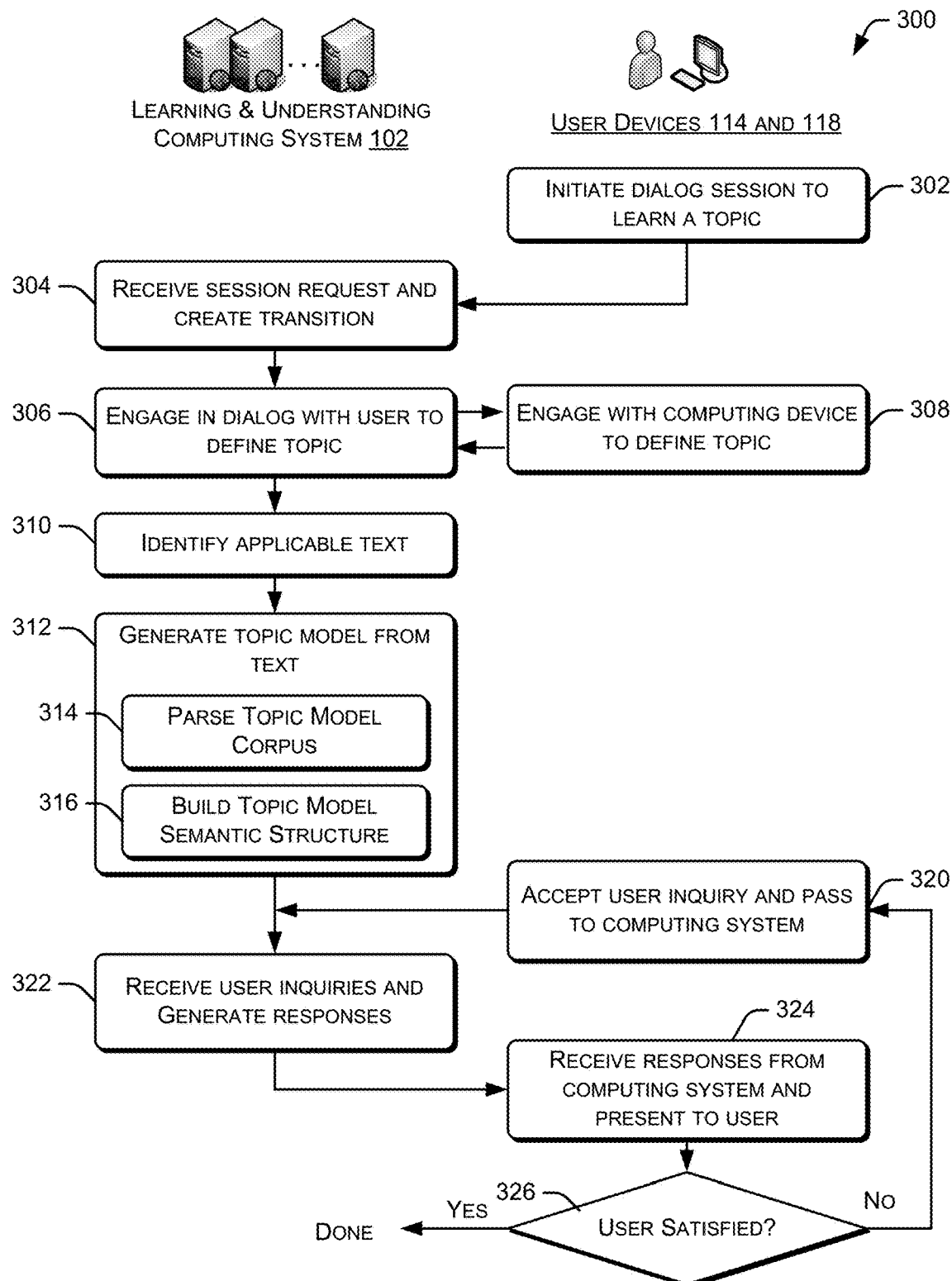
FIG. 3 is a flow diagram of a process for teaching people by allowing the people to engage in a dialog with a computing system around a topic that is discussed in texts.

FIG. 3 shows an exemplary process 300 for teaching people about a topic of interest by engaging in an interactive dialog around that topic. At 302, a person uses his or her device 114/118 to begin a dialog session with the computing system 102. The user may initiate the dialog session in any number of ways, including by asking a question, making a statement about a topic of interest, or referencing a text or article to discuss. At 304, the computing system recognizes the implicit request for a dialog session and generates a transition response designed to engage the user on a particular topic and perhaps extract more information from the user. The transition response may be one of many possible pre-established and pre-stored transition statements (e.g., "What can I help you with?"; "Can you tell me more about what you want to know?"; "When you said 'airplanes', what types of airplanes interest you?"; etc.). In some implementations, the system may use the same process as FIGS. 2A and 2B to dialog with the user to discover the topic to be discussed. The system may have a frame designed to help a human get started in learning a topic, and the system attempts to infer information about that frame. If a variable cannot be inferred, then the system would ask the human about it, leading with a general transition question above.

At 306 and 308, the computing system and the user, via his or her user device, engage in a dialog session to define the topic. At 310, the computing system identifies one or more texts pertaining to the topic. The texts may be embodied in any number of forms, such as an article, white paper, product description, educational primer, book excerpts, and the like. Once identified, at 312, the computing system builds a knowledge model about the topic from the text. As above, this may involve parsing the text, at 314, and inferring semantic structures representing the text, at 316.

At this point, the computing system 102 is ready to discuss the topic with the user. The system can generate a summary about all the relevant information it has read on the topic. At 320, the user may ask questions via device 114/118 about the topic. At 322, the computing system 102 receives the questions and formulates computer-generated responses based on the newly created topic model and the current world model. The responses may provide basic information that the system has a high confidence that the current world model is accurate. Alternatively or additionally, the response may be in the form of questions intended to reconcile differences between the knowledge model of the subject being discussed and the current world model. The responses are sent to the user device and presented to the user, at 324, for the user to learn from the responses. Through this interactive exchange, the computing system 102 teaches the user about the topic and further learns and gains a deeper understanding of the text describing the topic through aligning the knowledge model created based on the text and the current world model.

At 326, the process 300 continues until the user indicates that he or she has sufficiently learned the topic (i.e., the "yes" branch from 326). If he or she is not finished (i.e., the "no" branch from 326), the user may ask further questions on the topic at 320, or move onto a new topic and restart the process at 302. If the user is finished (i.e., the "yes" branch from 326), the process 300 may be completed.

Illustrative System Design

Figure 4:
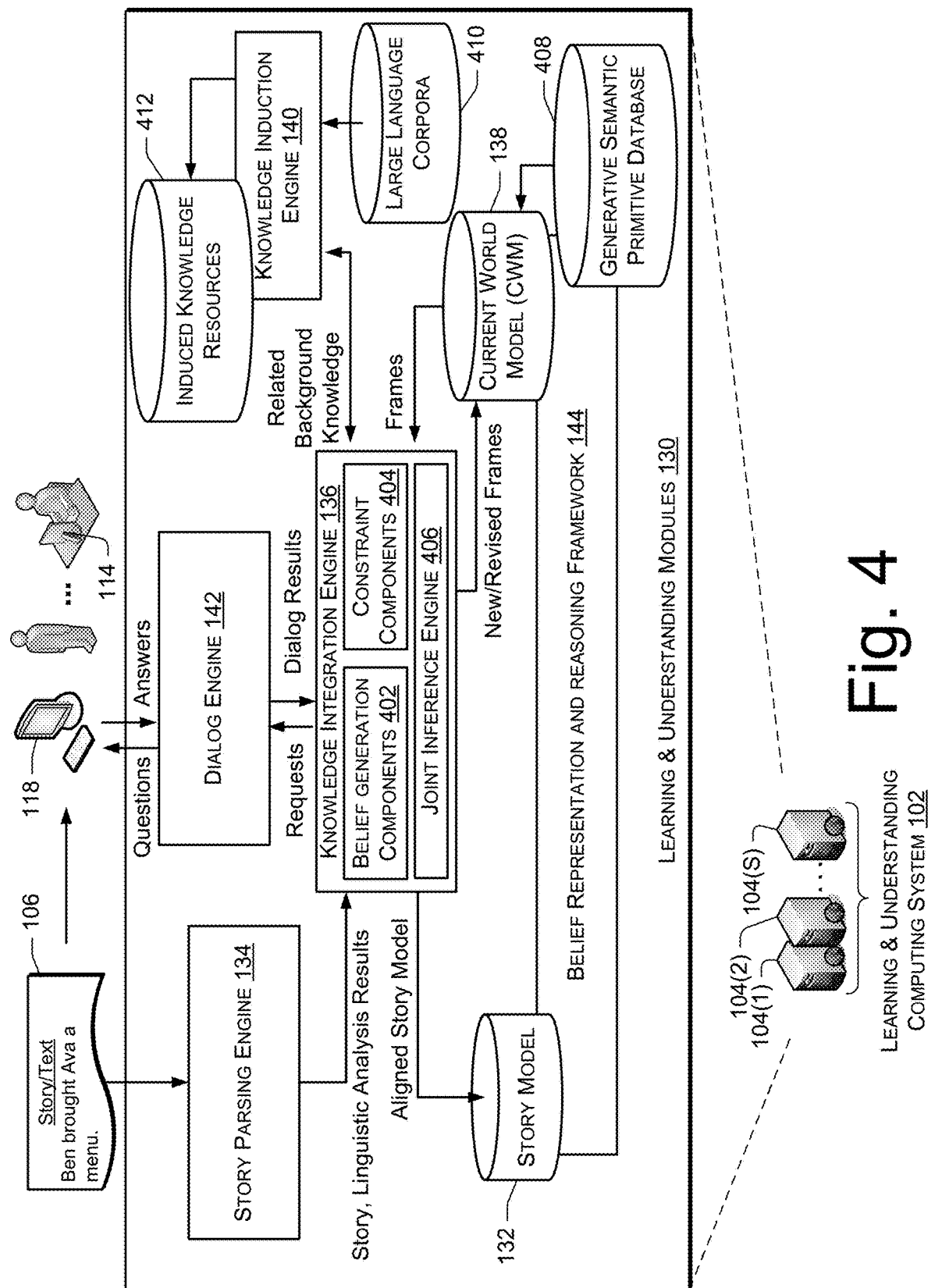
FIG. 4 illustrates an example implementation of select components in the learning and understanding architecture of FIG. 1, and demonstrates how certain processes and data may flow among the components.

FIG. 4 shows selected modules 130 that implement the learning and understanding architecture of FIG. 1. The modules 130 are shown being hosted by the learning and understanding computing system 102. The modules 130 include the ones introduced in FIG. 1, and additional data stores. FIG. 4 also illustrates data flows among the various modules to demonstrate the process workflow through the architecture as a computer generated story model emerges through joint inferencing and dialog with humans to understand language in a story.

As shown in FIG. 4, a natural language input, such as text, is ingested by the learning and understanding computing system 102 and is also provided to the user devices 114/118 associated with the human students/collaborators. The text may be essentially any digital form of words, phrases, or sentences written or spoken in a natural language, and is illustrated in FIG. 4 as a story 106. The text may be presented on the display screen of the users for reading or played audibly for the users to listen.

The story parsing engine 134 is executed to analyze the subject text and produce a set of linguistic analysis results. Among the linguistic analysis results are a syntactic parse that provides information pertaining to sentence structure. A syntactic parse is similar to sentence diagramming that students learn in grammar school, where verbs, nouns, and such are structurally related. The story parsing engine 134 also determines the predicate argument structure (PAS) with a parser-neutral representation of predicates and their instantiated arguments which serve as primitive beliefs on which other analysis components operate. For instance, following the syntactic parse of the sentence, "Ben brought the food to Ava", the PAS recognizes that "Ben" is the subject argument, "food" is the object argument, and "brought" or the root form "bring" is the predicate (or verb predicate in this case). The story parsing engine 134 further assigns entity types to the various words/phrases in the sentence and derives co-reference chains of words/phrases that although are not identical, are referring to the same thing.

To illustrate the operation of the story parsing engine 134, consider the following sample text:

Hot liquid rock is below the ground. Volcanoes are openings in the ground where that liquid can come out. Sometimes, volcanoes erupt. That means they explode. Smoke and hot liquid rock come out of the volcano. The liquid is called lava. Mt. Vesuvius is a famous volcano in Italy.

For the sentence "Smoke and hot liquid rock come out of the volcano", the story parsing engine 134 may form a PAS having the root predicate of "come", with "smoke" and "hot liquid rock" as subject arguments. The engine further identifies "smoke", "rock", and "volcano" as nouns, "hot" and "liquid" as adjectives modifying the noun "rock" and further recognizes "and" as a conjunction between subject nouns "smoke" and "rock". The engine 134 also annotates words with entity types, such as annotating "Mt. Vesuvius" as a mountain type and "Italy" as a country type. The story parsing engine 134 may further recognize that the terms "hot liquid rock", "that liquid", "hot liquid rock", "liquid", and "lava" can all be co-referenced as referring to the same thing.

The story parsing engine 134 outputs the linguistic analysis results, along with the story, to the knowledge integration engine 136. The linguistic analysis results may include the syntactic parse and predicate argument structures, which together form a linguistic structure, as well as the entity types and co-references of the story 106.

A more detailed description of one implementation of the story parsing engine 134 is provided below with reference to FIGS. 7 and 8.

The knowledge integration engine 136 takes as input the story and the linguistic analysis results to build an initial, probabilistic semantic representation of the story model 132 that "makes sense" with respect to the system's current knowledge about the world as contained in the current world model 138. The knowledge integration engine 136 is a set of executable components that evolve the story model 132 over time through joint inference and human interaction to align the story model 132 with the current world model 138. The knowledge integration engine 136 is a configurable and highly flexible module composed of belief generation components 402, constraint components 404, and a joint inference engine 406. The belief generation components 402 input a set of beliefs and output a probability distribution over new beliefs that may be true given the input beliefs. As discussed previously, a belief is a proposition that the system or another agent thinks is true with some probability. The constraint components 404 input a set of beliefs and output a score indicative of the probability that the set of beliefs is true. The joint inference engine 406 takes the output from the belief generation components 402 and the constraint components 404 and calculates the joint distribution over beliefs. This is used to calculate the marginal probability of each belief, which is used to construct the story model. The joint inference engine 406 may be configured to produce conditional probabilities for possible beliefs based on all beliefs as known at the time. In some contexts, the belief generation components 402, the constraint components 404, and the joint inference engine 406 may be referred to generally as the joint inference system.

The joint inference engine 406 can operate in a variety of ways. In one implementation, the joint inference engine proposes multiple possible worlds, where each world has a set of beliefs that are considered true. The belief generation components 402 are iteratively run on the worlds, observing the beliefs that are true and proposing distributions over new beliefs. New worlds are created by drawing beliefs from those probability distributions. The constraint components 404 are run to evaluate the probability of worlds. When the process is finished, the marginal probability of a belief is the sum of the probability of the worlds in which it is true. Since the marginal probabilities may not capture the relationships between probabilities of beliefs, the worlds may be stored as part of the story model 132. A more detailed implementation of possible belief generation components is provided with reference to FIG. 9.

With joint inference, the knowledge integration engine 136 combines levels of interpretation. That is, the engine 136 interprets text at various levels of conceptual richness. Higher levels of interpretation are more powerful, but also more implicit and therefore harder to infer. In one implementation, the interpretation levels include a first or base level which is essentially the natural language text, perhaps expressed in a sequence of words (or sometimes generically called "tokens"). The second or next interpretation level involves a linguistic analysis of the natural language text. This linguistic analysis may be performed to provide a grammatical parse and statistical word similarity (e.g., embeddings). This second level of interpretation is provided by the story parsing engine 134.

The third level involves analysis of generative primitive semantics to provide richer meaning in the form of spatial, temporal, and cognitive facts about the text language. Generative semantic primitives (GSPs) may be viewed as atomic building blocks of meaning, allowing for a more meaningful interpretation of the language in the story. GSPs represent basic facts about the world, such as time, space, logic, number, change, cause, association, belief, perception, representation, and intention. GSPs may be instantiated and composed in countless ways to represent all of the machine's knowledge and experience. GSPs are expressed as KRL propositions with a predicate and roles. A GSP is instantiated when story entities and other GSP propositions fill these KRL roles. Entities from text in the story (either mentioned explicitly or implied to exist in a discourse context) may instantiate a role in the KRL proposition corresponding to a GSP. Additionally, GSPs can be composed via nesting one GSP in a role of another GSP. This compositionality allows the system to express an unlimited number of facts about the meaning of natural language statements. In this way, a GSP structure provides a common way to interpret the meaning or semantics of Ben taking some food to Ava in the Ben and Ava story, regardless of how the sentence is actually penned. For instance, that meaning can be expressed in the following similar, but non-identical ways: "Ben brought the food to Ava"; "Ben took the food to Ava"; "Ben served the food to Ava"; "Ben handed Ava the food"; "Ava took the food from Ben"; "Ava acquired the food from Ben"; "Ben gave Ava the food"; "Ava got the food from Ben"; and "Ben brought Ava the food". Arbitrary instantiations of GSPs can be translated to natural language, allowing for humans to interact directly with the system's representation of a text without being exposed to the internal representation of the GSPs.

The fourth and top level pertains to analysis of frame semantics which provides logical or common-sense knowledge scripts, thereby filling in much of what might be implicit in the story. A frame is a probability distribution over propositions (such as GSPs) in a particular context. A simple case is a set of propositions that are likely to be true in a context, such as actions that typically occur in a particular place. In the Ben and Ava story, for example, a "restaurant" frame may provide the implicit information that Ben and Ava are in a restaurant, thereby providing a theme or context within which to better understand the explicit language in the story. The restaurant frame applies because the experiences described in the story match the experiences stored in that frame. For instance, the restaurant frame might consist of GSPs for the following sequence of actions that are likely to occur in the context of a restaurant (here they are shown in a natural language representation, but in the actual frame they would be represented as GSPs):

Customer enters the restaurant
Customer sits at a table
Customer waits for the waiter to come
Waiter brings customer a menu
Customer picks the food that they want to have
Waiter brings the food to the customer Customer eats the food
Waiter brings the bill
Customer pays the bill
Customer leaves the restaurant The knowledge integration engine 136 makes use of such frames when processing a story, such as applying the restaurant frame to the understanding of the Ben and Ava story.

The knowledge integration engine 136 evolves the story model 132 by taking the basic linguistic analysis results generated by the story parsing engine 134 (i.e., second level interpretation) and then inferring meaning through use of generative semantic primitives (i.e., third level interpretation) and frame semantics (i.e., fourth level interpretation).

As part of its operation, the knowledge integration engine 136 performs a frame inference process to infer both generative semantic primitives and higher level frames. The frame inference process includes four main aspects: frame retrieval, frame alignment, belief prediction, and evaluation. In frame retrieval, a subset of frames is identified from the current world model 138 that may be relevant to the system's current beliefs about the story. Frames can also be generated dynamically on the spot using statistical or rule-based techniques. Frame alignment involves determining assignments of entities in the story to roles (variables) in the frame. Frame alignment is done using a variety of matching algorithms based on statistical and/or semantic techniques. For example, in one implementation, if the propositions are textual propositions, the computing system 102 can use a statistical text similarity algorithm (e.g. Word2Vec) to align/match the propositions. If the propositions are GSP-based containing typed entities and relations, the system can use a semantic matcher based on an ontology (e.g., WordNet) to align/match the propositions. For example, Ben aligns to waiter and Ava aligns to customer. Following alignment, the knowledge integration engine 136 asserts beliefs predicted by frames, so that each semantic primitive structure that is in the frame but not mentioned in the story is a possible inference. The engine 136 then produces a score for how well the set of frame alignments match the story. A higher score is given when a small number of frames match a large number of beliefs extracted from the story. Also, a set of frame alignments may alternatively score poorly if beliefs predicted by frames are contradictory with the system's other beliefs about the story.

Frame inference may occur at multiple levels of interpretation. At the sentential level, frame inference can be used to infer the GSPs corresponding to the linguistic structure of a sentence or clause. In this case, each frame contains a mixture of semantic primitive structures and linguistic analysis results. As one example configuration, for each sentence in the story, the knowledge integration engine 136 instantiates one or more GSP structures with information from the linguistic analysis results to produce GSP structure instances. In the Ben and Ava story, the engine 136 can instantiate an action GSP structure instance by possibly filling a reifier role with the event entity referred to by the word "bring" (reifier: story/bring), the agent role with the entity referred to by the word "Ben" (agent: story/Ben), and an after-state with a nested proposition relating the fact that Ava possesses the food. This nested proposition may have a possessor role with the entity referred to by the word "Ava" (possessor: story/Ava) and a possession role with the entity referred to by the word "food" (possession: story/food).

At the episodic level, frame inference can be used to determine which sets of GSPs are likely to fit well together and what new inferences can be made. For example, in the Ben and Ava story, the "restaurant frame" is a good fit with the GSPs for the actions mentioned in the story, e.g. "Ben brought Ava a menu". If Ben is aligned with waiter and Ava is aligned with customer, new inferences can be made such as "Ben brought the bill" and "Ava paid the bill".

As noted previously, frames are themselves propositions and as such can be referenced by other, higher-level frames. For example, there may be a frame about eating in general, including the actions of chewing and swallowing, perhaps using a knife and fork, etc., and this entire frame would be included with some probability in the restaurant frame. In general, the frame inference process may iterate multiple times to discover a hierarchy of frames that "explains" the story.

In one implementation, at a basic level, a general frame could be created from a specific text by replacing occurrences of particular entities with their entity types (person, or customer and waiter). The knowledge integration engine 136 may access a library of frames in the current world model 138 and select one or more frames that exhibit a high probability of being relevant to the words/phrases in the story. For instance, in the Ben and Ava story, words such as "menu", "food", "table", etc. may map to GSP structure instances like "(waiter) brings food to (customer)" and "(customer) has the food". Such GSP structures instances may then be grouped to define roles in frames, where in this example, these GSP structure instances may be appropriate for frames pertaining to the hospitality genre, such as a restaurant frame, a hotel frame, or a pub frame. These frames may be combined into an aggregate, more general hospitality service frame. Once selected, the knowledge integration engine 136 determines an alignment of entities in the story to the conceptual roles in the frame (e.g., Ava is the customer and Ben is the waiter) that would make the GSP structure instances in the frame match the GSP structure instances in the story model. Through this construction and instantiation of the frame structure, the knowledge integration engine 136 aligns the frame with the linguistic components of the story. The instantiated frame structure provides a new understanding of the story, and may be returned to the current world model 138 to increase the body of knowledge stored therein.

Over time, the knowledge integration engine 136 may be used to induce new frames as well. Frame induction is a process by which, as the system reads and understands more text, it creates new frames to add to the current world model. As the system reads more texts and engages humans in dialog, the current world model 136 grows with the addition of new frames, thereby increasing its knowledge and ability to help understand more sophisticated subject matters. In one implementation, at a basic level, a general frame could be created from a specific text by replacing occurrences of particular entities with their entity types (person, or customer and waiter). A more detailed description of one implementation of the knowledge integration engine 136 is provided below with reference to FIGS. 9-12.

The knowledge integration engine 136 may further query the knowledge induction engine 140 to learn more about the words/phrases found in the story. The knowledge induction engine 140 contains an executable component that can run offline or separately from the other components to analyze large language corpora 410 and other sources. The knowledge induction engine 140 uses a variety of techniques to derive a number of induced knowledge resources, which capture information implied by or latent in the text. The knowledge integration engine 136 may subsequently query the repository 412 to perform tasks such as word sense disambiguation, relation detection, paraphrase generation, textual entailment, scene analysis, and missing text generation.

A more detailed description of one implementation of the knowledge induction engine 140 is provided below with reference to FIGS. 13-14.

The learning and understanding modules 130 may further include a belief representation and reasoning framework 144, which is a set of foundational components used throughout the system 102 by all of the various modules 130. The framework 144 provides the knowledge representation language and enables higher level functionality like inference and learning mechanisms for contextual differentiation and semantic primitives. The framework 144 also performs basic operations that allow the system 102 to store, index, retrieve, navigate, and manipulate probabilistic propositions (or "beliefs") over time. The framework 144 provides the mechanisms to define the GSP structures and frames to represent natural language in the story model 132 and the current world model 138. The framework 144 may also produce probabilities that express how likely various semantic relations are for a suitable interpretation of the story sentence.

In one implementation, the story model 132 and the current world model 138 are structured as knowledge models, which are formal, structured representations of knowledge formed of entities and propositions. An entity is a thing, which may exist (e.g., "dog", "cat", "truck", etc.) or may not actually exist (e.g., "Pegasus", "Sherlock Holmes"). An entity may also be an abstract concept (e.g., "animal", "philosophy", "action", etc.). Entities can have names and are defined by all the information known about them. A proposition is a statement that can have a truth value. Every proposition has a predicate and a set of arguments, which may be entities or propositions. The story model 132 is a knowledge model that is intended to represent what is stated in a particular piece of text (story) being read by the system. The current world model 138 is a knowledge model that is intended to represent general knowledge about what is true in the world.

In this implementation of knowledge models, the framework 144 is a facility for working with the knowledge models. The framework 144 includes a formal language for representing entities and propositions, a set of defined proposition types that are expected to be frequently used, a persistent storage for knowledge models that may be queried for access to the knowledge, and a set of components that provide different reasoning capabilities over knowledge models.

A more detailed description of one implementation of the framework 144 is provided below with reference to FIG. 15.

The learning and understanding modules 130 may further include a dialog engine 142 to facilitate question-and-answer dialog sessions with human users to test or validate the system's understanding of the story as represented in the story model. The dialog engine 142 takes as input the story model 132 and current world model 138, uses them as the basis to generate questions for the user and/or to answer questions from the user, and outputs an updated story model and an updated current world model after incorporating knowledge obtained through user interaction. The dialog process also leverages other system components such as the knowledge integration engine 136 and the knowledge induction engine 140 to help interpret user questions/responses and formulate system questions/responses. For example, in the Ben and Ava story, the system may not be able to discern at first that the food refers to the spaghetti, leaving part of a semantic structure unfilled. The dialog engine 142 can generate one or more questions to ask the user whether the food is likely to be the spaghetti.

In other cases, the system may not be confident of its current assumptions. For instance, suppose the knowledge induction engine 140 predicts that two senses of the word "bring" as used in the story yield roughly the same probabilities of being correct. The knowledge integration engine 136 may choose one of the senses. Because the system is not entirely confident of this choice, the dialog engine 142 may ask questions about the accuracy of this word sense choice in the particular sentence or story.

The dialog engine 142 may engage single users in linear dialog sessions or distribute the questions to a larger group of users in parallel. In this distributed approach, for example, the dialog engine may logically separate questions into different sets and ask different users the different sets of questions. Distributed dialog sessions allow the computer system to scale across a crowd of users, and reduce latency of the learning process through parallelized interaction with multiple users.

The questions may be presented to the user(s) in any number of ways and modalities. The users consider the questions and provide responses. The dialog engine 142 uses the responses to decide what follow-on questions to ask the user. Additionally, the dialog engine 142 processes the responses to update semantic structures and frames in the current world model and the story model, thereby improving the system's understanding of the story.

The dialog sessions may be repeated until a termination condition is met, such as when the knowledge integration engine 136 achieves a sufficient confidence level in a semantic representation of the story that fits well with the known frames in the current world model. In one implementation, the dialog engine 142 may be tasked to express the understanding to the user for final validation as to accuracy. Once the termination condition is reached, the story model 132 may be stored and indexed for future use, and the updated current world model 138 is retained for use in processing other stories.

Figure 5:
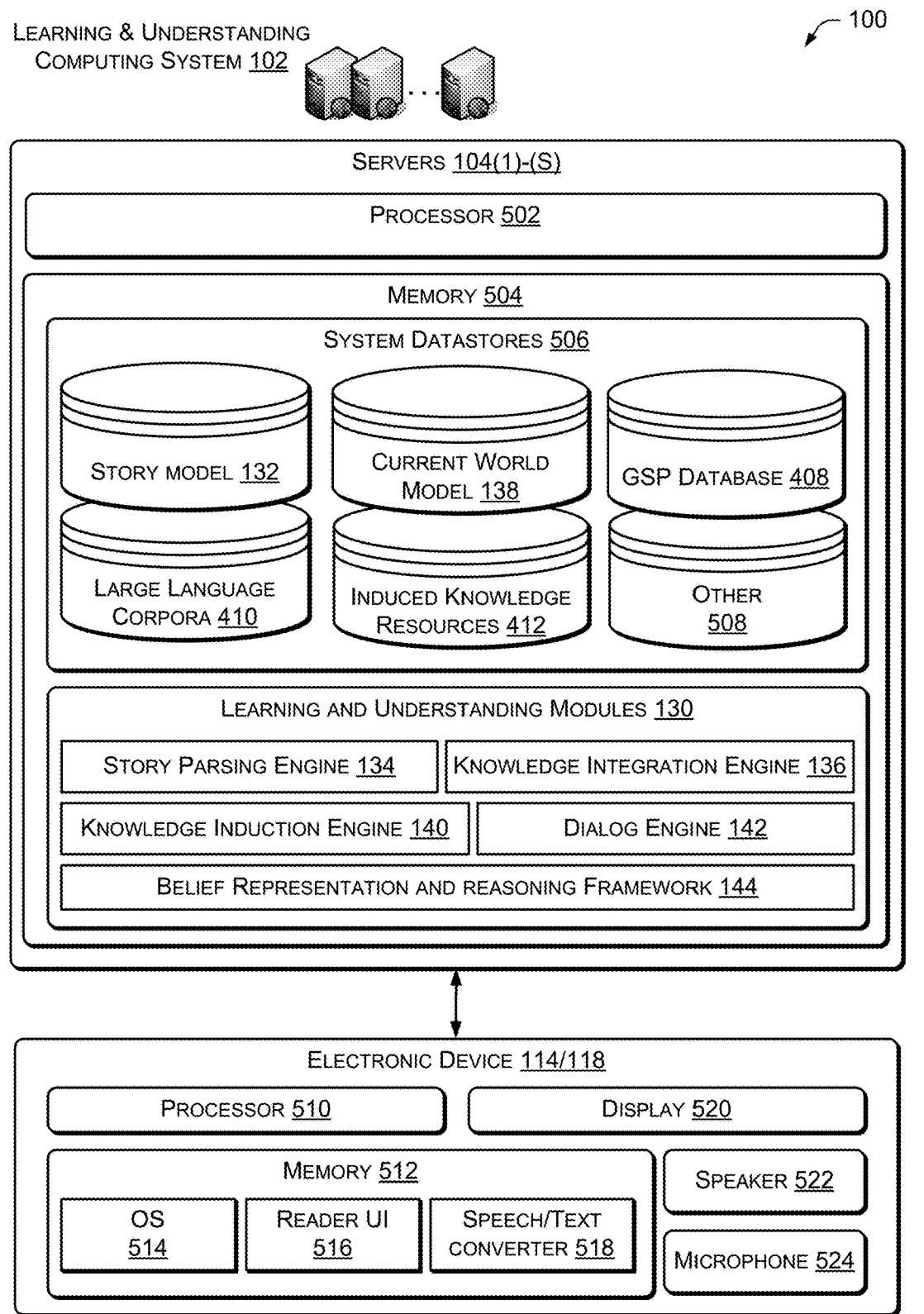
FIG. 5 is a block diagram of a computing system and illustrates select modules executed by the architecture of FIG. 1 to enable a computing system to read, build, and communicate a logical understanding of arbitrary text.

FIG. 5 shows one exemplary implementation of the architecture 100 in more detail, with the learning and understanding system 102 being implemented on the servers 104(1)-(S) and the user devices being implemented as an electronic device 114/118. The servers 104(1)-(S) collectively provide processing capabilities 502 and memory 504. The memory 504 may include volatile and nonvolatile memory, removable and non-removable media implemented in any type or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

Stored in the memory 504 are system datastores 506, which define multiple databases for maintaining data structures, datasets, text strings such as stories, language corpora, and the like. In this example, the datastores 506 include the story model 132, the current world model 138, the database of semantic primitives 408, the large language corpora 410, the induced knowledge resource repository 412, and other possible datastores 508.

The learning and understanding modules 130 are shown embodied as software modules stored in the memory 504 and executable by the processor 502. The learning and understanding modules 130 include the story parsing engine 134, the knowledge integration engine 136, the knowledge induction engine 140, the dialog engine 142, and the belief representation and reasoning framework 144. Each module may be separately invoked and executed to process data pulled from one of the system datastores 506 or to produce output data that is stored back in one of the system datastores 506.

The servers 104(1)-(S) communicate with one or more collaborator devices 114(1)-(C) and/or one or more student devices 118(1)-(D), as represented as device 114/118 in FIG. 5. The device 114/118 has a processor 510 and memory 512 (e.g., volatile, non-volatile, etc.). An operating system 514, a reader user interface (UI) 516, and a speech/text converter 518 are stored in the memory 512 and executed by the processor 510. The electronic device 114/118 includes a display 520 to depict the reader UI 516 so the human user can read the stories and interact with the computing system 102 during a dialog session in which the users ask questions of the computing system 102 and the computing system asks questions of the users.

The device 114/118 may support other modes of interaction, including presenting the stories audibly by converting the text to speech in the speech/text converter 518 and outputting the audio through a speaker 522. The user may then listen to the story, rather than read it. The user may also verbalize questions and answers by speaking responses that are captured by a microphone 524 and converted to text strings by the speech/text converter 518. While screens, keyboards, speakers/microphones are discussed, the device may include essentially any other I/O device to facilitate interaction between the human and the computer system.

Figure 6:
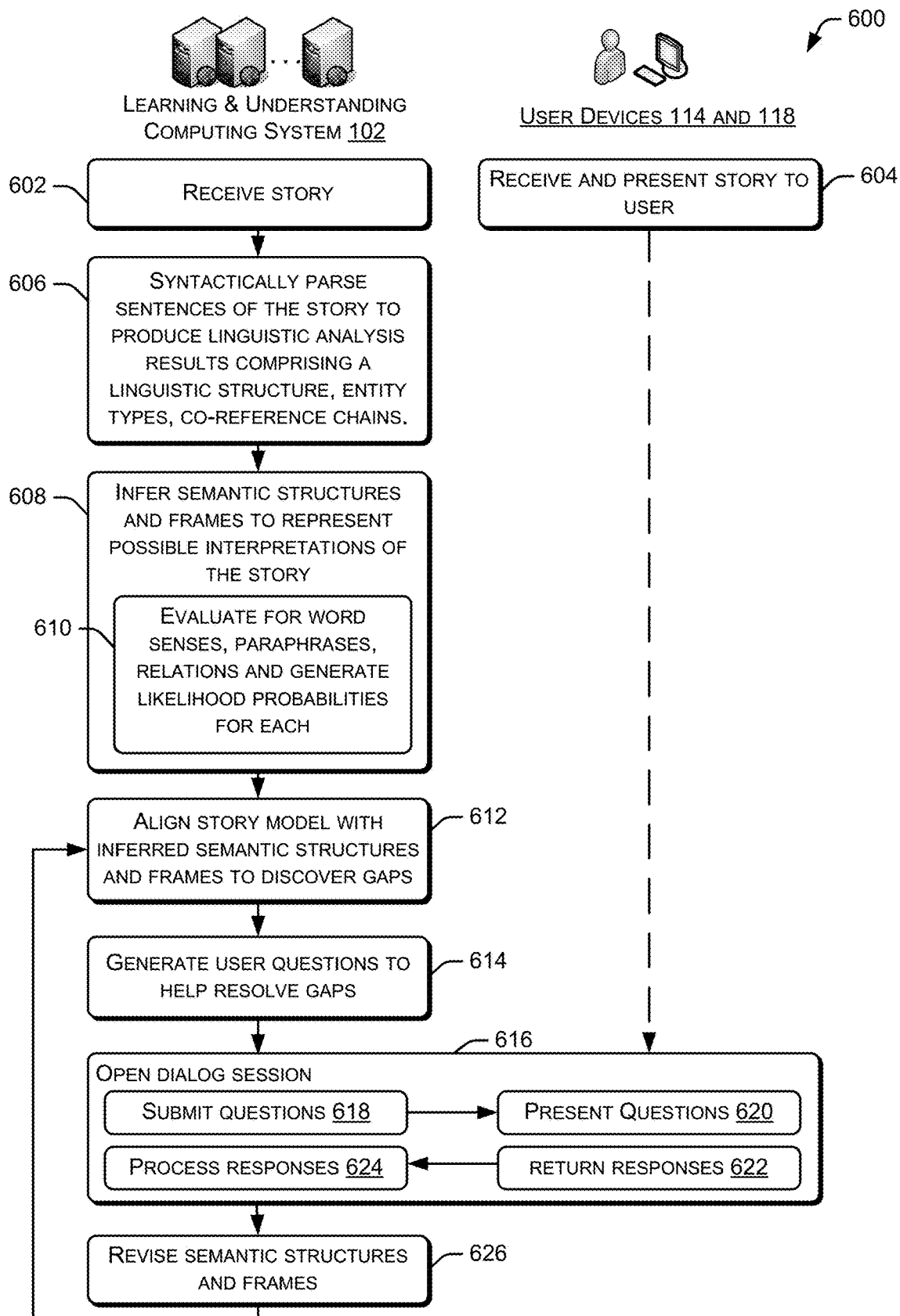
FIG. 6 is a flow diagram of a process for learning and understanding texts that may be implemented by the architectural components of FIG. 4.

FIG. 6 shows an exemplary process 600 implemented by the architecture 100, and more particularly, the learning and understanding modules 130 of FIGS. 4 and 5, to ingest text-based stories, infer an understanding of those stories, and engage humans in dialog to test that understanding of the stories. At 602, the story (or text string) is received by the computing system. The same story is also shared with the user and presented on the user device, at 604. For sake of discussion, suppose the story read by both the computing system and the user is the Ben and Ava story 106(1).

At 606, the story is parsed to produce a syntactic representation of the story. The syntactic parsing may be performed on sentences, clauses within a sentence, or other multi-word text strings. In the architecture 100, the story parsing engine 134 performs the syntactic parse and outputs linguistic analysis results that include a linguistic structure holding the words of the sentence that are tagged or annotated with syntactic labels describing the words and a predicate argument structure defining relationships amongst the words. The linguistic analysis results may further include entity types assigned to words in the sentence and co-reference chains. In our story example, the syntactic parse may generate a linguistic structure that identifies the word "brought" as having a root form "bring", which is the verb predicate in the sentence. The word "Ben" is determined to be the subject argument and the word "food" is the object argument. Further, "Ben" is typed as a person and "food" is typed as nutrition (for example). Finally, the words "food" and "spaghetti" may be assessed as belonging to a common co-reference chain.

At 608, semantic structures and frames containing them are inferred to represent possible interpretations of the story.

In one implementation, the knowledge integration engine 136 infers the semantic structures by semantically processing the linguistic analysis results received from the syntactic parse in view of pre-established background knowledge. For instance, the background knowledge may be embodied in part as pre-formed uninstantiated structures of generative semantic primitives stored in the database 408 that provide common associations or relations for words/phrases found in the parsed sentence. The uninstantiated GSP structures are selected from the database and instantiated using elements from the syntactically parsed sentence. The knowledge integration engine 136 may further select and instantiate frames that are each composed of multiple instantiated GSP structure instances to provide an even higher level of interpretation, thereby potentially enabling a deeper understanding.

Continuing the example of the Ben and Ava story, an uninstantiated GSP structure corresponding to the action may be selected and instantiated with information from the syntactically parsed sentence. For example, the GSP structure's reifier role may be filled with the event entity referred to by the word "bring" (reifier: story/bring), the agent role with the entity referred to by the word "Ben" (agent: story/Ben), and an after-state with a nested proposition relating the fact that Ava possesses the food. This nested proposition is itself a GSP corresponding to the concept of possession, and may have a possessor role with the entity referred to by the word "Ava" (possessor: story/Ava) and a possession role with the entity referred to by the word "food" (possession: story/food). The generality of the GSP structures is due to their compositionality, which relies in part on the ability of the system to nest one GSP structure within another. As evident from this example, the current linguistic interpretation of the sentence is enhanced to a deeper level of understanding by adding in likely relationships of who brought what to whom, and what is the state after this action. This additional semantic information provides a richer understanding.

As other GSP structures are instantiated for the sentences of the story, a frame inference process is performed, in which relevant frames are retrieved and aligned with the story. For instance, in the Ben and Ava story, a restaurant frame may be retrieved, and Ben may be aligned to waiter and Ava to customer. New beliefs are then asserted from the frame, for instance that Ben brought the bill and Ava paid the bill. The set of frame alignments is evaluated such that a higher score is given when a small number of frames match a large number of beliefs extracted from the story. Also, a set of frame alignments may alternatively score poorly if beliefs predicted by frames are contradictory with the system's other beliefs about the story.

At 610, as part of the inference operation, other semantic information about the words/phrases in the sentence may be produced to provide one or more probable ways to interpret the words/phrases. For instance, in one approach, the knowledge integration engine 136 may query the knowledge induction engine 140 to provide such semantic information as word sense, paraphrases, relations, scene analysis, and so forth. The generated results may be returned with associated probabilities so the knowledge integration engine 136 may choose the more likely candidates to make more accurate inferences and the dialog engine 142 can eliminate use of low probability candidates to avoid asking seemingly wrong or unintelligent questions.

In the Ben and Ava story, the knowledge induction engine 140 may perform word sense disambiguation for the word "brought" or its root form "bring". Through disambiguation, several possible senses of the word "bring" might be discovered, such as: (1) take something or somebody with oneself somewhere; (2) cause to come into a particular state or condition; or (3) present or set forth legally. Other analyses may provide other resources, such as the phrase "served the meal" may be a paraphrase of "brought the food". The knowledge induction engine 140 may further provide probabilities associated with these results to assist in selecting the appropriate one. The word "bring" may, for example, be more likely associated with the first sense (i.e., take something or somebody with oneself somewhere) as opposed to the third sense (i.e., present or set forth legally) when appearing in the corpora.

At 612, the story is evaluated with respect to the frames retrieved from the current world model to discover areas where the story model does not contain a high-confidence semantic representation that fits well with the known frames in the current world model, or identify inferences with low probabilities that should be validated by human users. In this way, possible gaps that might exist between what is currently known in the story and what is represented in the instantiated frames may be ascertained, revealing information that should or could be added to a GSP structure or frame. With respect to the Ben and Ava story, for example, the alignment operation may discover that there are multiple senses of "bring" (for the verb "brought" in the story) with sufficient likelihood scores that raises a doubt as to which to choose. In these situations, consultation with humans can help remove the doubt.

At 614, one or more questions may be formulated to resolve the gaps or challenge inferences. The questions, when asked of the user, are intended to evaluate how well the current semantic structures and frames represent the story, particularly in cases where the computer system is less confident of its current understanding. This operation may be performed, for example, by the dialog engine 142 working in cooperation with the knowledge integration engine 136. For instance, in the Ben and Ava story, suppose the knowledge integration engine 136 initially determines that the sentence "Ben brought the food to Ava" involves an action semantic structure containing the verb "bring". One question that might be formulated is to ask a person whether the verb "bring" should be considered an action, and hence be associated with an action semantic structure. That question might be crafted, for example, as "I think 'bring' refers to an action, that something is different after the bring action happens. Is that correct?" In other situations, there may be a lack of clarity around a word sense. For instance, the knowledge induction engine 140, when queried, may inform the knowledge integration engine 136 that the word "bring" has multiple senses, as noted above. Accordingly, the dialog engine 142 may formulate a question that attempts to resolve this issue. One suitable question may be crafted like the one shown in UI 126 in FIG. 1, as follows:

Here is a sentence I'm trying to understand:
 Ben brought the food to Ava.
What choice below uses the word "bring" most similarly to the sentence above?
1. Take something or somebody with oneself somewhere.
2. Cause to come into a particular state or condition.
3. Present or set forth legally.

At 616, a dialog session is opened with the user. During the session, the structured questions are submitted from the computing system 102 to the user device 114/118, at 618. At 620, the questions are presented for consumption by the human user (e.g., visually and audibly). The user examines the questions and provides his or her input, which is captured and returned to the computing system 102, at 622. For instance, the user may review the question above, and decide that option 1 (i.e., take something or somebody with oneself somewhere) is the correct response. The user responses are received and processed by the computing system from the user device, at 624.

At 626, one or more of the semantic structures and/or frames are revised based on the responses received from the human user to develop a different interpretation of the story. The story model may then be realigned with the revised semantic structures and frames (act 612), and new questions generated (act 614) for another dialog session (act 616).

The process 600 may be continued until a sufficient confidence level is computed for the aligned story model. In one implementation, confidence scores are computed for instantiated semantic structures that provide the semantic representation of each word/phrase in the story. As each is tested within the various semantic structures by engaging in dialog with the user, the confidence scores tend to improve. At that point, the story model 132 may be output as an accurate understanding of the story. It contains a full semantic representation of the story, and the system can index the story for future recall or use in understanding other texts.

Illustrative Story Parsing Engine

Figure 7:
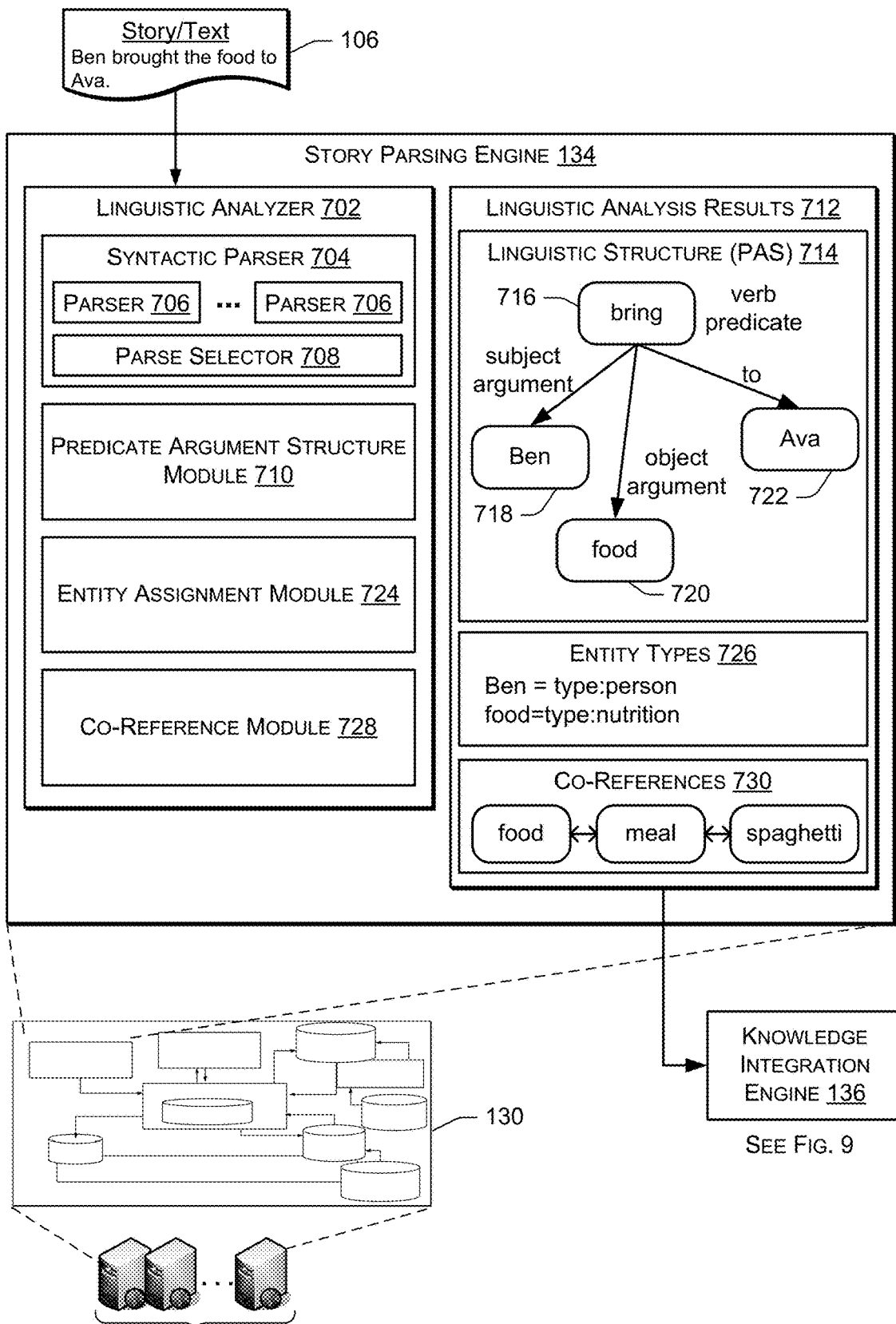
FIG. 7 is a block diagram of one example implementation of a story parsing engine employed by the architecture of FIG. 1.

FIG. 7 shows one implementation of the story parsing engine 134, illustrating select components that may be used to process a text string, such as a story. The story parsing engine 134 is configured to propose multiple possible linguistic analysis results, and to pass those results onto the knowledge integration engine, which calculates a joint distribution over the results using joint inference. The story parsing engine 134 ingests a story 106 and passes a digital representation of the story 106 to a linguistic analyzer 702 for natural language processing (NLP). The linguistic analyzer 702 receives the story 106 and breaks the story into digestible segments, such as words, phrases, sentences, or other definable text-strings. The linguistic analyzer 702 has a set of NLP components that perform various language analyses on the text strings. A syntactic parser 704 identifies the parts of speech of words and the grammatical relationships between them in a sentence. In one implementation, the syntactic parser 704 is implemented in part by using the Stanford CoreNLP package for syntactic parsing.

In some implementations, the story engine 134 may employ a single parser which outputs multiple possible parses for a sentence or multiple parsers 706 to provide parsing diversity. A parse selector 708 may be used to choose or merge the parse results according to desired applications, with the goal to ultimately improve parse accuracy for the given applications. In other implementations, there may be no parse selector, but rather the multiple parse results will be passed to the knowledge integration engine 136, which will determine the confidence in each parse result jointly with the confidence in the semantic and frame structures, as described below in more detail.

The linguistic analyzer 702 of the story parsing engine 134 also includes a predicate argument structure (PAS) module 710 that produces a parser-neutral representation of predicates and their instantiated arguments which serve as primitive beliefs on which other analysis components operate. The PAS module 710 transforms a parser-specific representation of grammatical relations to a common representation of predicates and arguments so that grammatical information produced by different parsers can interoperate in the system. In the transformation process, the PAS module 710 also performs certain normalization procedures, such as changing passive voices into active, and simplifies the representation by removing certain grammatical relations that are not central to processing of the sentences. For instance, following the syntactic parse of the sentence "Ben brought the food to Ava" in the story 106, the PAS module 710 recognizes that "brought" or its root form "bring" is the main predicate (verbal predicate in this case), and that "Ben" is the subject argument and "food" is the object argument. The PAS module 710 tags or otherwise marks these words with the appropriate labels. In one particular implementation, the PAS module 710 is configured on top of the syntactic parser 704; in other implementations, the syntactic parser 704 and PAS module 710 may be implemented as a common executable module.

As shown in FIG. 7, the linguistic analyzer 702 outputs a set of linguistic analysis results 712 that will be passed from the story engine as an input to the knowledge integration engine 136. One part of the linguistic analysis results 712 is a linguistic structure 714 produced by the syntactic parser 704 and the PAS module 710 of the linguistic analyzer 702. The linguistic structure 714 is embodied as a data structure containing the words of the sentence, the syntactic labels of the words, and PAS relationships amongst the words. The data structure 714 is illustrated in FIG. 7 using a tree-like visualization in which key words are represented as nodes and their relationships represented by interconnecting branches. Continuing the example sentence "Ben brought the food to Ava", the word "bring" (i.e., the lemma form of "brought") is shown as node 716 and identified as a verb predicate. The word "Ben" is represented as node 718 and tagged as the subject argument relative to the verb predicate "bring". The word "food" is represented as node 720 and marked as the object argument relative to the verb predicate "bring". The word "Ava" is represented by node 722 with a relationship to the verb predicate "bring" indicating that Ava is the target of the bring predicate.

The linguistic analyzer 702 further includes an entity assignment module 724 to assign entity types to the various words in the sentence. The types are predetermined categories from one or more applicable ontologies. Essentially any semantic type can be defined, but common types might include person, country, location, furniture, sport, etc. In our example, the entity assignment module 724 assigns a "person" type to the word "Ben" and a "nutrition" type to the word "food", as illustrated in the entity type data structure 726. In one implementation, the entity assignment module 724 may be implemented using the named entity recognizer in the Stanford CoreNLP package, which is used to automatically annotate entity types. Another implementation may involve use of a word sense disambiguation component that assigns types based on the WordNet hierarchy to the words in the sentence.

The linguistic analyzer 702 also has a co-reference module 728 that identifies co-references of words/phrases in the sentence. Co-references are words/phrases that, although not necessarily lexically identical, refer to the same real world entity. In this example, suppose the story 106 had other sentences including the words "food", "meal", and "spaghetti". The co-reference module 728 might identify these words/phrases as meaning the same thing, and produce a data structure 730 that associates the words/phrases in some manner. The co-reference module 728 may identify entity co-references as well as event co-references. The linguistic analysis results 712 are delivered to the knowledge integration engine 136, which is described in more detail with reference to FIG. 9.

In another implementation, as the linguistic analysis results 712 are integrated into the story model, the joint inference engine 406 can further leverage downstream the linguistic analysis results to re-compute the likelihood of upstream results as they apply to natural language processing (NLP) analysis. The story parsing engine 134 considers higher level semantic information and world knowledge in scoring alternative parses that is derived from frame-level knowledge inferred over a whole story. That is, the story parsing engine 134 can utilize the higher level downstream knowledge to re-compute the likelihood of alternative parses. In addition, this ability to dynamically re-compute likelihood strengthens over time as the system accumulates more knowledge in the current world model 138.

Figure 8:
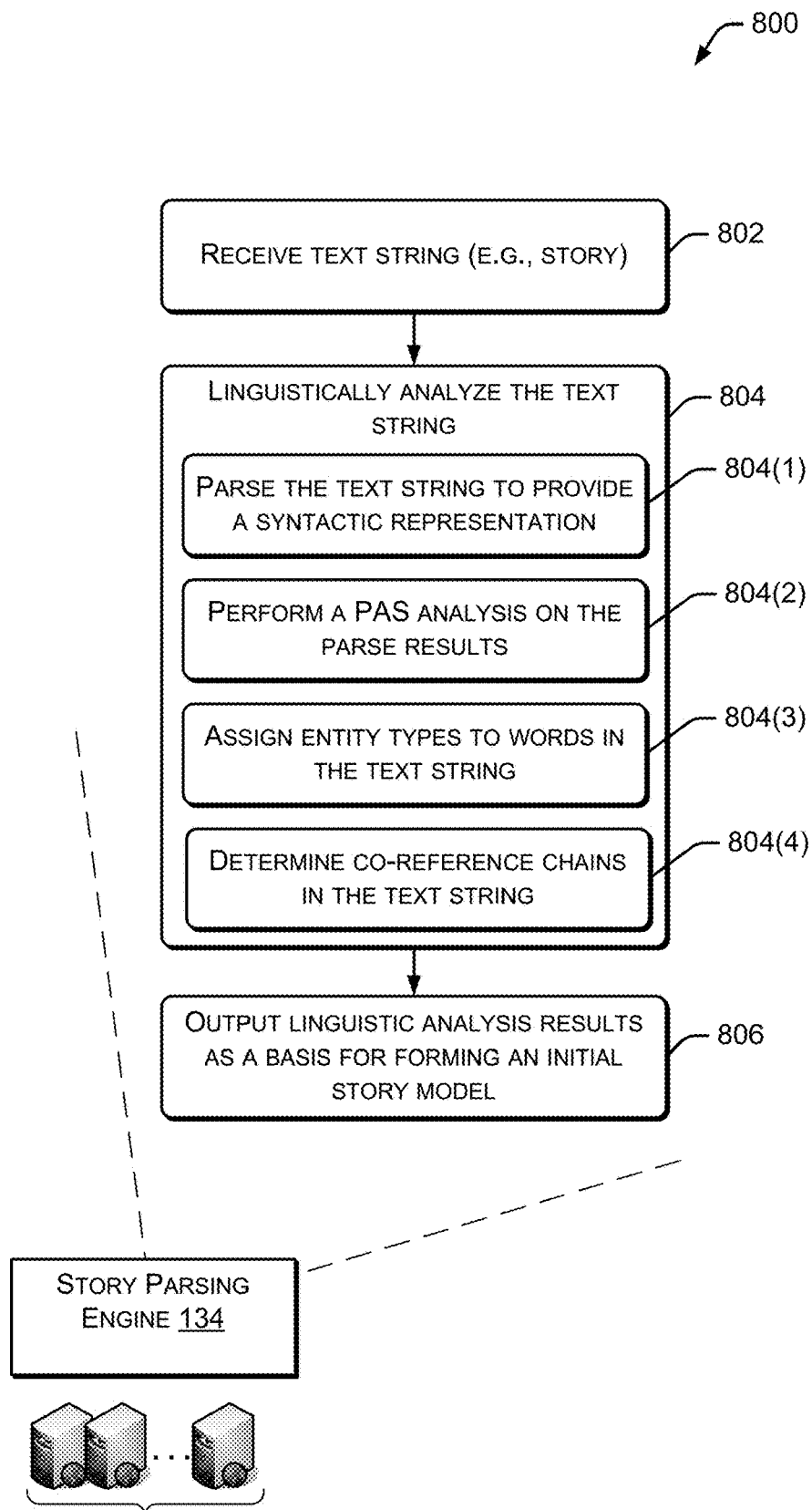
FIG. 8 is a flow diagram of a process for syntactically processing text strings, such as sentences, in a story.

FIG. 8 shows an exemplary process 800 that is executed by the story parsing engine 134 to syntactically process an incoming story. The process 800 is described with reference to the system architecture 100 and the story parsing engine 134 of FIGS. 1, 4, 5, and 7. At 802, a text string is received. The text string may be part of a story and representative of one or more natural language sentences in the story. At 804, the text string is linguistically analyzed. In one approach, this involves multiple sub-operations represented by acts 804(1)-(4).

At 804(1), the text string is syntactically analyzed to develop a syntax representation of the words in the sentences. With reference to FIG. 7, the linguistic analyzer 702 invokes one or more syntactic parsers 704 to parse the text string, thereby producing a linguistic structure 714 that provides grammar relationships amongst the words. At 804(2), a predicate argument structure (PAS) analysis is performed to transform the parse representation into a parser-neutral PAS representation. As one approach, the predicate argument structure module 710 tags or otherwise marks certain words within the sentence as a predicate and one or more arguments. These designations are stored and reflected in the data hierarchy of the linguistic structure 714.

At 804(3), entity types from an appropriate ontology are assigned to words in the text string. Entity types are predefined (e.g., person, place, thing, etc.). The entity assignment module 724 identifies possible entity types for each word in the text string based on contextual and ontological information, and tags the word with the entity type. The entity assignments are maintained in a data structure 726 that forms part of the linguistic analysis results.

At 804(4), any co-reference chains in the text string are also determined. Whereas each sentence or logical text segment may have an associated linguistic structure, co-reference chains are formed by examining the whole story to find words/phrases that are refer to common real world entities. This act 804(4) may be performed, for example, by the co-reference module 728 by examining the words and phrases throughout the text string and identifying words that form co-reference chains based on semantic and contextual information. Any discovered co-references are stored in a data structure 730.

Together, the linguistic analyses at 804(1)-(4) produce a set of linguistic analysis results 712 including the linguistic structure 714, the entity type structure 726, and the co-references structure 730. It is further noted that in some implementations, linguistic analyzer 702 may produce multiple linguistic analysis results for the same sentence. For instance, suppose the analyzer 702 is processing the sentence, "The cat caught the mouse because it was clever." When trying to characterize the term "it" for syntax reasons or for co-reference chains, there may be more than one answer because "it" may refer to the "cat" or to the "mouse." At this stage, since there is not yet additional semantic knowledge, the story parsing engine may output both possibilities to be resolved downstream by the knowledge integration engine.

At 806, the linguistic analysis results 712 may be input to the knowledge integration engine 136. The linguistic analysis results 712 may be incrementally outputted as completed or sent in batch to describe the entire story 106. The linguistic analysis results are subsequently semantically analyzed to produce an initial story model comprising a set of generative semantic primitives.

Illustrative Knowledge Integration Engine

Figure 9:
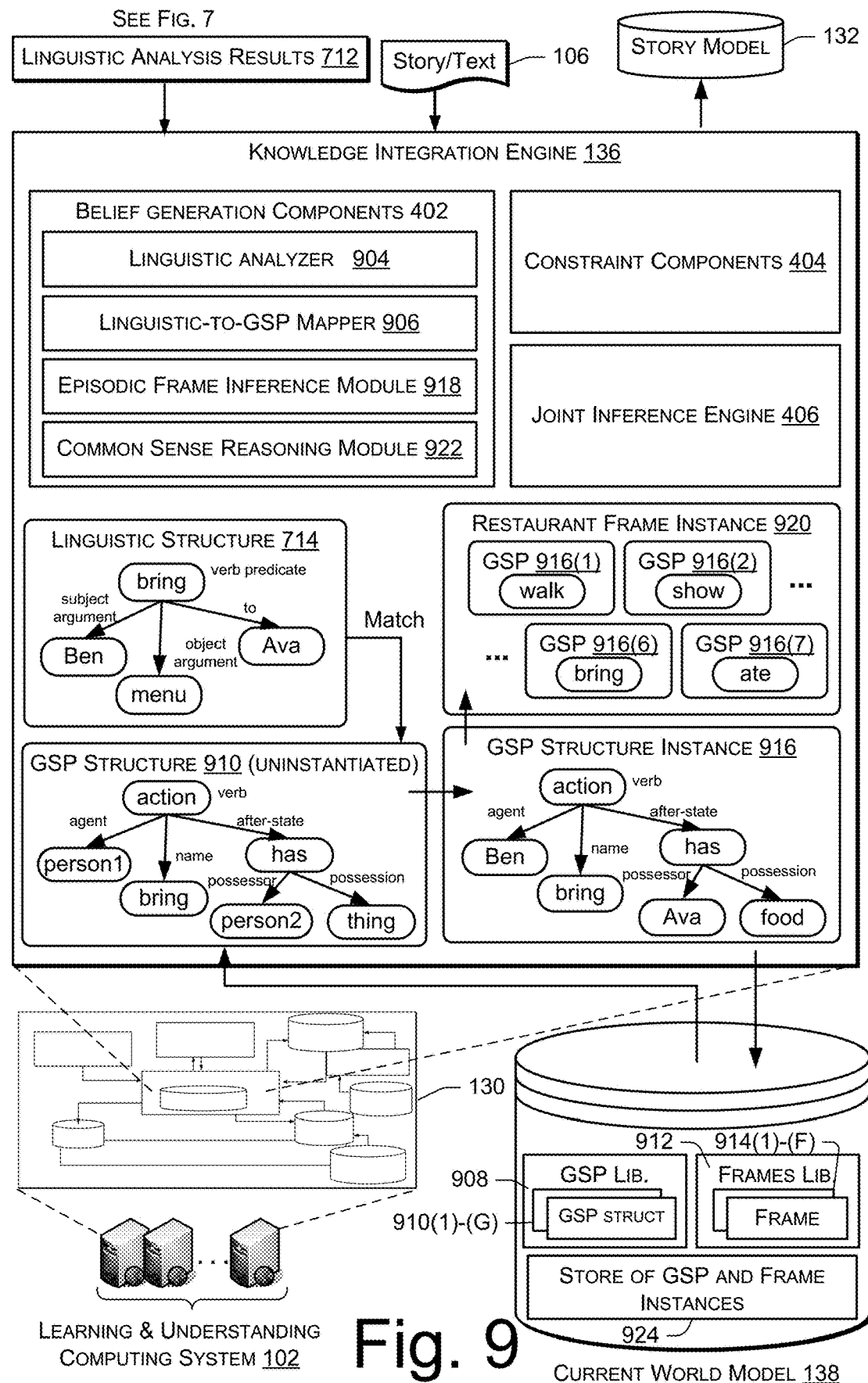
FIG. 9 is a block diagram of one example implementation of a knowledge integration engine employed by the architecture of FIG. 1.

FIG. 9 shows an exemplary implementation of the knowledge integration engine 136, illustrating select components that may be used to semantically process the linguistic analysis results 712 of the story 106. The linguistic analysis results 712 are created by the story parsing engine 134 from the ingested story and passed to the knowledge integration engine 136 (along with the story 106) to initially build a story model 132 representing the story. The knowledge integration engine 136 builds the story model 132 as a probabilistic semantic representation of the story that makes sense with respect to the system's current knowledge as captured in the current world model 138.

The knowledge integration engine 136 is a set of highly configurable and flexible executable components that evolve the story model 132 over time through joint inference and human interaction to develop the meaning of the story by aligning the story model 132 with the current world model 138. The knowledge integration engine 136 infers relevant semantic structures that take in the linguistic analysis results 712 of sentences in the story and begin to provide meaning for those sentences. With joint inference, the knowledge integration engine 136 combines multiple levels of interpretation, thereby interpreting the text at various levels of conceptual richness. As noted above, higher levels of interpretation are richer, but also more implicit and therefore harder to discover. The first level of interpretation is recognition of the explicit natural language text found in the story. The second level of interpretation concerns the linguistic analysis performed by the story parsing engine 134. The next two levels of interpretation—semantic analysis to provide generative semantic primitives (i.e., level three) and frame semantics (i.e., level four) are performed by the knowledge integration engine 136 (with the help of the knowledge induction engine 140, the dialog engine 142, and framework 144) to discover meaning implicit in the story.

In FIG. 9, the knowledge integration engine 136 has a joint inference engine 406 that can operate in a variety of ways. In one implementation, the joint inference engine 406 proposes multiple possible "worlds", where each world has a set of beliefs that are considered true. The belief generation components 402 are iteratively run on worlds, observing the beliefs that are true and proposing distributions over new beliefs. New worlds are created by drawing beliefs from those probability distributions. The constraint components 404 are run to evaluate the probability of worlds. When the process is finished, the marginal probability of a belief is the sum of the probability of the worlds in which it is true. Since the marginal probabilities do not capture the relationships between probabilities of beliefs, the system may also store the worlds themselves as part of the story model 132. Further, this may alternatively be accomplished for instance through techniques such as a Markov chain or Monte Carlo sampling.

In one non-limiting approach, the belief generation components 402 include a linguistic analyzer 904, which produces probability distributions over beliefs that express the linguistic structure of each sentence or phrase within the linguistic analysis results 712, such as predicate argument structure (PAS), word senses, entity types, and co-references. For example, the linguistic analyzer 904 may receive a world containing the belief that the text, "The bat was flying toward him" was true, and output a probability distribution containing the belief that the bat was an animal with 80% probability and a baseball bat with 20% probability.

The belief generation components 402 may further include a linguistic-to-GSP mapper 906 that, based on information such as PAS and word senses, produces probability distributions over instantiated GSPs that represent possible semantic interpretations of the text. The linguistic-to-GSP mapper 906 may use the frame inference process discussed above, making use of frames from the current world model 138 that each contain a mixture of linguistic analysis result propositions and GSP propositions. Continuing the previous example, the linguistic-to-GSP mapper 906 might receive a world in which a bat was an animal and was the subject of the verb "flying", and produce a probability distribution with 99% probability in a GSP where the bat was the agent of the flying action and a 1% probability that it was not (i.e., it was propelled towards him by some other means, like in the baseball bat case). As represented in FIG. 9, the current world model 138 maintains libraries of the GSP and frame semantic structures initially in their uninstantiated state, including a GSP library 908 of uninstantiated GSP structures 910(1)-(G) and a frames library 912 of generic frame structures 914(1)-(F).

The GSP structures 910(1)-(G) in the GSP library 908 may be predefined to capture the meaning of various facts, situations, or circumstances. For instance, one GSP structure may express an action and the structure includes roles that define the action such as a reifier, an agent, what happens before the action, and what happens afterwards (i.e., elements of Reifier, Agent, Before, After). Other GSP structures might express an experience (with roles of Agent, Experience-relation (e.g., see, hear, etc.) and Stimulus), spatial location (with roles of Location-relation, Entity1, Entity2), temporal location (with roles of Temporal-relation, Event1, Event2), and possession (with roles of Owner, Possession).

The GSP structures 910(1)-(G) begin as uninstantiated concepts that correspond to a basic kind of fact. For instance, there is a GSP structure for spatial location that, when instantiated, provides meaning of a fact about spatial location. There is a GSP structure for temporal relation that, when instantiated, means a fact about temporal relations. Each uninstantiated GSP structure 910 has its own specific set of roles to be completed with information explicit or implicit in the story. The GSP structure for spatial relation has one role for a first object or location, another role for a second object or location, and a third role for specifying a spatial relationship between the first and second objects (e.g., near, on, in, above, below, etc.).

A word or phrase from the story may correspond to more than one instance of a GSP structure. For example, a single word can have a different GSP structure instance for each word sense. The word "fall" may have one instance of a GSP structure for one sense (e.g., like that found in the sentence "A big raindrop fell on Chloe's face."), a second GSP structure instance for another sense (e.g., like that found in the sentence "Chloe slipped and fell in the mud."), and a third GSP structure instance for yet another sense (e.g., like that found in the sentence, "The temperature fell ten degrees.").

Compound GSP structures may also be defined where at least one role of a structure is filled with another GSP structure. As an example, suppose there is a GSP structure for communication (e.g., roles of agent, recipient, message) and a second GSP structure for a goal (e.g., roles of agent, goal). The role of "message" in the communication GSP structure may be filled by the goal GSP structure. This forms a compound GSP structure that represents facts about communications where the message being communicated is itself about a goal of some agent. Such a compound GSP may correspond, for instance, to the natural language sentences, "Alice told Bob that Carol wanted a ticket." or, "'Pass the corn,' said Dan." The nested relationships discussed above with reference to certain structures are examples of compound GSP structures.

Figure 10:
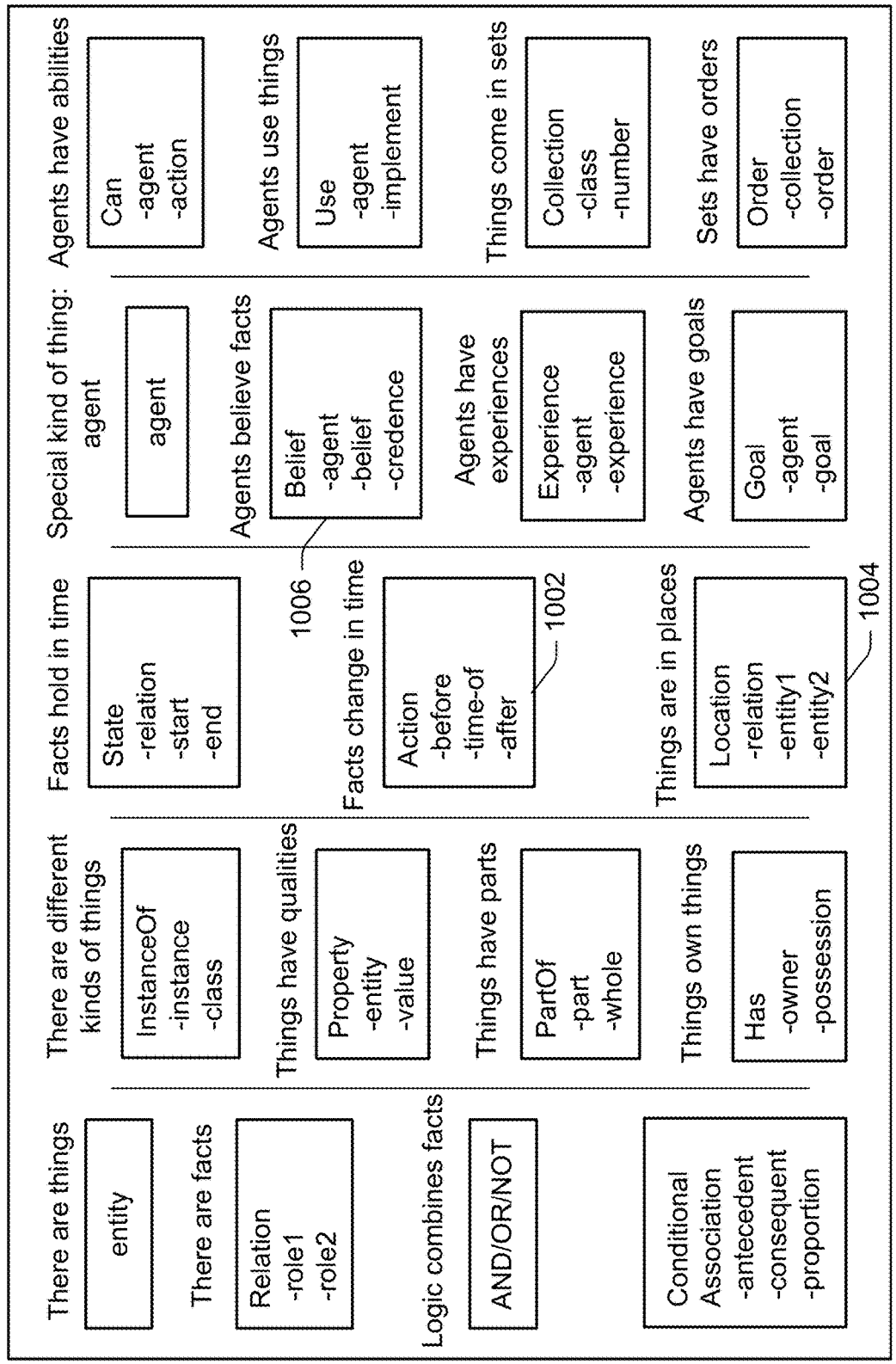
FIG. 10 shows an example set of generative semantic primitive structures that can be composed to express ranges of meaning for a corresponding text string (e.g., sentence).

FIG. 10 shows an example set 1000 of GSP structures 910 that can be composed to express ranges of meaning for a corresponding text string (e.g., sentence). There are many ways to establish how structures should be organized to express meaning In this example set 1000, basic structures might include an action structure 1002 to express a change in facts in time, which includes elements or roles of before, time-of, and after. There may be a location structure 1004 to express things found in places, which includes elements or roles of location, entity1, and entity2. As yet another example, there might be a belief structure 1006 that expresses what facts an agent believes, with roles of agent, belief, and credence.

With reference again to FIG. 9, a frame 914 is a probability distribution over propositions (such as GSPs) in a particular context. A simple case is a set of propositions that are likely to be true in a context, such as actions that typically occur in a particular place. A frame refers to various participants, actions, attributes, and other conceptual roles typically associated with the context. A frame 914 may be thought of as the thing formed by grouping together related experiences. In general, frames exist at different levels of abstraction. A frame could represent a specific episode in which entities refer to specific people, and equally a frame could represent a very abstract concept like friendliness in which little is known about the entities. In frames, entities referred to in some of the roles of the GSP structures may not be specific entities like Ben and Ava in the story, but rather more generic frame-specific roles like customer and waiter. For example, a restaurant frame may contain two GSP structure instances of action, including one action instance for the customer (with instantiated roles of Reifier: Sit; Agent:Customer; After:Location at table) and another action instance for the waiter (with instantiated roles of Reifier:Bring, Agent:waiter, After:Location of menu or food at customer).

Frames 914 can also refer to other frames. The restaurant frame, for example, can refer to an eating frame that defines a collection of GSP structure instances for an experience of consuming food and drink. Frames can also be arranged in a hierarchy so that a frame might inherit participants, actions and attributes from its parent frame. As one example, a fast food restaurant frame may be a child of a restaurant frame and inherit certain aspects of the restaurant frame. Frames may also be composed in a conflicting pattern. For example, in a restaurant frame, the guest pays for the meal. But, in a birthday frame, guests do not pay for their meal. Further to this latter example, frames can also say that propositions have low probability. For example, the more specific birthday frame might suggest a low probability that you pay the bill, wherein that probability is much higher in a regular restaurant frame.

The current world model 138 may initially include a library of manually curated semantic frames, such as the library "VerbNet". To prime the system, for instance, a set of verbs (e.g., the 100 verbs that children learn first) codified in the VerbNet library may imported into the current world model 138. Unfortunately, such hand curated resources do not scale. Thus, as the computing system learns, the current world model 138 is no longer manually created, but instead learns from processing background corpora and through dialog with the human students and collaborators.

In FIG. 9, the linguistic-to-GSP mapper 906 performs the frame inference process to identify a subset of uninstantiated GSP structures 910(1)-(G) stored in the current world model 138 that are likely to fit well together in the frames and to determine assignments of entities in the story to variables in the GSP structures. The goal is to map language from the linguistic structure to the GSP structure by defining various entities that the language refers to and determining what GSP structures hold true of the entities. In the illustrated example, the linguistic structure 714 has a verb predicate "bring" which may be determined to most closely match the uninstantiated GSP structure 910 for action. The match may be determined through a keyword match (e.g., "bring" in the linguistic structure 714 matches the word "bring" in this particular action GSP structure 910) or through other search strategies such as similarity, conceptual, and so forth. As shown, the action GSP structure 910 includes roles for reifier name (reifier:bring), an agent (agent:person1), and an after-state (after:has) with a nested proposition relating the fact that a possessor role (possessor:person2) has an associated possession role (possession:thing) In some implementations, the module 914 may identify and select multiple uninstantiated GSP structures that may match the linguistic structure 714. During the selection process, relevance or confidence scores may be calculated. GSP structures that score higher indicate structures that more closely match the linguistic structure 714.

After identifying one or more uninstantiated GSP structures 910, the linguistic-to-GSP mapper 906 instantiates the GSP structure with information from the linguistic structure 714 to produce a GSP structure instance 916. Here, the reifier role in the Ben and Ava story is identified as "bring" (reifier:bring), the agent role is identified as "Ben" (agent: Ben), the possessor role is identified as "Ava" (possessor: Ava), and a possession role is identified as "food" (possession:food). The GSP structure instance 916 is an instantiated version with as much information from the story as possible.

In some cases, there may not be all of the information to fully instantiate the structure, which gives rise to uncertainty that forms the basis for questioning human users as to their understanding of the story to help discover missing elements. Furthermore, in some cases, more than one GSP structure instance is instantiated from different GSP structures 910 to provide different possible meanings of the story excerpt. When multiple GSP structure instances are created from the same story excerpt and those instances have similar confidence scores, this also prompts the system to query the human users as to which possible meaning might be more appropriate in the story and thereby gain knowledge of how the users understood the excerpt.

As another example, suppose a text reads, "The boy is at the park." The linguistic-to-GSP mapper 906 may choose a GSP structure that handles entities called "boy" and "park", such as a location GSP structure with roles of object, relation, and location. The location GSP structure is instantiated to capture the meaning of the text by filling in the roles with the text information (e.g., object:boy; relation:at; location:park). If this sentence is modified slightly to "The boy went to the park", the linguistic-to-GSP mapper 906 may choose nested arrangement with a first action GSP structure having an agent "boy" and an effect, where the effect references a nested location GSP structure. Consider the sentence, "The girl asked her mother for a bike." This sentence may best map to a cascading nest arrangement with an instantiated compound GSP structure of a communication GSP structure (e.g., agent:girl; recipient:mom; message:goal structure), a goal GSP structure (e.g., agent:girl; goal:possession structure), and a possession GSP structure (e.g., possessor:girl; possession:bike).

In FIG. 9, the belief generation components 402 may further include an episodic frame inference module 918 that implements the frame inference process to retrieve one or more uninstantiated frames 914(1)-(F) from the current world model 138 that may be relevant to the current beliefs of the story. The frames are inferred in part based on the subset of GSP structure instances 916 that are identified to represent a possible semantic interpretation of the text. The episodic frame inference module 918 proposes probability distributions over episodic frames, aligns entities in the story to roles in the frame, and new beliefs are inferred from the frames. This process may occur iteratively to discover the frame hierarchy that explains the story. In the Ben and Ava story, for example, a restaurant frame 920, for example, may provide the implicit information that Ben and Ava are in a restaurant, thereby providing a theme or context within which to better understand the explicit language in the story. The restaurant frame 920 may be selected for this purpose as having a higher likelihood of being relevant to a story that involves people, a menu, food, and tables, as compared to possible other frames for hotels or pubs.

The restaurant frame 920 is then instantiated by the episodic frame inference module 918 to include multiple GSP structure instances 916 pertaining to the story. The restaurant frame, in its uninstantiated state, has general references to "customer", "waiter", and so forth. The episodic frame inference module 918 fills in the fields for this frame with the information from the story, such that the customer is aligned to Ava and the waiter is Ben.

In the Ben and Ava story example, there are seven sentences in the story and the seven sentences may be represented by at least seven, and likely more, corresponding GSP structure instances 916(1)-(7+). The first sentence in the story (i.e., "Ava walked in.") is represented by the GSP structure instance 916(1) with the primary action term "walk" being illustrated. The second sentence form the story (i.e., Ben showed Ava to a table.) is represented by the GSP structure instance 916(2) with the primary action term "show" being illustrated. In each illustrated instances 916(1), 916(2), . . . , 916(6), and 916(7), only the primary action (i.e., "walk", "show", "bring", and "ate") is shown, but this is meant to convey the entire structure instantiated with other facts from the story.

In one implementation, the episodic frame inference module 918 may search and identify multiple frames that have varying degrees of relevance. Each search returns a confidence or relevance score that may be used to select one or more frames. The frames to be ultimately chosen are expected to align with elements in the story in a way that best explains the story. For instance, the restaurant frame may be selected because the story involves people, menus, food, and tables. However, the module 918 may further identify a hotel frame, which too may be relevant to a story involving people, menus, food, and tables. Accordingly, the episodic frame inference module 918 may select both a restaurant frame and a hotel frame, with perhaps the restaurant frame having a higher relevance score than the hotel frame, but both having scores that exceed an acceptance threshold. In such situations, both frames are selected and instantiated and then used to generate questions for the human users to better understand which might be the best selection.

The belief generation components 402 may further include a common-sense reasoning module 922 that, given the GSPs already in the story model, produces new probability distributions over instantiated GSPs that represent further semantic interpretations of the text. For example, such reasoning may include numerical reasoning like counting and arithmetic, temporal reasoning like event ordering, and physical reasoning about parts and sizes of physical objects. The algorithms used in the common-sense reasoning module 922 may be specialized to particular GSPs (e.g., algorithms for counting the number of entities in the story model of various types) or may be generic application of the frame inference process to retrieve and apply deductive rules. It is further noted that as stories become more complex, many frames may be used to represent the story. This is analogous to scenes or episodes that come together to form the complete story.

The knowledge integration engine 136 further includes the constraint components 404 that implement the evaluation phase of the frame inference process that examines how well the possible frames and GSPs therein represent the story. In one implementation, the constraints components 404 produce a score for how well the set of frame alignments match the story. A higher score is given when a small number of frames match a large number of linguistic analysis beliefs extracted from the story. Conversely, scores are lower when the inferred beliefs are contradictory with the system's other beliefs about the story.

The joint inference engine 406 combines the output of all of the components in the system to effectively combine the different levels of interpretation. The joint inference engine 406 takes the output from the belief generation components 402 and the constraint components 404 and calculates the joint distribution over beliefs. The joint inference engine 406 calculates the marginal probability of each belief, which is used to construct and evolve the story model. The joint inference engine 406 may be configured to produce conditional probabilities for possible beliefs based on all beliefs as known at the time By combining the results of all of the components mentioned above, the joint inference engine 406 combines the different levels of interpretation. For example, consider the case where the story parsing engine 134 produces a probability distribution over predicate argument structure beliefs, where one of the predicate argument structure beliefs has low probability. If the linguistic-to-GSP mapper 906 determines that GSP using the predicate argument structure belief fit well with an episodic frame that also fit with the rest of the story, it would be given a high marginal probability by the joint inference engine.

The GSP structure instances 916 and the frame instances 920 created through this process may be stored in a store 924 in the current world model 138 to continue building the knowledge of the computing system. These instances may further be used to build new GSP structures and frames for future use in building an understanding of a story.

Figure 11:
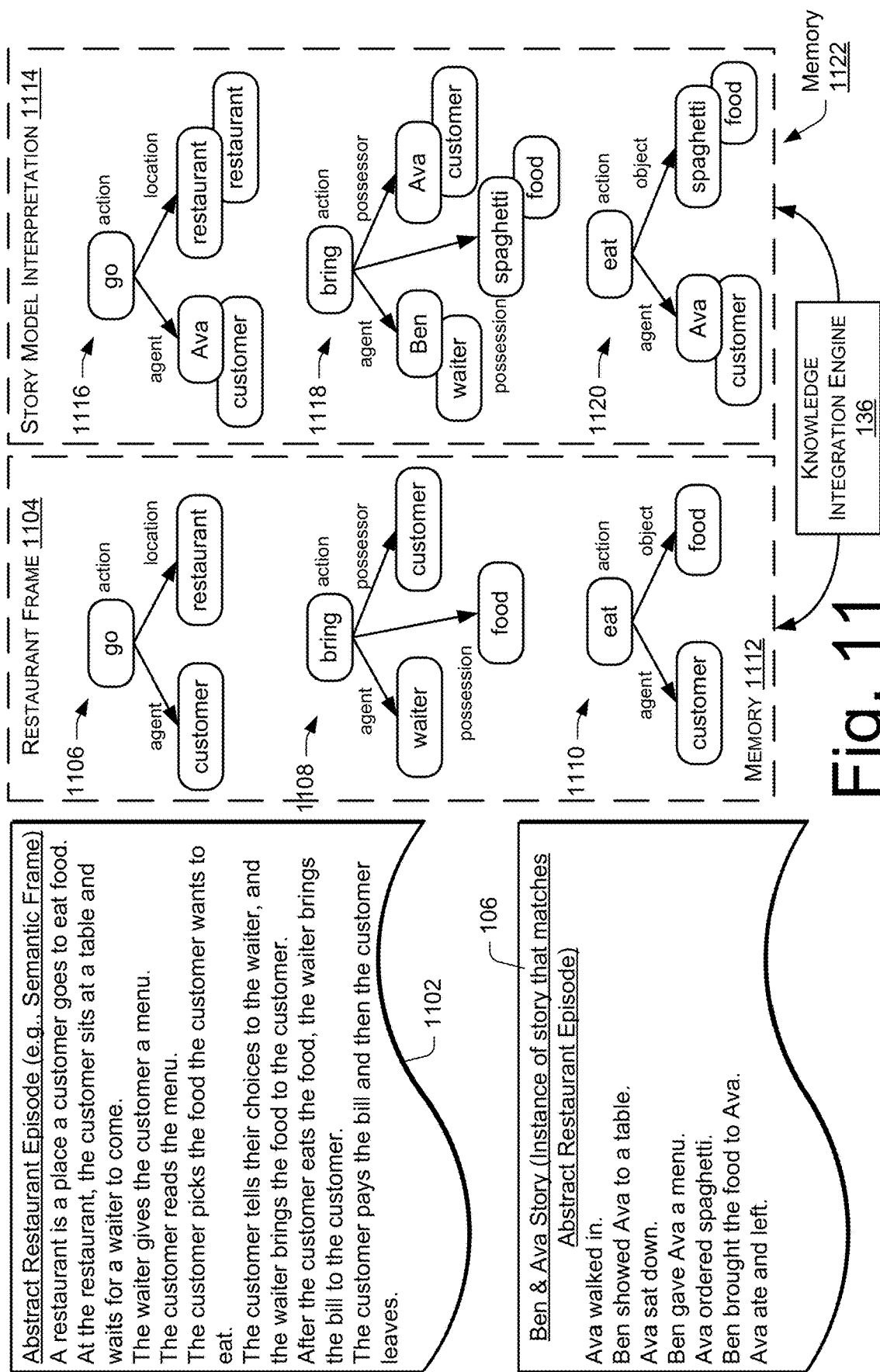
FIG. 11 illustrates an example story, an example episode, and example semantic structures to demonstrate how an alignment module of the knowledge integration engine of FIG. 9 aligns frame semantics with an evolving story model to improve understanding of the story.

FIG. 11 illustrates how the knowledge integration engine 136 uses frame inference to improve the understanding of the story. In this example, the Ben and Ava story 106 is shown along with an abstract restaurant script or episode 1102, which may be represented by an uninstantiated restaurant frame structure 1104 to describe the episode within a unified theme or concept. Here, the episode 1102 provides background knowledge of what happens in a restaurant, as follows:

A restaurant is a place a customer goes to eat food.
At the restaurant, the customer sits at a table and waits for a waiter to come.
The waiter gives the customer a menu.
The customer reads the menu.
The customer picks the food the customer wants to eat.
The customer tells their choices to the waiter, and the waiter brings the food to the customer.
After the customer eats the food, the waiter brings the bill to the customer.
The customer pays the bill and then the customer leaves.

The restaurant frame 1104 is composed of multiple generative semantic primitives that are relevant to the sentences of the episode 1102. In FIG. 11, three uninstantiated action GSP structures 1106, 1108, and 1110 are shown for discussion purposes. The action GSP structures 1106, 1108, and 1110 are embodied as data structures maintained in memory locations of the current world model 138, as represented by memory location 1112. The first action GSP structure 1106 represents part of the opening sentence in the episode 1102, which says "A restaurant is a place a customer goes to eat food." The action GSP structure 1106 includes the action role "go" (reifier:go) at a root node of the data structure, an agent role "customer" (agent:customer) at a first dependent node, and a location role "restaurant" (location:restaurant) at a second dependent node. The action GSP structure 1108 represents the second clause of the sixth sentence of the episode 1102, which reads, " . . . and the waiter brings the food to the customer." The action GSP structure 1108 includes the action role "bring" (reifier:bring) at a root node of the data structure, an agent role "waiter" (agent:waiter) at a first dependent node, a possession role "food" (possession:food) at a second dependent node, and a possessor role "customer" (possessor:customer) at a third dependent node. The third illustrated GSP structure 1110 represents the first clause of the seventh sentence of the episode 1102, which reads, "After the customer eats the food . . . ". The action GSP structure 1110 has an action role "eat" (reifier:eat) at a root node of the data structure, an agent role "customer" (agent:customer) at a first dependent node, and an object role "food" (location:food) at a second dependent node. Notice that the various action GSP structures 1106, 1108, and 1110 begin with generic labels in the various nodes of the data structure (e.g., customer, waiter, food, etc.).

The knowledge integration engine 136 aligns the frame semantics in frame 1104 with a story model interpretation 1114 to improve understanding of the story 106. In this example, the frame structure is instantiated with specifics from the Ben and Ava story 106 to form instantiated GSP structure instances 1116, 1118, and 1120 that correspond to the uninstantiated GSP structures 1106, 1108, and 1110, respectively. In instantiated GSP structure instance 1116, the argument of the agent role is the story entity "Ava" in place of the generic placeholder "customer". Since there is no more specific information in the story about a type or name of the restaurant, the location role maintains the generic label "restaurant".

For the instantiated GSP structure instance 1118, the agent role of the generic placeholder "waiter" is replaced with the story-specific entity "Ben". The possessor role assumes the story-specific entity "Ava" in place of the generic label "customer". The story entity "spaghetti" also replaces the generic label "food" in the possession role. Similarly, for the instantiated GSP structure instance 1120, the agent role of "waiter" is replaced with "Ava" and the object role of "food" is replaced with "spaghetti". It is noted that the knowledge integration engine 136 may consider multiple possible alignments. The knowledge integration engine 136 estimates the confidence scores with which each alignment fits with the story. For example, the alignment with Ava as customer and Ben as waiter is a better fit for the story then Ava as waiter and Ben as customer. More specifically, higher scores are given when a small number of frames match a large number of beliefs extracted from the story. Furthermore, a set of frame alignments will score poorly if newly predicated beliefs are contradictory with the system's other beliefs about the story. Approaches to estimating confidence scores are context dependent and task related, and hence may vary depending upon the situation. The instantiated GSP structure instances 1116, 1118, and 1120 are embodied as data structures maintained in memory locations of the current world model 138, as represented by memory location 1122.

While the computing system's understanding of the story is now richer than a basic syntactic parse, there may still be more to learn about the story. The knowledge integration engine 136 may access induced knowledge resources provided by the knowledge induction engine 140 to continue to learn more about words and phrases used in the story. Additionally, the knowledge integration engine 136 may further invoke the dialog engine 142 to engage human users to help resolve any discrepancies or gaps in the instantiated data structures or ultimately choose among multiple possible semantic structures that could plausibly explain the story. The knowledge integration engine 136 may further work with the framework 144 to build modified and newer versions of the GSP structures and frames that are maintained in the current world library 138 based on what has been learned by the story linguistic-to-semantic mapping exercise and any feedback from human users. For instance, the system can also explore large corpora of structured, semi-structured, or unstructured data (such as text corpora, image or video collections, semantic data bases, etc.), using different layered mechanism to extract and compose new frames. These mechanisms include, but are not limited to, statistical supervised, semi-supervised, and unsupervised machine learning and data mining techniques for extracting statistically meaningful frames; logical and probabilistic reasoning, for generating new frames via deductive or abductive processes from frames that are already stored; and interaction with users, through the dialog engine, to acquire direct knowledge of new frames. The utility of an induced frame can be evaluated by its ability to predict the specific individual texts.

Figure 12:
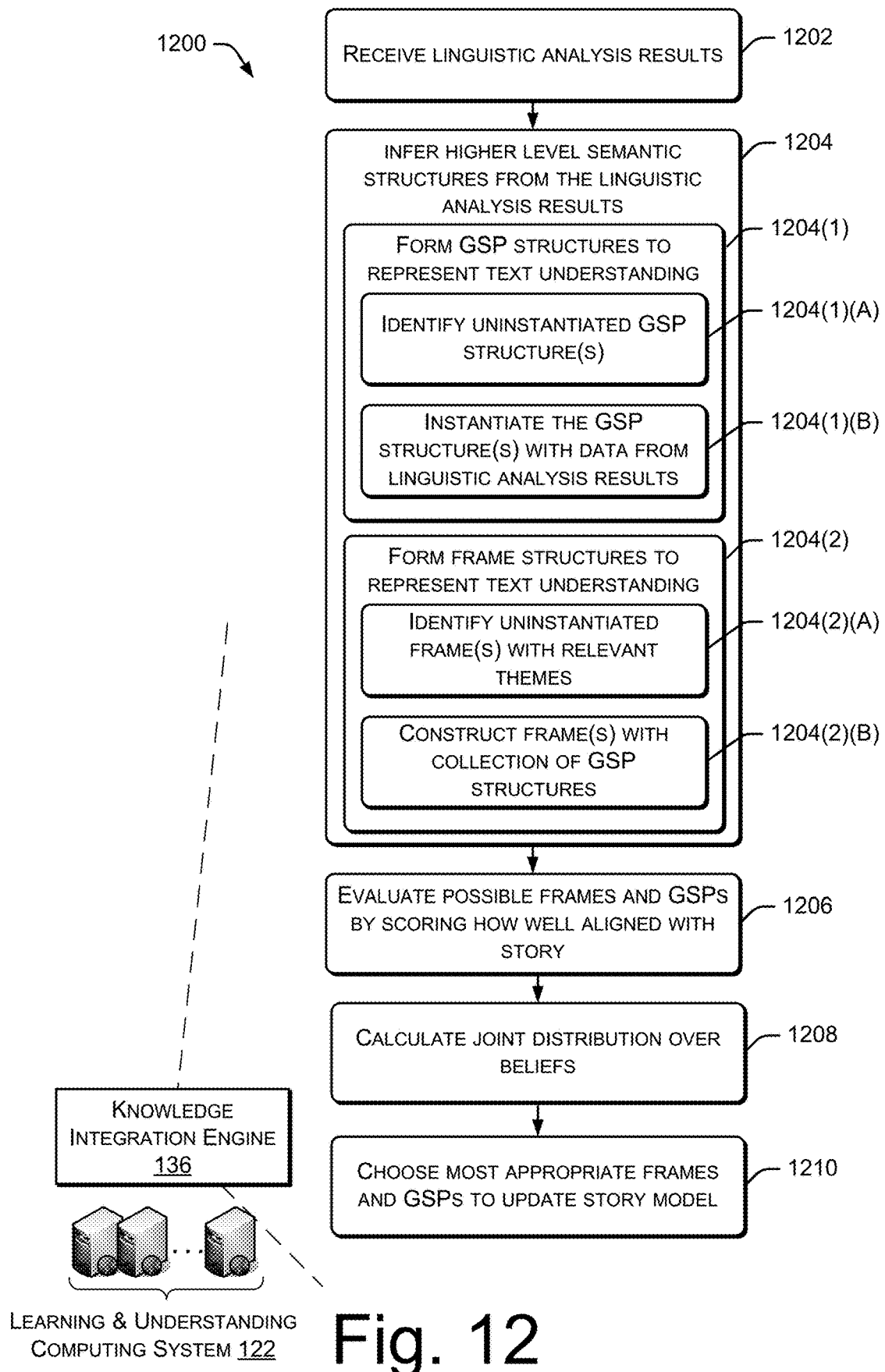
FIG. 12 is a flow diagram of a process for inferring semantic information in order to provide a deeper understanding of the story.

FIG. 12 shows an exemplary process 1200 that is executed by the knowledge integration engine 136 to infer semantic information for a deeper understanding of the story. The process 1200 is described with reference to the system architecture 100 and knowledge integration engine 136 of FIGS. 1, 4, 5, and 9. At 1202, linguistic analysis results, including a linguistic structure with syntax and PAS annotations, are received. With reference to FIG. 4, the linguistic analysis results may be received from the story parsing engine 134.

At 1204, frame inferences are made by converting the linguistic structure to one or more semantic structures that provide higher levels of interpretation. In one approach, the inferring operation involves multiple sub-operations represented by acts 1204(1)-(2).

At 1204(1), instances of generative semantic primitive structures are formed to provide a first higher level interpretation of what the text might mean. As part of this formation, one or more pre-existing, uninstantiated GSP structures may be identified from a library of such structures, at 1204(1)(A). The uninstantiated GSP structures may be stored in the current world model 138 and identified based on probabilities that the structures are relevant to the words/phrases in the linguistic structure. Multiple uninstantiated GSP structures may be selected if they exhibit a sufficient probability that primitives represent a likely meaning of the text. The probabilities may be compared to a predetermined threshold to aid the selection process. At 1204(1)(B), the selected GSP structure(s) are instantiated with data from the linguistic analysis results. Once instantiated, these GSP structure instance(s) provide a more robust range of meaning, providing logical connections amongst facts and inferences.

At 1204(2), the frame inference operation further includes forming frame structures to provide a second higher level interpretation of what the text might mean. One or more uninstantiated frame structures, which express themes or episodic beliefs of the text, may be identified from a library of such structures, at 1204(2)(A). The uninstantiated frame structures may also be stored in the current world model 138 and selected based on probabilities that such structures exhibit a relevance to the words/phrases in the linguistic structure. Multiple uninstantiated frame structures may be identified if they exhibit a sufficient probability that the frames represent relevant themes within which to understand the text (e.g., restaurant or hotel frames for understanding the Ben and Ava story).

In one approach, the frame selection act 1204(2)(A) may involve an additional frame abduction processes to aid in determining which frames apply to a given text/story. This sub-process includes not only the frame alignment process described previously with respect to FIGS. 9 and 11, but may additionally include a deduction process that derives more and new inferences that arise from applying the frame in previous situations. The applied frames in previous situations may be reviewed and analyzed for compatibility/consistency to evaluate how well the alignments and inferences fit together considering the prior background knowledge.

At 1204(2)(B), the selected frame structure(s) are instantiated or constructed with a collection of GSP structure instances. As illustrated in FIG. 9, for example, the restaurant frame structure is instantiated with the GSP structure instances 916(1)-(7) formed from the seven sentences of the Ben and Ava story 106. Once constructed, the frame structure(s) provide a more complete understanding of the text.

At 1206, the semantic structures (i.e., GSP structures and frame structures) are evaluated for their possible alignment with the current representation of the story model. The evaluation may involve calculation of a score that indicates how closely the frames and GSP structures align with the story.

At 1208, the joint distribution over the beliefs is calculated. In one implementation, the joint inference engine 406 calculates the marginal probability of each belief, which is used to construct and evolve the story model. The joint inference engine 406 may be configured to produce conditional probabilities for possible beliefs based on all beliefs as known at the time.

At 1210, the most appropriate frames and GSPs are chosen to represent the story and the story model is updated.

The current world model may also be updated with any information learned from the frame inference process.

Illustrative Knowledge Induction Engine

Figure 13:
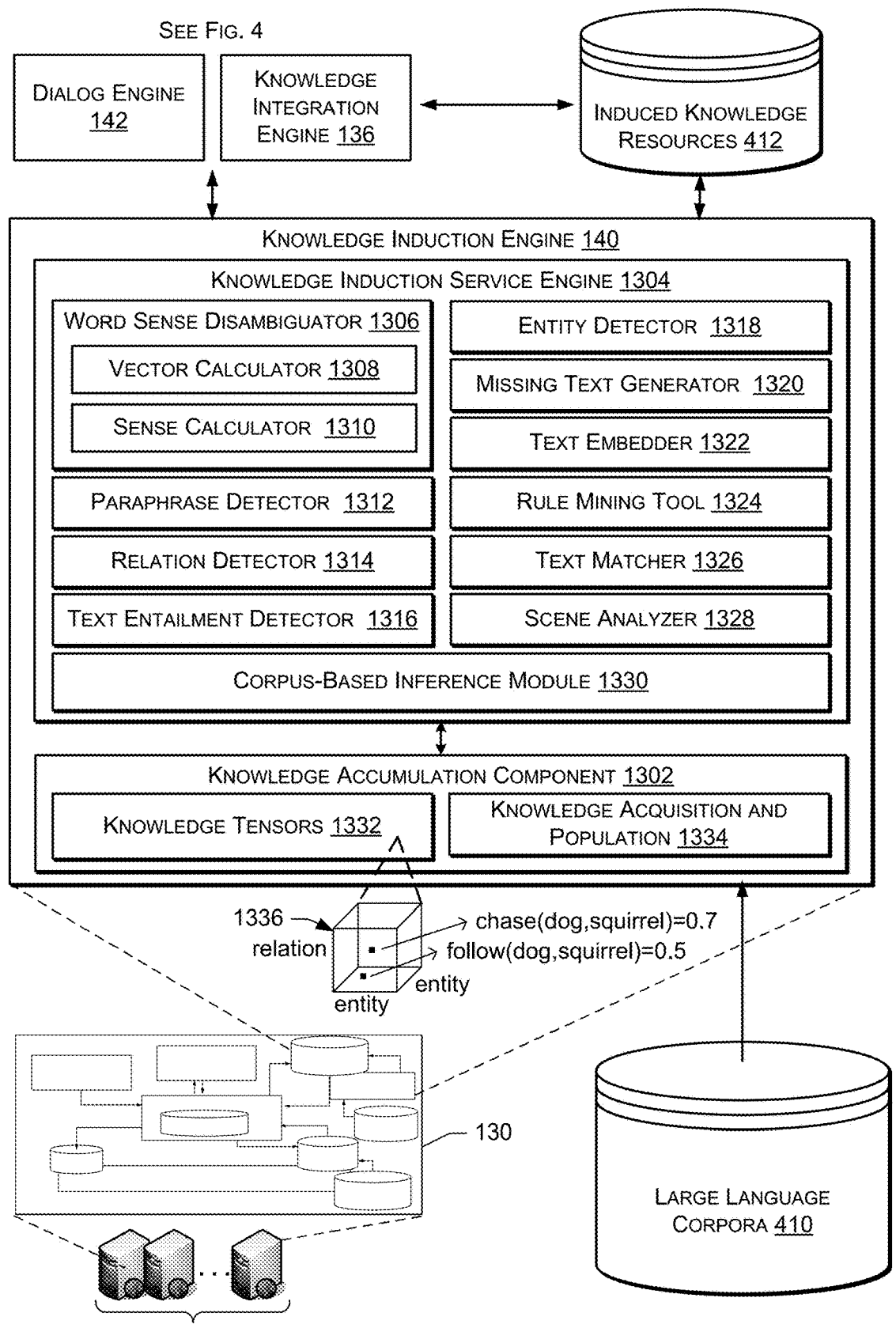
FIG. 13 is a block diagram of one example implementation of a knowledge induction engine found in the architecture of FIG. 1.

FIG. 13 shows an exemplary implementation of the knowledge induction engine 140, illustrating select components that aid the knowledge integration engine 136 and dialog engine 142 when inferring semantic information about a text string or story. The knowledge induction engine 140 may be implemented to run offline or independently of other components in the learning and understanding modules 130 to generate resources that may be stored in the induced knowledge resources repository 412 for easy access by the other components.

Narratives are tacit. Information is left unsaid, assumed, and ambiguous. The computer system predicts tacit subjects, actions, relations; otherwise it will have trouble in understanding language. The knowledge induction engine 140 has a set of components that help discern or predict knowledge that the author may leave implicit and unsaid in the story from existing resources, and provide services to other system components such as the knowledge integration engine 136 and the dialog engine 142. The knowledge induction engine 140 attempts to fill in these gaps so the knowledge integration engine 136 can form better knowledge models and the dialog engine 142 can articulate more intelligent questions for the human students or collaborators. For example, when the story says "the student got what he came to the university for," the knowledge induction engine 140 finds alternative senses to predict whether the sentence means the student earned a degree, or he received credit for a course, or the student was educated. Each of these alternatives may be accompanied by probability values of how likely each alternative is within the broader context of the story.

At a high level, the knowledge induction engine includes a knowledge accumulation component 1302 and a knowledge induction service engine 1304. The knowledge accumulation component 1302 accumulates data (both labeled and unlabeled) through various ways, including integrating existing knowledge (e.g., unstructured data like text, images, audio, etc. and structure data like knowledge bases, existing logics, etc.), accumulating knowledge through dialogs, automatic knowledgebase completion using techniques like tensor decomposition and mining knowledge from data using the components in knowledge induction service engine 1304. The knowledge accumulation component 1302 processes the data and produces a set of derived resources, i.e., induced knowledge resources 412, which capture information implied by or latent in the data.

The requests from the knowledge integration engine 136 and the dialog engine 142 are served by the induced knowledge resources 412 and the knowledge accumulation component 1302 if the requested knowledge is available. Otherwise, the knowledge induction service engine 1304 is called to generate the desired knowledge on the fly. The services include a number of modules that include, but are not limited to, modules 1306-1330 described below.

One component of the knowledge induction engine 140 is a word sense disambiguator 1306 that may be executed to disambiguate word senses. Given a sentence, clause, or other text string, the word sense disambiguator 1306 identifies the senses of nouns, verbs, adjectives, adverbs, and prepositions. In the case of nouns, for example, the word sense disambiguator 1306 may differentiate between the word "ball" as either a formal dance or a piece of sports equipment, or the word "bat" as either a flying mammal or another piece of sports equipment. The disambiguator 1306 may use sense-annotated resources compiled in various ways including, for example, training data, unambiguous word senses in large text corpora 410, and sample word-senses derived from running algorithms on the large text corpora 410. In other implementations, the word sense disambiguator 1306 may further access existing third-party sense inventories, such as WordNet for nouns, verbs, adjectives, and adverbs, or a publicly available preposition sense inventory.

In one implementation, the word sense disambiguator 1306 is embodied as programmatic software modules that include a vector calculator 1308 and a sense calculator 1310. The vector calculator 1308 generates different vector representations for each syntactic token in a sense definition and sums the vectors to produce a sense vector. The vector calculator 1308 further computes a context vector for a word/phrase by treating the sentence without the word/phrase as the context, parse the reduced sentence, and produce a vector representation from the syntactic tokens. In one embodiment, an embedding algorithm is used to create the vectors for each syntactic token, such as word embedding that operates on tokens (rather than words).

The sense calculator 1310 is provided to estimate a prior for each sense from frequency information, such as that found in training data like the large language corpora 410. The sense calculator 1310 derives a sense for the word/phrase as a function of the sense vector, the context vector, and the prior. In one implementation, the sense calculator 1310 may apply a cosine-similarity function for the sense vector and context vector and weight each of the three inputssense vector, context vector, and prior.

The knowledge induction service engine 1304 may further include a paraphrase detector 1312 to find and recognize paraphrases in the sentence or text string. A paraphrase of a word or phrase is another word or phrase that is written differently but roughly has the same meaning. For example, the phrase "crowd erupted" is approximately the same as another phrase "applause in the stands". The paraphrase detector 1308 uses background knowledge from the large language corpora 410 and other sources to recognize similar phrases.

Yet another component of the knowledge induction service engine 1304 is a relation detector 1314 to detect relations among words or phrases. The relation detector 1314 leverages the background knowledge from the tagged resources, like corpora 410, to predict words/phrases that might have relations. In one example, in the phrase "gas prices continue to fall", the phrase "continue to fall" has a relation of decreasing an amount.

A text entailment detector 1316 may also be implemented as a knowledge induction service engine 1304 to decide if one piece of text entails another one. An entity detector 1318 may be included to classify a type of word. A missing text generator 1320 identifies and creates text that is implied in the story but not clearly mentioned. A text embedder 1322 is another service that may be used to convert word/sentence/article into vectors. A rule mining tool 1324 is a service that learns inference rules from text. In one implementation, the rule mining tool 1324 mines different types of inference rules, such as rules involving only textual propositions, rules involving only GSPs, rules mixing the two (i.e. language to knowledge mapping rules). An example implementation (based on a frequent sub-graph mining approach) takes a set of frequently co-occurring statements from a large language corpus, generalizes the instances to types (e.g., using word sense disambiguation), creates potential inference rule candidates using the generalized text propositions, and validates by dialoging with a human user. A text matcher 1326 is a service that may be used to match two pieces of text.

The knowledge induction service engine 1304 may further include a scene analyzer 1328 to predict what type of scenes may be inferred from texts. The scene analyzer 1328 explores known corpora 410 and other sources to identify the most popular phrases under particular scenes. As one example, suppose a text reads, "I ordered some food and then drank coffee." The scene analyzer 1328 may explore background knowledge sources to detect scenes that contain the words/phrases such as "food", "coffee", "ordered", "ordered some food" and "drank coffee." In this example, the scene analyzer 1328 may return a ranked list of possible scenes such as "coffee house", "diner", "commissary", "crib", "verandah", "café" and "patio."

The knowledge induction service engine 1304 further has a background informed, corpus-based inference module 1330 that trains on corpora 410 and other sources (e.g., non-constrained sources like Wikipedia) to predict future semantic primitives from the background knowledge. As one example for discussion purposes, the inference module 1330 examines subject-verb-object (or PAS) combinations in the corpora 410 and explores what other combinations most closely resemble the target combination. Resemblance may be determined in various ways, such as by a scoring algorithm that computes relevance or likelihood of proximity in a text. For instance, suppose the subject-verb-structure contained "Dave eat food". Other results may include, in ranked order, "Dave gain weight" (score of 4), "Dave lose weight" (score of 3), "Dave take criticism" (score of 3), "Dave lose pound" (score of 2.5), "Dave drink wine" (score of 2.5), and "Dave conquer tension" (score of 2.5). As another example, suppose the subject-verb-structure contained "I buy car". Other results may include, in ranked order, "I give dollar" (score of 6), "repeat buy car" (score of 6), "I give deposit" (score of 6), "I pay proof" (score of 5), and "I take car" (score of 4.5).

In the knowledge induction engine 140, the knowledge is stored in knowledge tensors 1332 as part of the knowledge accumulation component 1302. A tensor is a multidimensional cube. The dimensions include (not limited to) one or multiple entity dimensions, one or multiple relation dimensions, one or multiple frame dimensions, one or multiple temporal dimensions, one or multiple spatial dimensions and one or multiple scene dimensions. The knowledge accumulation component 1302 further includes a knowledge acquisition and population module 1334 that defines and populates the knowledge tensors 1332. In FIG. 13, a three dimensional cube tensor 1336 is illustrated with two entity dimensions (e.g., common nouns, semantic types, etc.) represented along two axes, and one relation dimension (e.g., common verbs) along the third axis. A point in the cube tensor 1336 contains the likelihood that the given relation holds between the two entities. In this example, suppose one entity is a dog and the other entity is a squirrel. Now, suppose a tensor representing a relation expressed by the verb "chase" is applied to these two entities. The result of a dog chasing a squirrel is likely to result in a high probability. Conversely, suppose the tensor represents a relation expressed by the verb "follow", where the outcome is the dog follows the squirrel. This is still a possible outcome, but may be rated with a lower probability than "chase" because while the dog is indeed following the squirrel, the dog is really chasing the squirrel with the intent to catch the squirrel.

In one implementation, the knowledge induction engine 140 contains one tensor to contain all available knowledge and a set of application oriented tensors to cover each individual application.

In one approach, a tensor may be used to retrieve likely common sense knowledge from big data volumes of text. In the phrase "students earn . . . ", the tensor query tool may identify several common candidates from the text like "credit", "degree", and so forth. In the phrase "players earn . . . ", the tensor query tool may identify other common candidates from the text like "points", "money", and so forth. Once these candidates are found, similarities of terms and term pairs may be calculated, where each term is represented as a slice in the tensor and each term pair is represented as a column in the tensor. Ranked lists of candidates with associated inference probabilities can be stored in the induced knowledge resources repository 412 for query by the knowledge integration engine 136 to help align the story model 132 with the current world model 138.

Figure 14:
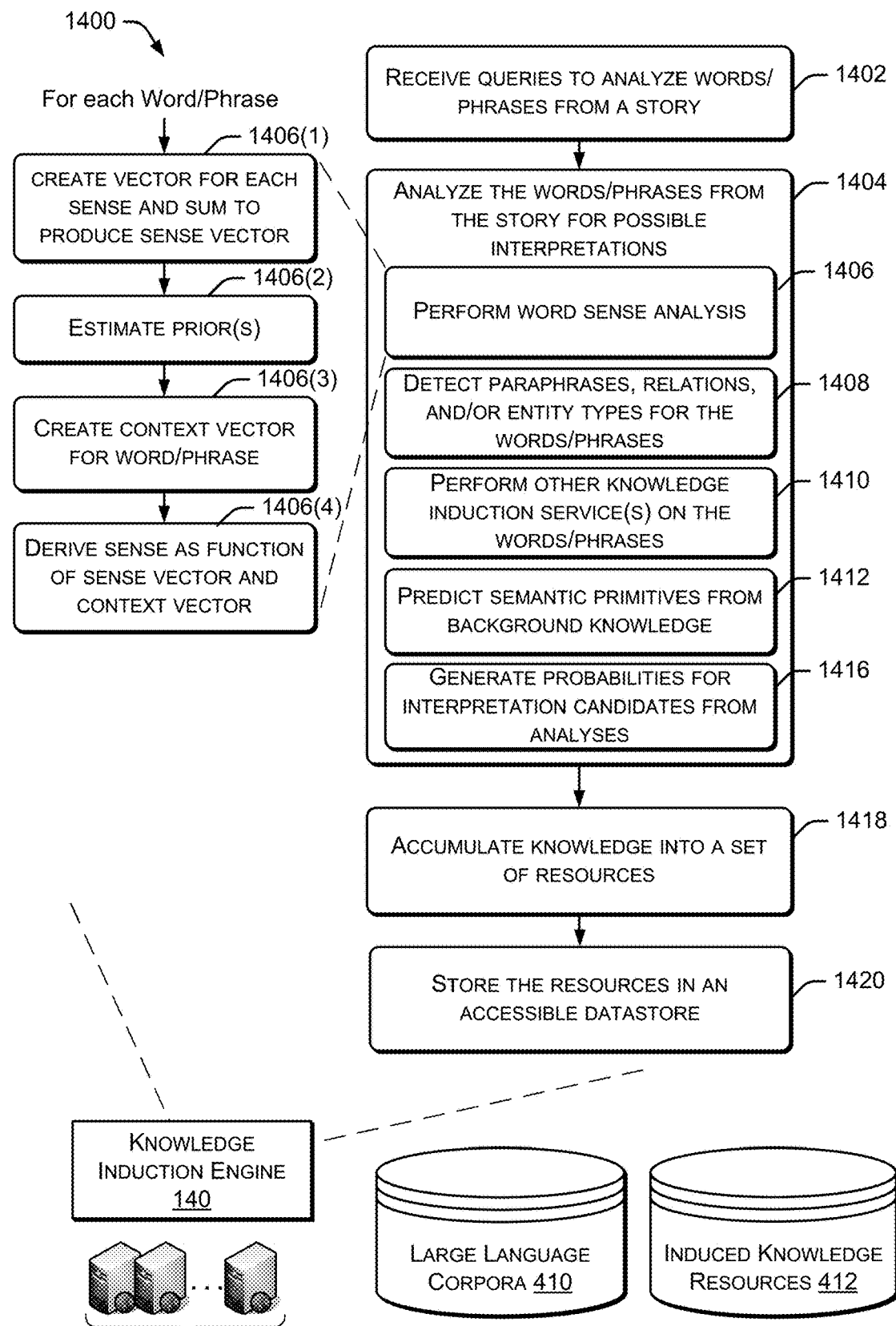
FIG. 14 is a flow diagram of a process for providing probable candidates for senses and relations of words/phrases in the story to assist when inferring semantic information about the story.

FIG. 14 shows a process 1400 that is executed by the knowledge induction engine 140 to provide probable candidates for senses and relations of words/phrases in the story to aid the semantic inferences being made by the knowledge integration engine 136. The process 1400 is described with reference to the system architecture 100 and knowledge induction engine 140 of FIGS. 1, 4, 5, and 13. At 1402, queries for analyzing words/phrases found in the story (or text string) are received. In the architecture 100, the knowledge integration engine 136 may submit queries for words provided in the story that have been or will be semantically processed. The queries may include the words or phrases, tokenized versions of the words/phrases, or other representations of words/phrases.

At 1404, several analyses may be performed on the words/phrases received in the queries to deduce possible interpretations of the words/phrases. As these operations may be performed offline, the analyses for specific word phrases may have already been performed and results stored for easy access. In other situations, the analyses may be performed on the fly or as soon as practical. The various forms of analysis are represented by illustrative acts 1406, 1408, and 1410.

At 1406, word sense analysis is performed on the words/phrases to determine possible senses. For each word/phrase, different vector representations are created using sense definitions and possible senses are calculated as a function of those vector representations. More particularly, one implementation of the word sense analysis 1406 is shown as acts 1406(1)-(4). At 1406(1), a sense vector is created for each word/phrase. The sense vector is calculated by first parsing sense definitions corresponding to the word/phrase to produce syntactic tokens of each sense definition. These sense definitions may be maintained in a rules or definitions datastore that may be part of the corpora 410 or induced knowledge resources 412. Afterwards, the tokens for each sense definition are algorithmically processed to produce corresponding vectors, and these vectors are summed to produce a sense vector.

At 1406(2), a prior for each sense is estimated. Frequency information from training data, such as the large language corpora 410, may be used to estimate the priors. At 1406(3), a context vector is created for each word/phrase. In one approach, a context is formed by removing the word/phase from the host sentence and then syntactically parsing the sentence sans the word/phrase. The syntactic parse is then converted to the context vector using, for example, an embedding function. At 1406(4), a sense for the word/phrase is derived as a function of the sense vector, the context vector, and the prior. In one implementation, a cosine-similarity function may be applied to the sense vector and context vector. Weighting may further be applied to these three inputs. The weighting may be learned using a supervised learning algorithm, such as logistic regression.

At 1408, the words/phrases in the queries may be analyzed to detect paraphrases. relations, and/or entity types. Background knowledge from tagged resources, like large corpora 410 or other sources may be examined to identify one or more paraphrases, relations, and/or entity types that might apply to the words/phrases under analysis. At 1410, one or more other services—text entailment detection, missing text generation, scene analysis, text embedding, text matcher, etc.—may be performed.

At 1412, semantic primitives are predicted from background knowledge sources, such as large language corpora. As a background process, the induction engine 140 may analyze corpora to examine various subject-verb-object (or PAS) combinations as to what other combinations might be relevant to them. Values of relevance may be computed based on how related these combinations tend to be in large corpora. At 1414, to the extent not otherwise produced through the analyses at 1404, probabilities are calculated to help rank the multiple interpretation candidates discovered by the analysis. The probabilities may be passed back in response to the queries and used by the knowledge integration engine 136 to select appropriate interpretations when inferring semantic and frame level understanding.

At 1418, knowledge is accumulated to produce a set of knowledge resources. Some of these resources come with associated probabilities is a format or structure that can be easily consumed by other modules in the system. In one approach, a three-dimensional tensor structure is used. With a tensor structure, three parameters (e.g., two entities and an action; one entity, one thing, one location; etc.) may be assessed using different elements or values and probabilities may be computed for each of those iterations. As noted in the example above, a tensor having two entities and one action relation may be used to discover that a story involving a dog (first entity) and a squirrel (second entity) has a higher probability of expressing a relationship among them as "the dog chases the squirrel" than perhaps "the dog follows the squirrel".

At 1420, the resources are stored in an accessible datastore, such as induced knowledge resources repository 412.

Illustrative Framework

Figure 15:
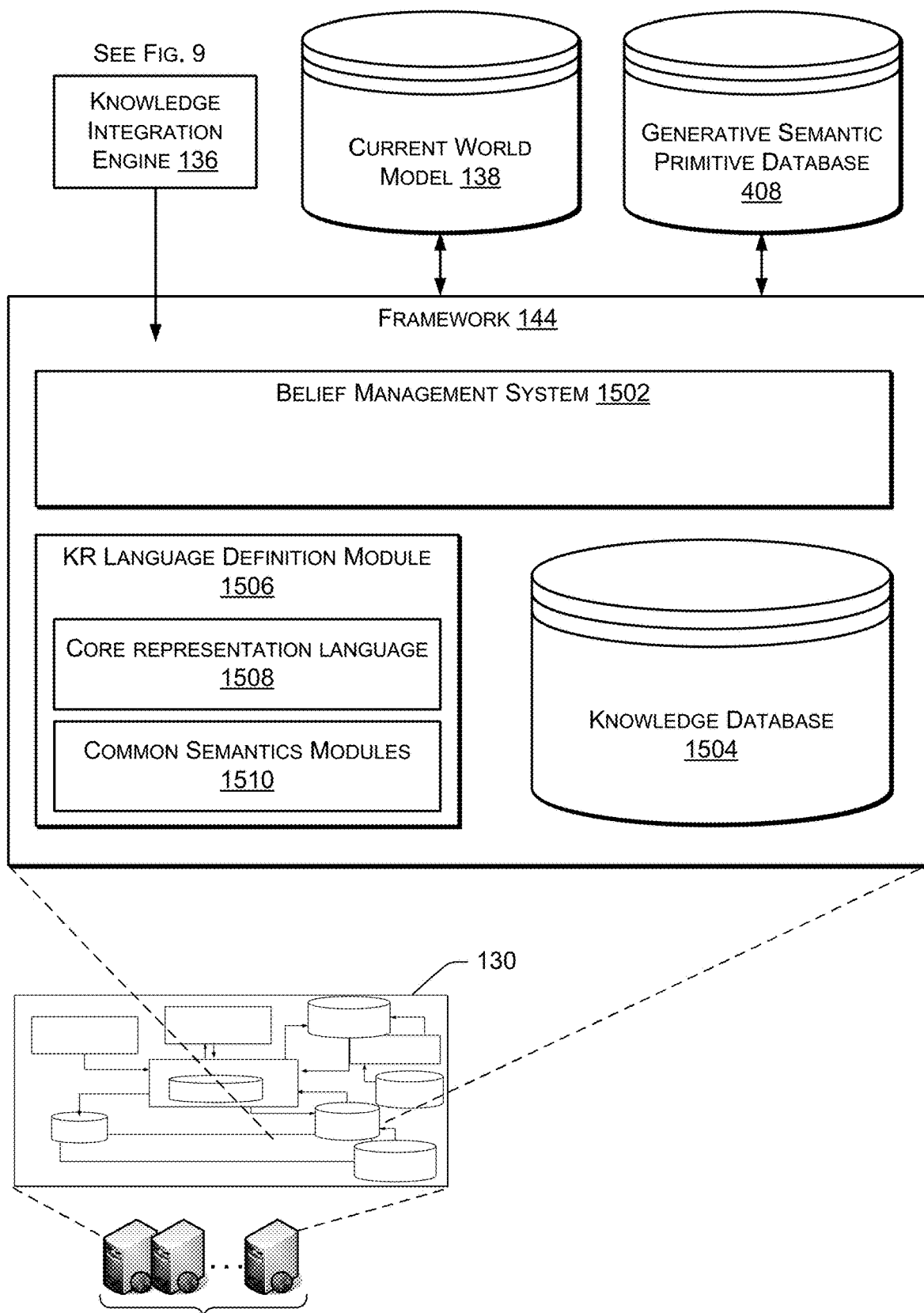
FIG. 15 is a block diagram of one example implementation of a belief representation and reasoning framework found in the architecture of FIG. 1.

FIG. 15 shows an exemplary implementation of the belief representation and reasoning framework 144, which is a set of foundational components used throughout the system such as a knowledge representation language and inference and learning mechanisms for contextual differentiation and semantic primitives. The framework 144 allows the system to store, index, retrieve, navigate, and manipulate probabilistic propositions (or "beliefs") over time.

Generally, the framework 144 has a belief management system 1502, a knowledge database 1504, and knowledge representation (KR) language definition module 1506. The belief management system 1502 is a collection of software-based functions for storing and querying propositions (or "beliefs") that are represented according to the KR language definition module 1506. The knowledge database 1504 is a feature store, graph database, knowledge base, etc. that treats knowledge and reasoning as data and exposes these as simple and fast data structures that are ontologically independent. In one implementation, the knowledge database 1504 is embodied as a fast Java Virtual Machine-based in-memory concept database.

The KR language definition module 1506 maintains rules for a defined language for representing entities and propositions, including a common syntax, minimal semantics, the degree of association among propositions, and common semantic modules for common types of propositions. The KR language consists of two parts: a core representation language 1508 and common semantics modules 1510. The core representation language 1508 defines a syntax and minimal semantics for how to represent entities and propositions, and well as the degree of association between propositions. The common semantics modules 1510 are types of propositions that are used for frequent tasks. In one implementation, the common semantic modules 1510 may comprise the following:

Logical Operators: and, or, not, implies, iff.

Descriptions and Roles: An entity may play the role of a description (class) that subsumes other entities (instances). For any predicate in the KR language, roles can be declared and information provided about the expected class of the concept that fills the role.

Names: Any concept can have a name

Collections: An entity may represent a collection of other entities. This is related to descriptions, in that there is a correspondence between any collection of things (the extension) and a description that describes the members (the intension).

Uncertainty: Measure an associated probability of a proposition being true.

Time: Indicator in which propositions are evaluated as being true.

Beliefs: A representation of what proposition agents believe and when.

Illustrative Dialog Engine

Figure 16:
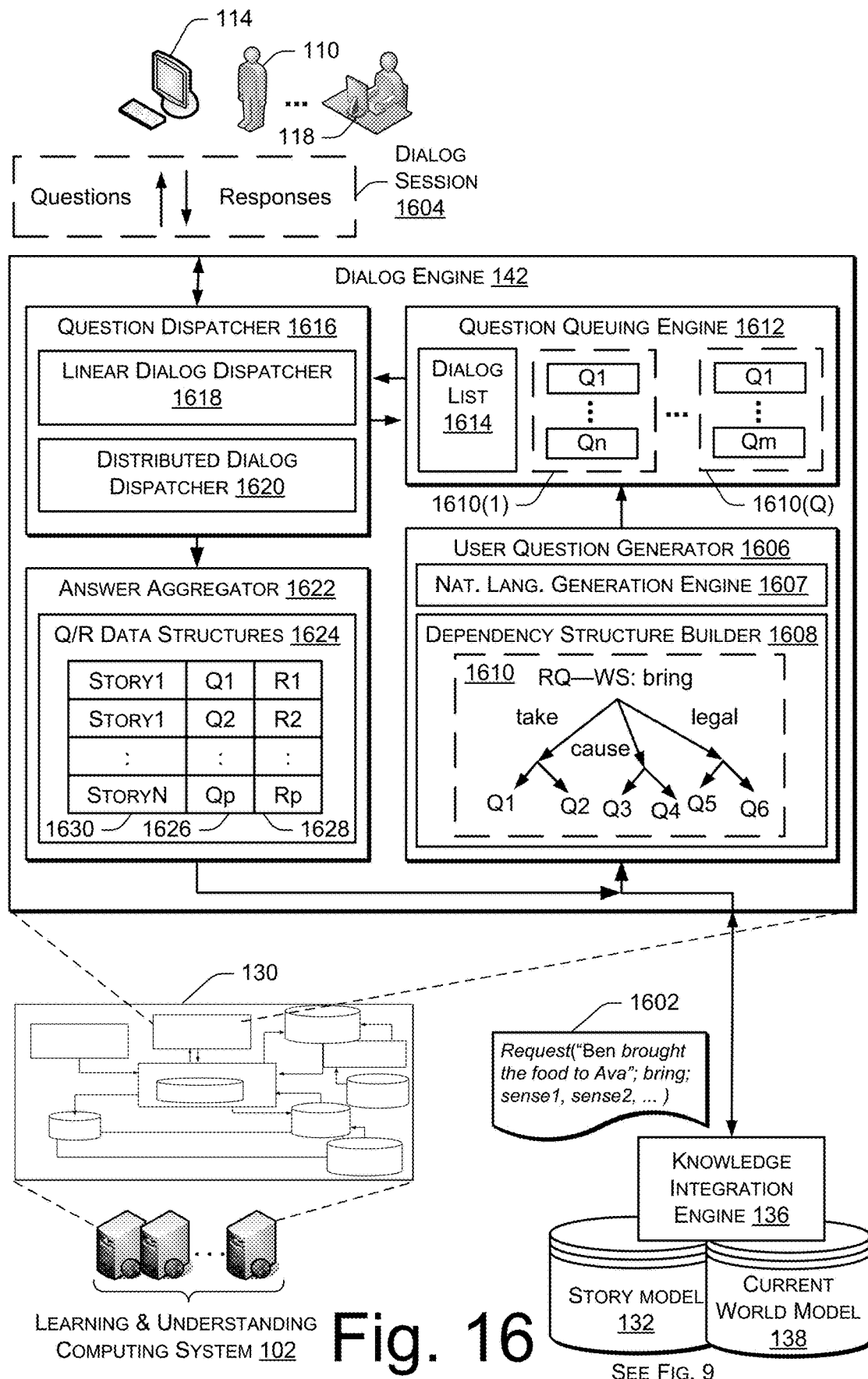
FIG. 16 is a block diagram of one example implementation of a dialog engine employed in the architecture of FIG. 1.

FIG. 16 shows an exemplary implementation of the dialog engine 142, illustrating select components that may be used to generate user questions to challenge and/or confirm the system's current understanding of the story, and receive user responses for revising and extending the interpretations implemented in the semantic structures and frames to modify the system's understanding. The dialog system 142 allows the computer system 102 to engage in extended dialog sessions with individual human users. Each dialog session may be carried out as a serial linear dialog involving only one user, or in a distributed manner to distribute questions to multiple human users in parallel. Distributed dialog applies flexible dialog management in disassembling the content of a dialog session to ask questions to different users and reassembling the results to achieve essentially the same or similar learned outcome as a linear dialog. Distributed dialog sessions allow the computer system 102 to scale by managing the cognitive load of questions across a crowd of users, thereby reducing latency of the learning process through parallelized interactions with multiple users.

Dialog interaction in the collaborative learning process may serve one of two purposes. The first is to support system learning and the second to support user learning. In the first case, the system may not adequately map a story to GSPs with sufficient confidence, or fails to make a necessary inference to fully understand the story. In these cases, the system poses questions to users to solicit the missing information to accomplish the task. Through this learning process, the system may ask additional probing questions to generalize, specialize, or confirm what it has learned to ensure correctness in future application of the knowledge.

Examples of system learning strategies include solicitation, confirmation, and generalization/specialization. Solicitation is a strategy in which the dialog engine asks a user to fill in gaps to complete system understanding. For example, the system may ask, "The story says 'Ben showed Ava to a table'. Can you explain what "show" means in this context?". In this case, a helpful user would rephrase the sentence in simpler terms to help the system understand, such as "It means 'Ben took Ava to a table'."

Confirmation is a strategy to confirm or validate interpretations/inferences made about the story in which the system has less confidence. For example, the system may ask "'Ben took Ava to a table' means 'Ben and Ava walked and then they are both near the table'. Is that correct?" or in the Ben and Ava story, the system may confirm inferred actions such as "I think that Ava paid the bill. Is that correct?". Generalization/specialization is a strategy that attempts to ask additional probing questions to enhance the system's understanding after the system has learned some new information. For example, the system may ask "Did Ava pay the bill because she is the customer?" (yes), "Do customers always eat spaghetti?" (no) "Do customers always eat food?" (yes in a restaurant) "Do customers always pay the bill?" (yes). This additional knowledge gained from generalization and specialization helps the system apply the knowledge in appropriate circumstances in the future.

In the case of supporting user learning, the system's role is to ask questions that will help the user better understand the story or reason about it. Note that some of the questions the system asks here may be similar to what was discussed previously, with the primary difference that now the system knows the answers to those questions. Some examples strategies for user learning include compare/differentiate, generalization/specialization, and inference. The system can automatically switch between these two modes of operation depending on its reading ability relative to the user's ability.

In compare/differentiate, the dialog engine asks questions to help the user differentiate among similar cases. For example, the system may ask "'Ben showed Ava to a table' means 'Ben and Ava walked over to a table'. Can you tell me what 'Ben showed Ava a table' means?" In generalization/specialization, the system asks questions to help the user generalize/specialize their knowledge. For example, the system may ask "What else does a customer do in a restaurant that's not mentioned in the story?" or "Do all restaurants have waiters?" For an inference strategy, the system may ask questions to help users make inferences that are implicit in the story. For example, after reading that "Ava paid the bill and left Ben a good tip", the system may ask "Do you think Ava is happy with Ben's service as a waiter and why?"

With reference again to FIG. 16, the dialog engine 142 receives requests 1602 from the knowledge integration engine 136 to resolve gaps between the story model 132 and the current world model 138. The requests may include information about the gaps to be resolved, low confidence interpretations to be confirmed, or other aspects that can help the system better understand the current story. When there is a question about a particular word sense, for example, the request may include the word, the sentence containing the word, multiple senses that the word can have, probabilities of those senses being the correct option in the sentence, a story identity, and so forth. Consider the sentence "Ben brought the food to Ava" in the Ben and Ava story 106. Suppose the knowledge integration engine 136 wants to learn more about which word sense may be the most appropriate one for the word "brought" or its root form "bring." The request 1602 may include the complete sentence, the word "bring", the various senses of "bring", and so forth.

As requests are received from the knowledge integration engine 136, the dialog engine 142 begins one or more dialog sessions 1604 with human users, as represented by the student 110 and his/her device 118 and the collaborator with his/her device 114. During the dialog session 1604, the dialog engine 142 generates and sends questions to the user devices for consideration and input by the human users and receives and processes responses entered into the user devices by the human users.

In the illustrated implementation of FIG. 16, the dialog engine 142 is a set of executable components that formulate questions, based on the attempted alignment of the story model 132 with the current world model 138, and interact with one or more human users to obtain answers to those questions. The user questions are formulated to fill or resolve gaps that arise where the system does not have sufficient confidence in the current story model 132, is not yet able to confidently align the story model 132 with the current world model 138, or attempts to generalize/specialize the new information to facilitate future application of the knowledge. The dialog engine 142 may further leverage reading comprehension questions and/or produce new questions for the story as such questions can be useful for identifying gaps where the system's current story model plus current world model is insufficient to fully understand the story in its context.

The dialog engine 142 has a user question generator 1606 to formulate questions to be posed to the human user during a dialog session 1604. The user question generator 1606 receives requests, such as the request 1602, from the knowledge integration engine 136 and crafts questions to discover information relevant to the requests. In one implementation, the user question generator 1606 has a natural language generation engine 1607 and a dependency structure builder 1608. The natural language generation engine 1607 is used to render beliefs from the story model and current world model in natural language. The natural language generation engine 1607 makes use of syntactic information, natural language templates associated with GSPs, and background corpora information from the knowledge integration engine 136 to generate natural language that a non-expert user will be able to understand. The dependency structure builder 1608 is provided to construct a dependency structure 1610 from the data in the request 1602. A dependency structure 1610 may be used to represent a dialog in a way that allows the system to determine the parts of a dialog that are independent of one another and can be pursued in parallel. The dependency structure also allows the system to infer a dialog context for interpreting and answering a question, which is critical in a distributed dialog setting. In this structure, a root node represents a parent question and each child node branching from the root node represents a possible follow-up question based on the answer to the parent question. Using this representation, child nodes are dependent on their parent nodes while sibling nodes are independent of one another.

In the illustrated example, a root node pertains to the question of word sense (WS) of the word "bring" as received in the request 1602. From this root node, three child nodes are shown for the three senses received in the request, including "take" (i.e., sense option 1: "take something or somebody with oneself somewhere"), "cause" (i.e., sense option 2: "cause to come into a particular state or condition", and "legal" (i.e., sense option 3: "present or set forth legally"). Accordingly, a root question (RQ) of the dependency structure 1610 may simply be to ask which sense of the word "bring" in the sentence, "Ben brought the food to Ava", is most likely? Depending upon that answer, follow-up questions represented as questions Q1-Q6 may be asked depending upon which word sense the human user selects initially. If the user selected the "take" option, then the follow-up questions will be Q1 and Q2, and may include questions about what the state was before the action, and what the state is after the action.

Figure 17:
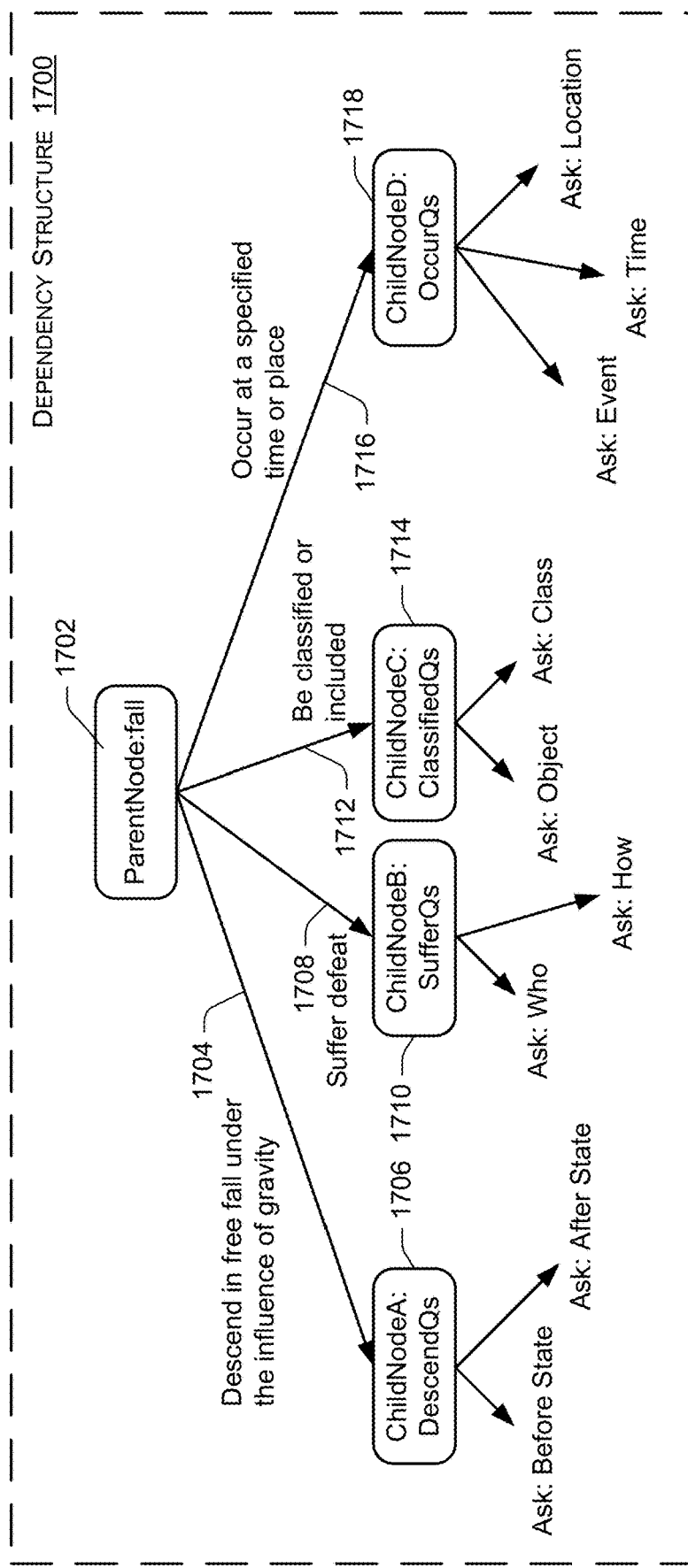
FIG. 17 shows an example of a dependency structure used by the dialog engine to generate appropriate questions to pose to one or more human users.

FIG. 17 shows another example of a dependency structure 1700 (like the structure 1610 in FIG. 16) in more detail, but this time using the example sentence "A big raindrop fell on Chloe's face." In this example, dependency structure 1700 is constructed to ask questions about the sentence itself, such as the sense of the word "fell" in the sentence. A parent node 1702 contains the verb "fall", as the root form of "fell" in the sentence. Associated word senses form the possible branches from the parent node. A first branch 1704 corresponds to a first sense of the word "fall", which means to "descend in free fall under the influence of gravity". The first branch 1704, which represents the correct word sense for the sample sentence, leads to first child node 1706 that suggests questions pertaining to possible facts or relations implicit in the corresponding word sense of free falling. Here, the first child node 1706 suggests to ask questions about what happened before the raindrop fell (i.e., Ask: Before State "Where was the raindrop before it fell?") as well as questions about what happened after the raindrop fell (i.e., Ask: After State "Where was the raindrop after it fell?").

A second branch 1708 corresponds to a second sense of the word "fall", which has a meaning to "suffer defeat". This branch 1708 leads to a second child node 1710 that suggests questions pertaining to possible facts or relations implicit in the corresponding word sense of suffering defeat. The second child node 1710 might suggest asking such questions like "who suffered defeat?" (i.e., Ask: Who) and "how did they suffer defeat?" (i.e., Ask: How). A third branch 1712 corresponds to a third sense of the word "fall", which means to "be classified or included". A third child node 1714 terminates the third branch 1712 and suggests asking follow-up questions pertaining to classification, such as "what object is being classified?" (i.e., Ask: Object) and "what is the class?" (i.e., Ask: Class). A fourth branch 1716 corresponds to a fourth sense of the word "fall", which means to "occur at a specified time or place". This fourth branch 1716 leads to a fourth child node 1718 that suggests questions pertaining to possible facts or relations implicit in the corresponding word sense of occurring at a time or place. The fourth child node 1718 might suggest asking such questions like "what event took place?" (i.e., Ask: Event), or "when did it take place" (i.e., Ask: Time), or "where did it take place" (i.e., Ask: Location).

In a different scenario, the system's question to the user may not be directly related to how a single sentence should be interpreted, but rather on how the information conveyed in the sentence should be integrated into the system's understanding of the whole story. For instance, a parent node in this case may be "location of Chloe", with a corresponding question "Is Chloe indoors or outdoors?" A follow-on question after the user chooses "indoors" may be "Why is it raining indoors?" (turns out Chloe is in a rainforest in the story), while one when the user chooses "outdoors" may be "I think it is raining in the story. Is that correct?" Dependency structures can be built similarly for scenarios where the system attempts to confirm, solicit, generalize, and specialize information it learned from the story.

Accordingly, the dependency structures 1700 may be constructed for each of the various requests received from the knowledge integration engine 136. The dependency structures 1700 provide the relationships among the various elements known to be part of the information being sought, thereby allowing the dialog engine to formulate appropriate questions to engage a human user.

With reference again to FIG. 16, the dependency structures 1610 built by the dependency structure builder 1608 are provided to a question queuing engine 1612, which organizes the structures for the dialog sessions 1604 with the users. The question queuing engine 1612 is shown with multiple dependency structures 1610(1)-(Q) stored in a queue, with each dependency structure having one or more questions therein, as represented by the questions Q1-Qn in structure 1610(1) and questions Q1-Qm in structure 1610(Q). Each dependency structure represents the system's attempt to solicit information from the user to fulfill all or part of requests such as 1602. The questions may be maintained in an ordered list 1614 that can be made available for presentation to the users.

The queuing engine 1612 provides the questions in its ordered list 1614 to a question dispatcher 1616 for submission to the human users during the dialog session 1604. During the session 1614, the question dispatcher 1616 sends the questions to the user devices 114/118. The question dispatcher 1616 continuously dispatches questions from the list 1614 to either a single user in a linear exchange or to multiple users in a parallel manner. The question dispatcher 1616 includes a linear dispatcher 1618 that facilitates sessions with a single user. As one example, the linear dispatcher 1618 may engage with a single collaborator about the content of the Ben and Ava story. The linear dispatcher 1618 may formulate the first question about the sense of the word "bring" as derived from the root node of dependency structure 1610. The question may be dispatched and presented on a user device UI, as follows:

Here is a sentence I'm trying to understand:
  Ben brought the food to Ava.
 What choice below uses the word "bring" most similarly to the sentence above?
 1. Take something or somebody with oneself somewhere.
 2. Cause to come into a particular state or condition.
 3. Present or set forth legally.

This is illustrated in FIG. 1, for example, as the dialog UI 126. After this initial question, suppose the user returns the answer of option 1.

Responses received from users by the question dispatcher 1616 are returned to the queuing engine 1612 for analysis of which follow up questions to ask. When the user chooses an option (e.g., word sense "take" for the verb "bring"), the queuing engine 1612 traverses the appropriate dependency structure along the branch for that chosen option to determine a new question. The new question is then added to the dialog list 1614 for the dispatcher 1616 to send out to the users. Continuing with the Ben and Ava story, appropriate follow-on questions to be presented back to the same collaborator might be as follows:

Where is the food before it is brought to Ava?
 Where is the food after it is brought to Ava?

Multiple choice answers may be provided for each of these questions, if choices can be inferred, or an open dialog box may be provided for the user to simply add an answer. One example set of UIs is shown and described below in more detail with reference to FIGS. 19-21.

The question dispatcher 1616 may alternatively distribute questions in parallel to multiple users through a distributed dispatcher 1620. The distributed dispatcher 1620 separates the questions and distributes them to multiple users in parallel. The distributed dispatcher 1620 may ask the same question to multiple people, or different questions to different people. Examples of distributed dialog sessions are provided below in more detail with reference to FIGS. 22-24.

Another example of follow-on questions using the sentence illustrated in FIG. 17 of "A big raindrop fell on Chloe's face" may include, for example:

Dialog Engine: What is the sense of "fall" in "A big raindrop fell on Chloe's face"? (Offers multiple choice options)
 User: Option 1Descend under the influence of gravity
 Dialog Engine: What is the state of raindrop before "fall"?
 User: It is in the sky.
 Dialog Engine: What is the state of raindrop after "fall"?
 User: It is on Chloe's face.

The two follow-on questions pertaining to the state of the raindrop before and after the fall may be linearly dispatched to the same person by the linear dialog dispatcher 1618 or dispatched in parallel to two different people by the distributed dialog dispatcher 1620.

The question dispatcher 1616 also sends responses from the users to an answer aggregator 1622, which continuously aggregates information obtained from question/response pairs returned from the dialog session 1604. The question/response pairs may be stored as data structures 1624 that associate the questions asked with the responses given. In the illustrated example, the data structures 1604 may associate each question 1626 with a response 1628 to form a question/response pair, which is further associated with a story identity 1630. Additional information may also be recorded, such as the user reference identity, date/time stamp, modality used, and so forth. When the dialog session 1604 is completed, the aggregated information embodied in the question/response data structures 1624 corresponds to the results learned from interacting with humans. The question/response data structures 1624 are returned to the knowledge integration engine 136 for integration into the current world model 138 and further alignment with the story model 132.

The dialog system 142 may further compose questions that work across multiple sentences or multiple stories as the system learns more. For instance, in the Chloe example above, the dialog system 142 asked one set of questions around the sense of the word "fall" as used in the sentence "A big raindrop fell on Chloe's face." But suppose the story about Chloe has another sentence, "Chloe slipped and fell in the mud." The knowledge integration engine 136 may want to examine the use of the word "fell" in this sentence, and contrast that against the use of the word "fell" in the first sentence. A dependency structure for this second Chloe sentence may be configured and the dialog engine may ask questions that engage the user in a continuing linear dialog session as follows:

Dialog Engine: Is "fall" in "Chloe slipped and fell in the mud" used in the same way as "A big raindrop fell on Chloe's face"?
 User: No
 Dialog Engine: What is the sense of "fall" in in "Chloe slipped and fell in the mud"? (multiple choice questions provided)
 User: Lose an upright position suddenly
 Dialog Engine: What is the state of Chloe before "fall"?
 User: She was upright
 Dialog Engine: What is the state of Chloe after "fall"?
 User: She is on the ground, in the mud As the system learns and the knowledge integration engine discovers more and more relations among words/phrases, semantics, and frames, the requests to the dialog engine may become more complex. The dialog engine 142 may use these requests to craft increasingly more sophisticated questions. Beyond word senses and filling in facts and relationships, the dialog engine 142 may ask questions that begin to explore the completeness of frames in the story.

Accordingly, in one implementation, the dialog engine 142 may be embodied as a system-initiative dialog system with multiple operational modes, ranging from a basic learning mode to acquire word and frame semantic representations to an interactive mode to read a story together with human students and ask questions when encountering difficult passages of the story, as well as other modes of interaction with complexities in between. In the learning mode, the knowledge integration engine 136 and the dialog engine 142 engage users to learn the basic meanings of individual words within sentences and basic frame representations. This begins with learning the most commonly used words, such as the top verbs and nouns usually known by grammar students of 6-7 years in age. These words are learned in the context of sample sentences to ensure that proper word senses are learned together with how words with those senses typically behave grammatically. The learned semantic representations for those target words then go through a generalization process to produce general semantic representations for the target words which then become the foundation for interpreting future sentences.

The learning mode may further be used to discover basic frame representations. To do this, the dialog engine 142 engages human users in a discussion over what the user understands to be happening in the story, even though such understanding is not explicitly set forth. The dialog engine 142 may draft general questions about the story, such as who is involved, where is the story taking place, how are the story elements unfolding or behaving, when is the story unfolding, and so forth. For instance, in the Ben and Ava story, the dialog engine 142 may pose a question like, "After reading this story, can you say where Ben and Ava were?" The user may answer in a "restaurant" or "pub". The dialog engine may use this response to frame yet another question like, "How did you know it was a restaurant (or pub)?" The user may further reply, "because Ben showed Ava to a table, gave her a menu, and brought her food."

From this human interaction, the computing system 102 can learn if one person shows a second person to a table, gives the second person a menu and brings the second person food, that means the first person and the second person are likely to be in a restaurant. The knowledge integration engine 136 uses this learned information to revise and update frame representations. In some cases, the knowledge integration engine 136 may leverage this user feedback to write abstract scripts or episodes (e.g., episode 1102 in FIG. 11) by building frames that can be organized and grouped into the episodes. In one approach, an abstract frame may be built for every noun, and then multiple frames may be used within an episode.

As one more example of crafting more general questions designed to pull out higher level information for frame semantics, consider again the Enzo and Zoe story introduced in FIG. 1 as story 106(T). The story is as follows:

Enzo and Zoe were running a race. Enzo fell. He hurt his knee. Zoe looked back. She was almost at the finish line. She wanted to win. If she kept running, she would win. Enzo was her friend. Zoe stopped. She ran back to Enzo. She helped him up. "Thank you," said Enzo. "You're welcome," said Zoe. "If I fell, I would want you to help me. I'm glad I could help you.

From this story, the knowledge integration engine 136 may make requests to know more about what a "race" is in general. In the request, the knowledge integration engine 136 may provide as much information as it knows, such as word senses for "race", any semantic structures and frames that use the term "race", and so forth. From that, the dialog engine 142 generates a set of one or more questions to extract knowledge from the user. For instance, one example set of questions might include the following questions Q1, Q2, and Q3, below:

Q1: I see that this story is talking about a race. Which of these things are typically associated with a race?
  a. a participant
  b. a winner of the race
  c. a finish line marking the end of the race These choices may be provided in the request from the knowledge integration engine 136 as being known from other uses of the word "race" in other stories, frames, corporate, and the like.

Q2: Who in the story does these things?
  a. participant
  b. winner

These choices may be generated from type information and the induction process of the knowledge induction engine 138.

Q3: Which of these actions typically happen in races?
  a. participants run a race
  b. participants want to win
  c. participants fall
  d. participants finish race by crossing finish line These choices may be generated by substituting named entities in the story with concepts/roles using information provided by user when answering the second question Q2, or by mining statistical associations from large background corpora.

Following this interaction, the system has new knowledge about a race frame such as typical agents and actions associated with it. The race frame may not be complete but it is still useful. The race frame may be further constructed and filled out as the system encounters other stories that happen to mention races.

Figure 18:
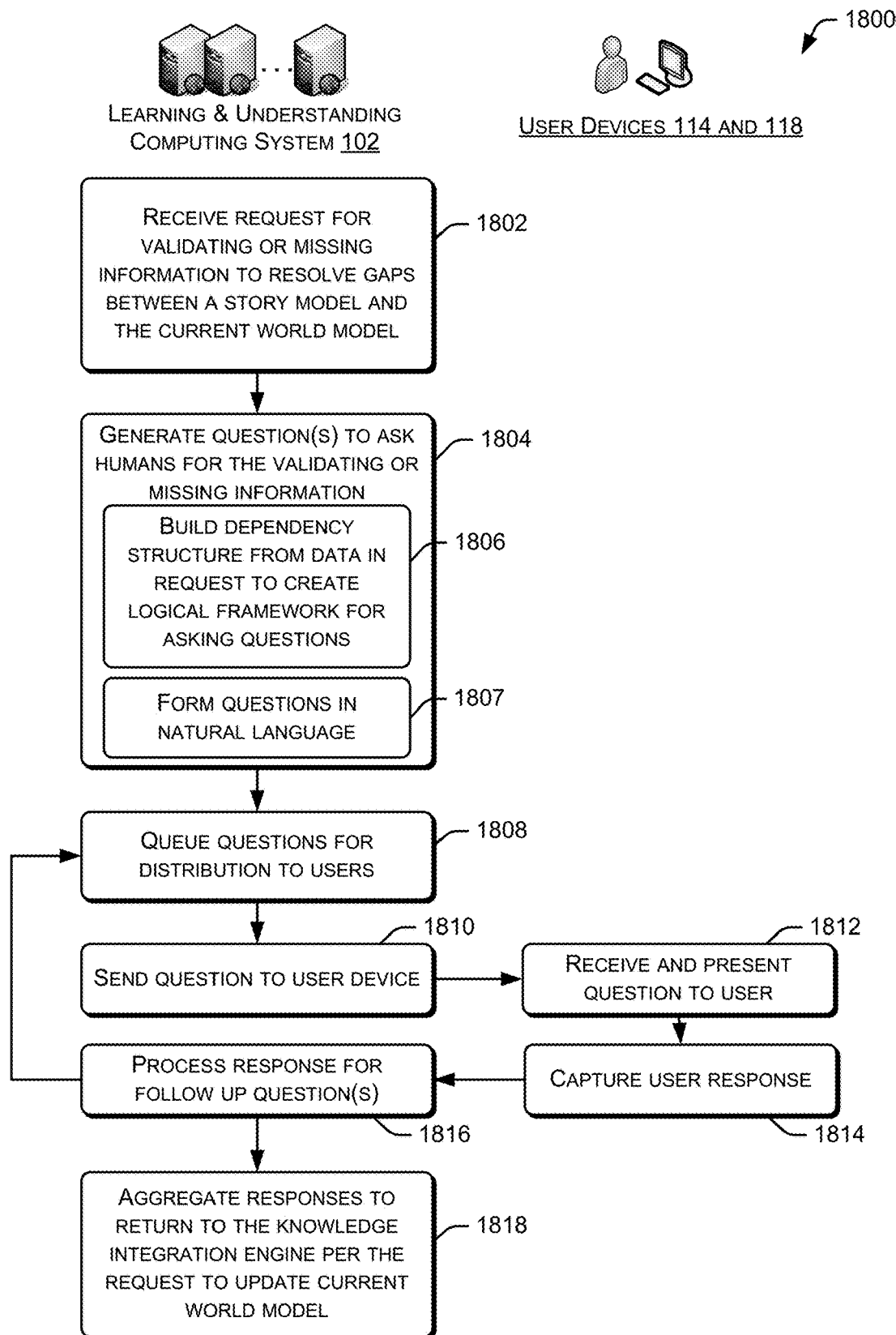
FIG. 18 is a flow diagram of a process for generating questions to submit to human users to verify and inform the system's current understanding of the story as currently reflected in the semantic structures and frames.

FIG. 18 shows a process 1800 for generating questions to submit to human users to challenge the computing system's current understanding of the story as currently reflected in the semantic structures and frames. The process 1800 is described with reference to the system architecture 100 and the dialog engine 142 of FIGS. 1, 4, 5, and 16. As above, the process 1800 is shown in two columns to generally depict operations performed by the system 102 separately from operations performed by the user devices 114 and 118.

At 1802, a request is received from the knowledge integration engine 136 to identify information that may trigger question formulation as discussed above. These factors may include missing information that can be used to resolve gaps between the story model and the current world model, as well as improve the system's confidence in its current interpretation. The request provides known information or current assumptions about a word, or semantic structure, but seeks further information from the user to validate the system's current interpretation.

At 1804, one or more questions are generated to discover the missing or validating information relevant to the request. In one implementation, at 1806, question generation involves building a dependency structure that allows the system to infer a dialog context for interpreting and answering a question. The dependency structure may be embodied as a tree-type data structure with root nodes and branches to children nodes that allows the dialog engine to logically traverse the structure to ask opening and follow-on questions. One such dependency structure is shown and described with reference to FIG. 17. At 1807, the natural language generation engine 1607 uses syntactic information, natural language templates associated with GSPs, and background corpora information passed in from the knowledge integration engine to render the beliefs from the story model and the current world model. In this way, the questions are formed in a natural language that a non-expert user will be able to understand.

At 1808, the questions supported by the dependency structures are queued for later distribution to the users. The questions may further be prioritized in a list so that questions are asked in an orderly fashion and as answers are received, certain dependency questions may be removed from the list as no longer necessary to ask. The questions can be ranked based on various metrics such as utility of acquiring the answer to the question. The answers to the questions can also be ranked based on various metrics such as the system's confidence in the answer choice.

At 1810, one or more questions are posed to the user by sending the questions from the computing system 102 over a network to the user's device 114/118. At 1812, the questions are presented to the user, such as in a dialog UI. At 1814, user input is collected and a response is returned from the user device to the computing system 102.

At 1816, the response is processed to determine what questions might be asked next. Additionally, at 1818, the responses are aggregated and returned to the knowledge integration engine for use in updating the current world model.

In another implementation, the dialog approach may be used to determine which instantiated GSP structures and frame structures should be added to the story model 132 or as updates to the current world model 138. The knowledge integration engine 136 determines which GSP structures and frame structures are true interpretations of a natural language text in a story by searching the space of possible uninstantiated GSP structures by combining a library of GSP structures according to a compositional grammar. These GSP structures are then instantiated with entities from a story as well as entities suggested from background corpora accessed via the knowledge induction engine. The instantiated GSP structures are rendered in natural language using the natural language generation engine 1607. The natural language renderings of the instantiated GSP structures are filtered using various resources, including for example textual entailment or n-gram resources, such as the text entailment detector 1316, from the knowledge induction engine 140.

The original text, along with filtered natural language renderings of the instantiated GSP structures, are presented to one or more users via the dialog engine 142. The knowledge integration engine 136 analyzes the user responses, performing reliability, probability, and threshold analysis, to determine which GSP instantiated structures should be added to the story model 132 with what confidences. The resulting beliefs may then be generalized and integrated into the current world model 138. In this way, the knowledge integration engine 136 implements an approach to automatically create, score, and refine generalized rules for mapping language/text to knowledge, via instantiating the GSP structures and frame structures. The knowledge integration engine 136 may further provide a mechanism to encode language mapping rules that are lexico-syntactic-semantic in the GSP language and/or as frames. User feedback elicited during the dialog sessions may be used to evaluate and revise the language mapping rules.

In addition to text interpretation and text-to-GSP rules, the system 102 employs a method for extracting common-sense reasoning rules. Implications and associations are hypothesized between GSP structures that have been confirmed as true interpretations of a given text. The implications and associations are presented to the user in a general form for confirmation. If these general propositions are confirmed, additional examples are searched and presented to the user for further confirmation and refinement.

Illustrative Dialog User Interfaces

Figure 19:
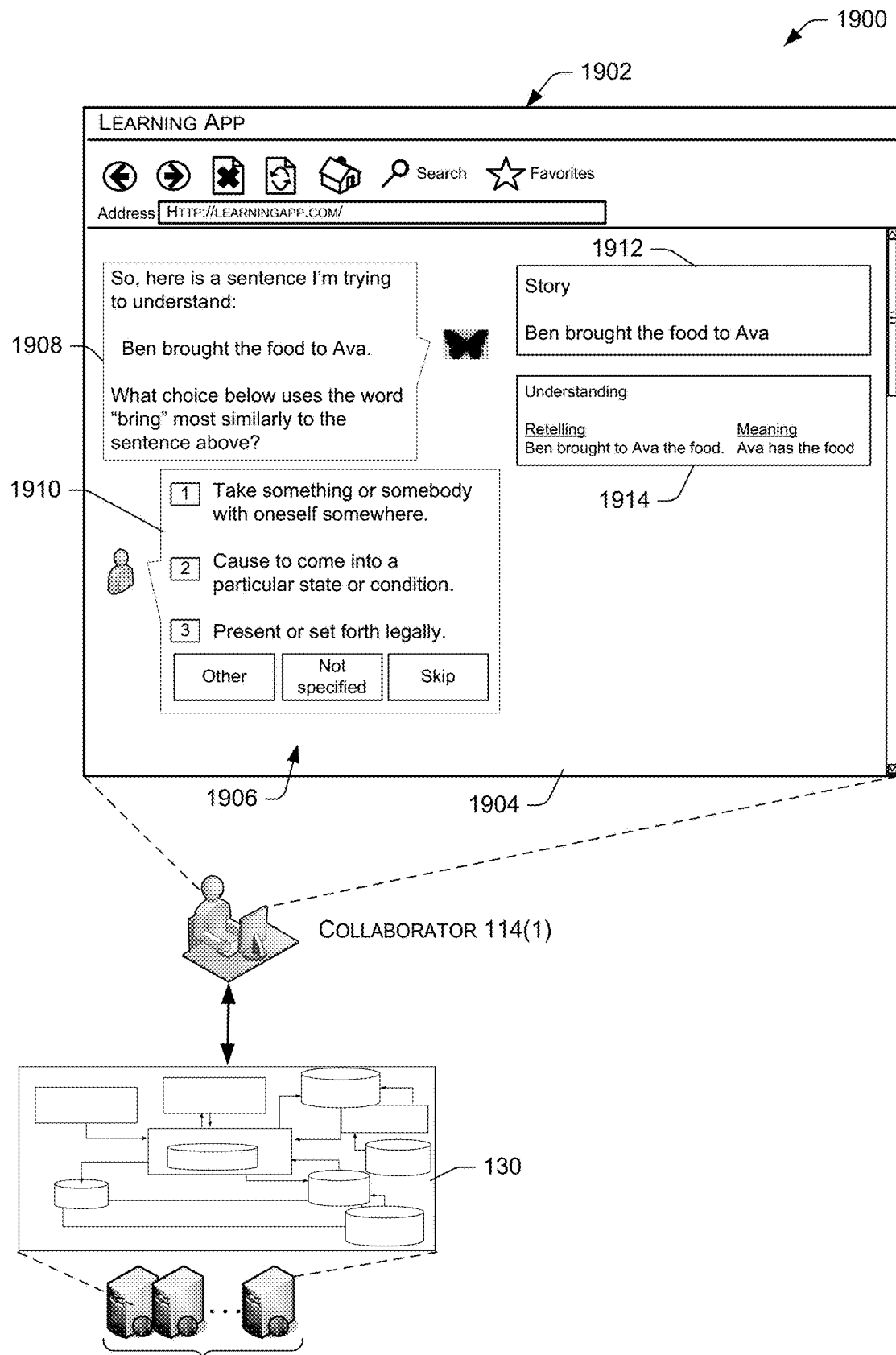
FIG. 19 shows a screen rendering of a dialog user interface presented on a user's device and seen by the user during a dialog session between the computing system and the human user.

FIG. 19 shows a dialog user interface (UI) 1900 that facilitates interaction between the computing system and the user. The UI shown in FIG. 19, and others following, are examples provided for discussion purposes. The actual interface can vary from the appearance in FIG. 19 as various types of questions are generated. For instance, one or more graphical features may appear different or may be omitted altogether depending on the questions, what information is being sought, the size/type of the user's screen, and so forth.

In FIG. 19, the dialog UI 1900 is illustrated as a first screen rendering 1902 that can be displayed on the user's device, such as collaborator's device 114(1), and seen by the user during a dialog session 1604 between the computing system 102 and the human user. The screen rendering 1902 is illustrated as a web page rendered within a browser. However, as noted above, this is merely one possible implementation and other technologies may be employed to facilitate presentation and electronic user entry of questions.

The screen rendering 1902 includes a primary area 1904 that includes a graphical dialog interface 1906 along the left side. The graphical dialog interface 1906 has a series of dialog boxes, such as boxes 1908 and 1910. The dialog boxes are shown attributed to the source through a graphical indication, with the top box 1908 being attributed as originating with the computer system (as represented by a butterfly icon, although other symbols may be used), and the lower box 1910 being attributed as originating with the user (as represented by the user icon). In this example, the system is trying to understand the word "brought" from the sentence "Ben brought the food to Ava" in the example Ben and Ava story. A question to learn about the sense of the word "brought" is provided in the top dialog box 1908, as follows:

So, here is a sentence I'm trying to understand:
Ben brought the food to Ava.
What choice below uses the word "bring" most similarly to the sentence above?

A response template offering multiple choices for possible answers is then placed into a second dialog box 1910. In this example, the options include:

1. Take something or somebody with oneself somewhere.
2. Cause to come into a particular state or condition.
3. Present or set forth legally.

While attributed to the user (as visually represented by the user icon), the dialog box 1910 is populated with multiple choice content received from the computer system. The user attribution conveys that the user is choosing one of the options to provide a response back to the computer system on this topic of word sense for the word "brought". The response dialog box 1910 further includes general action items of "other" to request other options, "not specified" to indicate that the story is not clear on this point, and "skip" when the user is uncertain of the answer to the question.

Also in the primary area 1904 are optional graphical boxes aligned along the right hand side. The graphical boxes may include a story description box 1912 to identify which story is being discussed and a story understanding box 1914 to summarize the system's current understanding of the story being considered.

In this example, suppose the user selects option 1, which provides the sense of the word "bring" as used in "Ben brought the food to Ava" to mean "take something or somebody with oneself somewhere." When the dialog engine receives this answer, it traverses the associated dependency structure to identify the next question. This next question is then returned to the user device for presentation to the user, as illustrated in FIG. 20.

Figure 20:
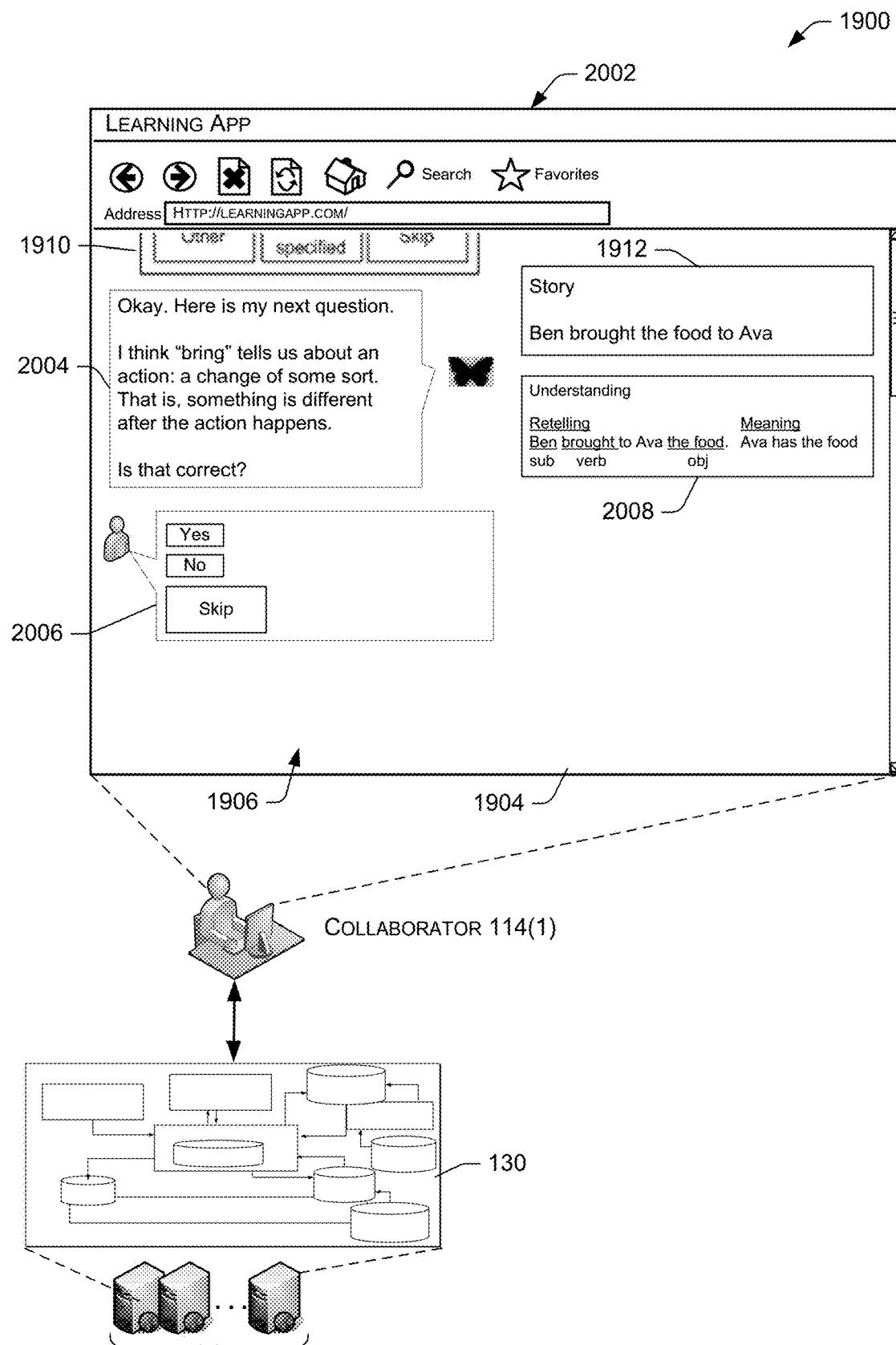
FIG. 20 shows a second screen rendering of the dialog user interface presented on the user's device following the screen rendering of FIG. 19 to illustrate a next question in the dialog session.

FIG. 20 shows a second screen rendering 2002 of the dialog UI 1900 presented on the user's device following the screen rendering 1902 of FIG. 19 to illustrate a next question in the dialog session. In this example, the dialog interface 1906 has been visually shifted upward so that the edge of the last dialog box 1910 is partially visible at the top of the primary area 1904. Beneath this dialog box 1910 is a new dialog box 2004 containing the next question that is articulated based on the user response to the previous question. Since the user answered with option 1, the next question says:

Okay. Here is my next question.
I think "bring" tells me about an action: a change of some sort. That is, something is different after the action happens.
Is that correct?

A response dialog box 2006 is also presented to the user with responsive options of "yes" and "no". Suppose the user agrees with the statement, and answers "yes" in the dialog box 2006. This response is returned to the dialog engine, which again traverses the associated dependency structure to identify the next question. This next question is then returned to the user device for presentation to the user, as illustrated in FIG. 21.

Also shown in the primary area 1904 in FIG. 20 is an updated version of the story understanding box 2008 to reflect information confirmed in part by the user response. Here, syntactic roles are added to the sentence so that "Ben" is identified as the subject, "brought" as the verb" and "the food" as the object.

Figure 21:
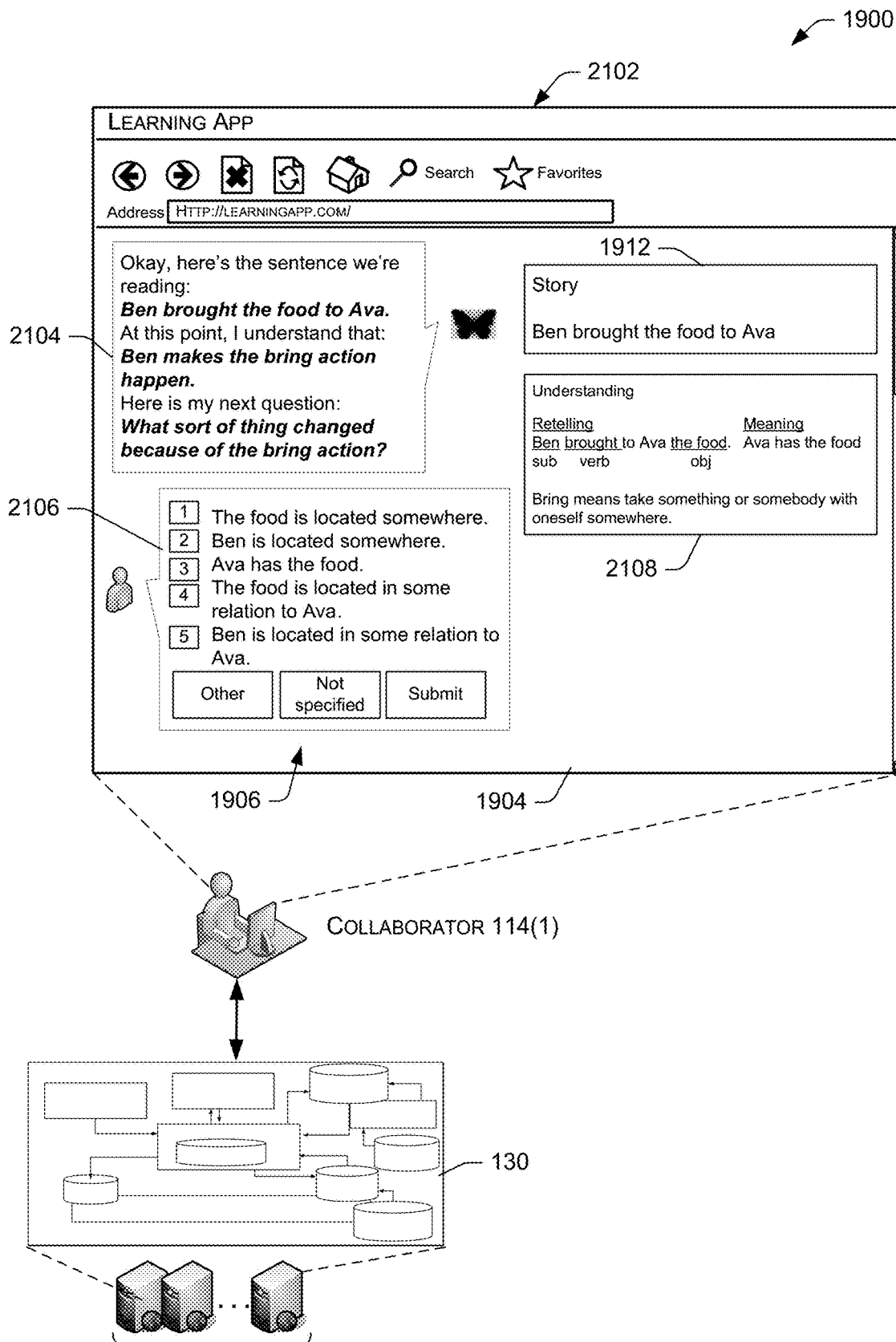
FIG. 21 shows a third screen rendering of the dialog user interface presented on the user's device following the second screen rendering of FIG. 20 to illustrate yet another next question in the dialog session.

FIG. 21 shows a third screen rendering 2102 of the dialog user interface 1900 presented on the user's device following the second screen rendering of FIG. 20 to illustrate yet another next question in the dialog session. Since the user confirmed in the last response the system's understanding of the word "bring" indicating an action, the next question presented in dialog box 2104 investigates further knowledge that the user might understand about the story. In this example, the question may be:

Okay, here's the sentence we're reading:
Ben brought the food to Ava.
At this point, I understand that:
Ben makes the bring action happen.
Here is my next question:
What sort of thing changed because of the bring action?

A response dialog box 2106 is also presented to the user with multiple choices for possible answers. In this example, five options are presented:
1. The food is located somewhere.
2. Ben is located somewhere.
3. Ava has the food.
4. The food is located in some relation to Ava.
5. Ben is located in some relation to Ava.

The user may select one or more of these options, or one of the general action items in the box 2106 of "other" to request other options, "not specified" to indicate that the story is not clear on this point, and "submit" to send the answer back to the system.

An updated version of the story understanding box 2108 is provided in primary area 1904 to reflect information confirmed in part by the previous user response. The confirmed meaning of "bring means take something or somebody with oneself somewhere" is provided to show an enhanced understanding of the sentence in the story.

The dialog engine continues to ask more questions until all of the relevant questions represented in the dependency structure have been exhausted. The dialog engine may further ask open ended reading comprehension questions. This body of knowledge, such as that represented in the story understanding box 2108, is aggregated by the answer aggregator 1622 and returned to the knowledge integration engine 136 for further processing.

Illustrative Distributed Dialog System

As previously introduced, the dialog engine 142 may establish dialog sessions with a single user in a linear fashion to discuss the natural language text of a story. These dialog sessions often extend beyond one-shot exchanges in that multiple pieces of information are sought and later exchanges may depend on answers to earlier questions. For example, when the computing system is working on the sentence, "Frogs breathe through their skin", the dialog engine 142 may be tasked by the knowledge integration engine 136 to engage in a dialog session with a user to learn that breathing is a circular process of inhaling and exhaling air; the purpose of which is to obtain oxygen that the frog body needs, and most animals breathe through their noses instead of through their skin. In some cases, such extended interactions with a single user may place a high cognitive load on the user and the serial nature of the dialog session takes time to execute.

To accelerate the learning process, the dialog sessions may be expanded to engage multiple users in parallel. The dialog sessions are segmented into sub-dialogs in which certain individual questions within a discussion about the story may be answered by users independently of others. In the frog dialog session, for example, the mechanism and purpose of breathing may be explored independently of the organs involved. Distributing question-and-answer sessions over multiple users, and engaging the users in parallel, allows the computing system to learn more quickly.

Accordingly, in certain implementations, the dialog engine 142 employs a distributed dialog dispatcher 1620 to break up the dialog sessions into sub-dialog sessions and distribute those sub-dialog sessions to a wider audience of users in parallel. In one implementation, the distributed dialog dispatcher 1620 leverages the dependency structure associated with the sentence or text string to break up the dialog sessions, allowing the system to flexibly manage the cognitive load placed on the user by distributing its questions to multiple users. In this way, the system is logically having a single dialog session whose load is distributed to multiple users in practice.

Figure 22:
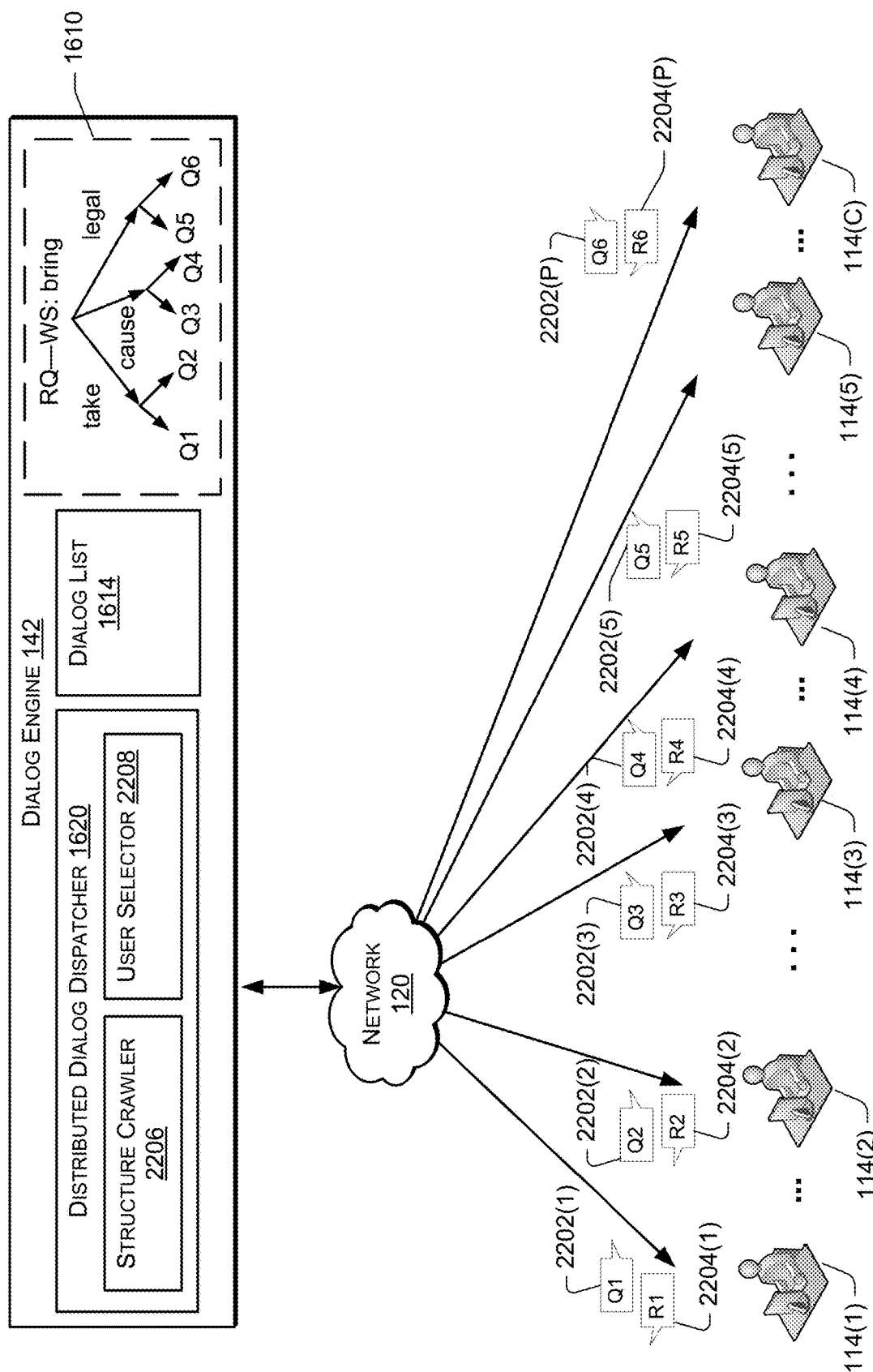
FIG. 22 is a block diagram with diagrammatic illustrations to show an implementation of a distributed dialog mechanism for distributing the same or different questions to multiple human users in parallel.
Figure 23:
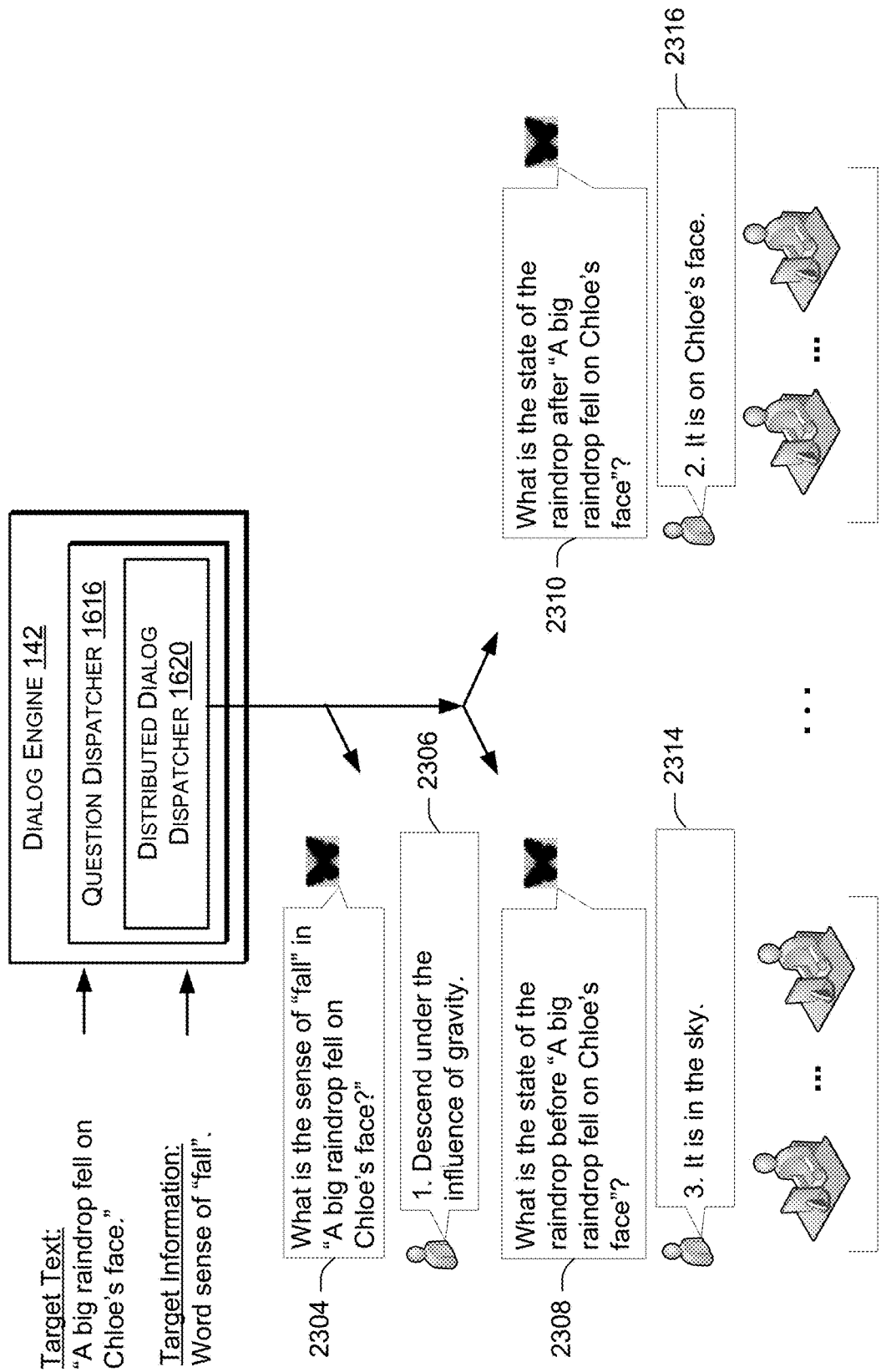
FIG. 23 is a diagrammatic illustration of a first example distributed dialog session involving multiple users.
Figure 24:
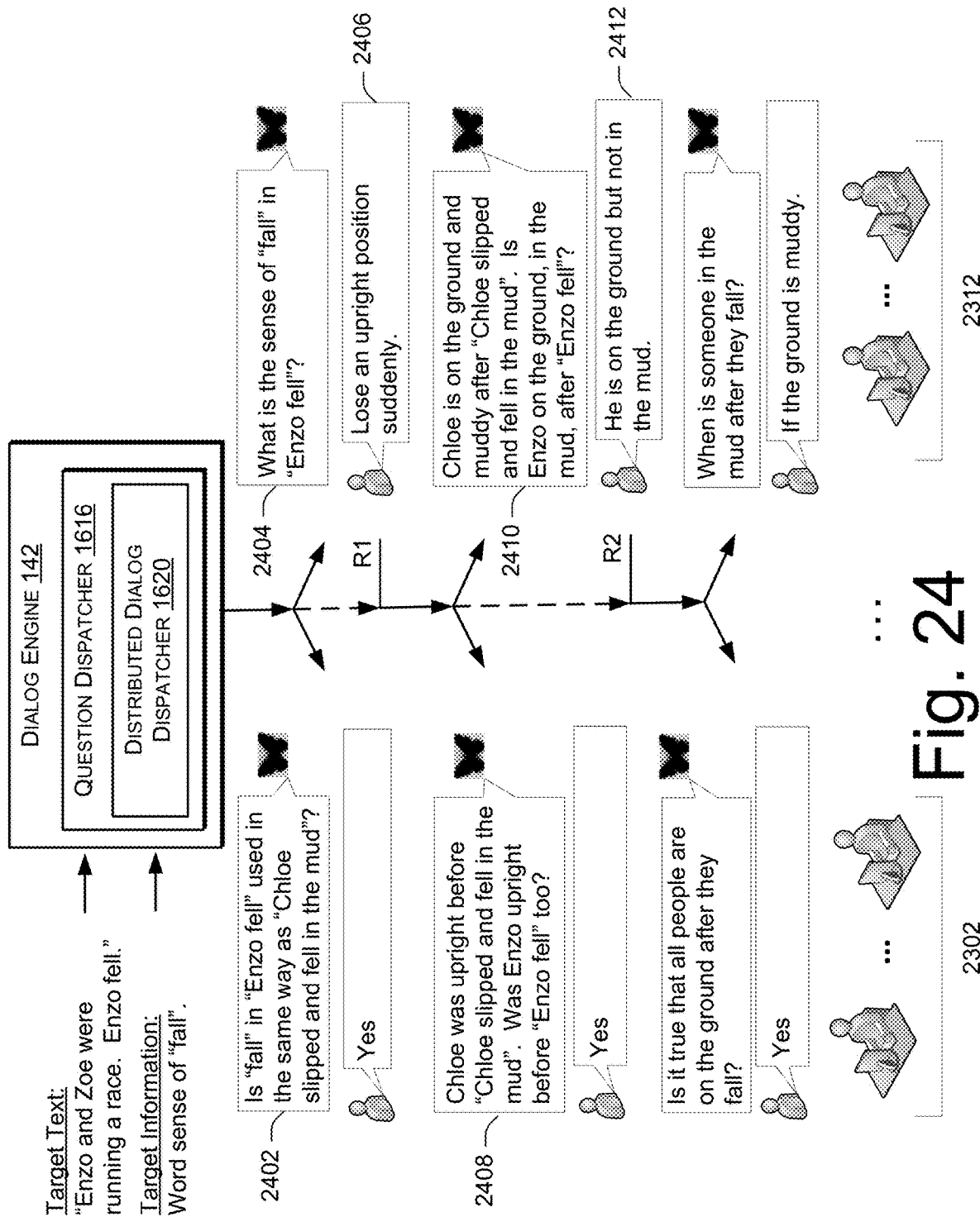
FIG. 24 is a diagrammatic illustration of a second example distributed dialog session involving multiple users.

FIGS. 22-24 illustrate one example implementation of the distributed dialog system in more detail. FIG. 22 shows the dialog engine 142 in which the distributed dialog dispatcher 1620 distributes questions 2202(1), 2202(2), . . . , 2202(P) over a network 120 to multiple users, such as collaborators 114(1)-(C). The same questions may be posed to multiple people, or different questions may be distributed to different sets of users. The collaborators 114(1)-(C) may be viewed as a crowd of users who are informally gathered or formally organized through a service like Amazon Mechanical Turk™. The users review the questions and return their responses 2204(1), 2204(2), . . . , 2204(P) to the dialog engine 142.

The distributed dialog dispatcher 1620 includes a structure crawler 2206 to iterate through the dependency structures, such as dependency structure 1610 or their ordered representation in the dialog list 1614, based on the user responses to identify the next question. The structure crawler 2206 uses the user response from the previous question to choose the appropriate branches and discover what else needs to be learned. In some cases, the dependency structure 1610 leads to multiple possible follow-up questions, often represented as sibling nodes in the data structure. When this occurs, the different options for next questions may be presented in parallel to different collaborators.

A user selector 2208 may then select one or more groups of people to send the follow up questions. The user selector 2208 may elect to send the same question to multiple people, such as the group represented by collaborators 114(1)-(2). Alternatively, the user selector 2208 may decide to send different question to different users or sets of users. For instances, as illustrated in FIG. 22, the user selector 2208 may choose to send different questions 2202(1)-(P) to different users, such as collaborators 114(1)-(C). In this manner, questions can be assessed and answered in parallel by many users. This permits the computing system to scale and learn more quickly. The computing system may be reading any number of books in parallel and engaging any number of people in parallel, thereby allowing the system to gain understanding more rapidly.

The user selector 2208 may use heuristics and profile information to determine who should receive the questions. In one implementation, the collaborators may have profiles that provide information about them, such as age, reading level, example books they have read, etc. Similarly, the stories or text may have associated profile information, such as reading or grade level, vocabulary rating, and so forth. The user selector 2208 may compare the profiles for users with the stories and attempt to map appropriate levels between the two. For instance, if the text is suitable for a high school reading level, the user selector 2208 may identify users with a high school reading level or higher.

FIG. 23 illustrates one example distributed dialog session involving multiple users. In this example, the dialog engine 142 is working with the sentence, "A big raindrop fell on Chloe's face". The target information for the dialog session is to discover or confirm the proper semantic interpretation of this sentence, beginning with the word sense of the verb "fall". The distributed dialog dispatcher 1620 may ask a first set of users 2302 an opening question, as represented in dialog box 2304, of "What is the sense of "fall" in "A big raindrop fell on Chloe's face?". Suppose that the response from a majority or all of the users in the first set is option 1, "descend under the influence of gravity", as represented by dialog box 2306.

Based on this response, structure crawler 2206 discovers from the dependency structure that there are two possible follow-on questions pertaining to the before and after states of the raindrop. Further, the two follow-on questions are represented by sibling nodes in the dependency structure, so the questions may be asked in parallel to different users. Accordingly, the user selector 2208 chooses to send the first follow-on question, represented by a dialog box 2308 to the same first set of users 2302. The first follow-on question asks, "What is the state of the raindrop before 'A big raindrop fell on Chloe's face'"? In parallel, the user selector 2208 sends the second follow-on question, represented by a dialog box 2310, to a different set of users 2312. The second follow-on question asks, "What is the state of the raindrop after 'A big raindrop fell on Chloe's face'"?

Each set of users may then answer these questions concurrently. For the first follow-on question 2308, suppose most or all of the users in the first group 2302 chose option 3, "It is in the sky" as the before state of the raindrop, as represented by dialog box 2314. Similarly, for the second follow-on question 2310, suppose most or all of the users in the second group 2312 choose option 2, "It is on Chloe's face", as the after state of the raindrop, as represented by dialog box 2316. As shown in this example, the questions are distributed to two groups and yet the system achieves the same result as if it had asked the two questions sequentially to the same person. But, the same result was achieved in less time and put less load on each individual user.

FIG. 24 illustrates another example distributed dialog session involving multiple users. In this example, the dialog engine 142 is working with the text, "Enzo and Zoe were running a race. Enzo fell". The target information for the dialog session is to discover or confirm the correct semantic interpretation of the two sentences, starting with the word sense of the word "fall". The distributed dialog dispatcher 1620 may ask an opening question to a first set of users 2302, such as "Is 'fall' in 'Enzo fell' used in the same way as Chloe slipped and fell in the mud?", as represented in dialog box 2402. Concurrently, the distributed dialog dispatcher 1620 may ask a different opening question to a second set of users 2312, such as "What is the sense of 'fall' in 'Enzo fell'?", as represented in dialog box 2404.

In FIG. 24, suppose the second set of users 2312 generally respond to the second opening question 2404 with an answer "lose an upright position suddenly" as represented by the dialog box 2406. Based on this response (R1), two other follow-on questions are generated, as represented by dialog boxes 2408 and 2410. The distributed dialog dispatcher 1620 distributes a first follow-on question 2408 to the first group of users 2302, asking "Chloe was upright before 'Chloe slipped and fell in the mud'. Was Enzo upright before 'Enzo fell' too?", as represented by dialog box 2408. In parallel, the distributed dialog dispatcher 1620 distributes the second follow-on question 2410 to the second group of users 2312, asking "Chloe is on the ground and muddy after 'Chloe slipped and fell in the mud'. Is Enzo on the ground, in the mud, after 'Enzo fell'?", as represented by dialog box 2410. Notice that these questions may be asked independently from each other and hence, the different user groups may provide responses to the questions without having to know about the other questions and groups who are answering them. In the described implementation, these follow-on questions are found at sibling nodes in the dependency structure, and the distributed dialog dispatcher is free to distribute them to different users.

Suppose the response to the second follow-on question 2410 is generally that Enzo is on the ground but not in the mud, as represented by the dialog box 2412. Based on this response (R2), two more follow-on questions may be generated and distributed in parallel to groups of users. To the first group of users 2302, the distributed dialog dispatcher 1620 distributes a follow-on question asking, "Is it true that all people are on the ground after they fall?", as represented by a dialog box 2414. To the second group of users 2312, the distributed dialog dispatcher 1620 distributes another follow-on question asking, "When is someone in the mud after they fall?", as represented by a dialog box 2416.

The users may respond to these follow-on questions and the dialog session may continue until the dialog engine 142, under direction from the knowledge integration engine 136, has asked all of the questions about a story. The responses are aggregated and returned to the knowledge integration engine 136 for use in revising the current world model 138, and aligning the story model 132 to the revised current world model. After the questions are exhausted and the story is more deeply understood, the story model is deemed completed, as will be described in the next section with reference to FIG. 26.

Figure 25:
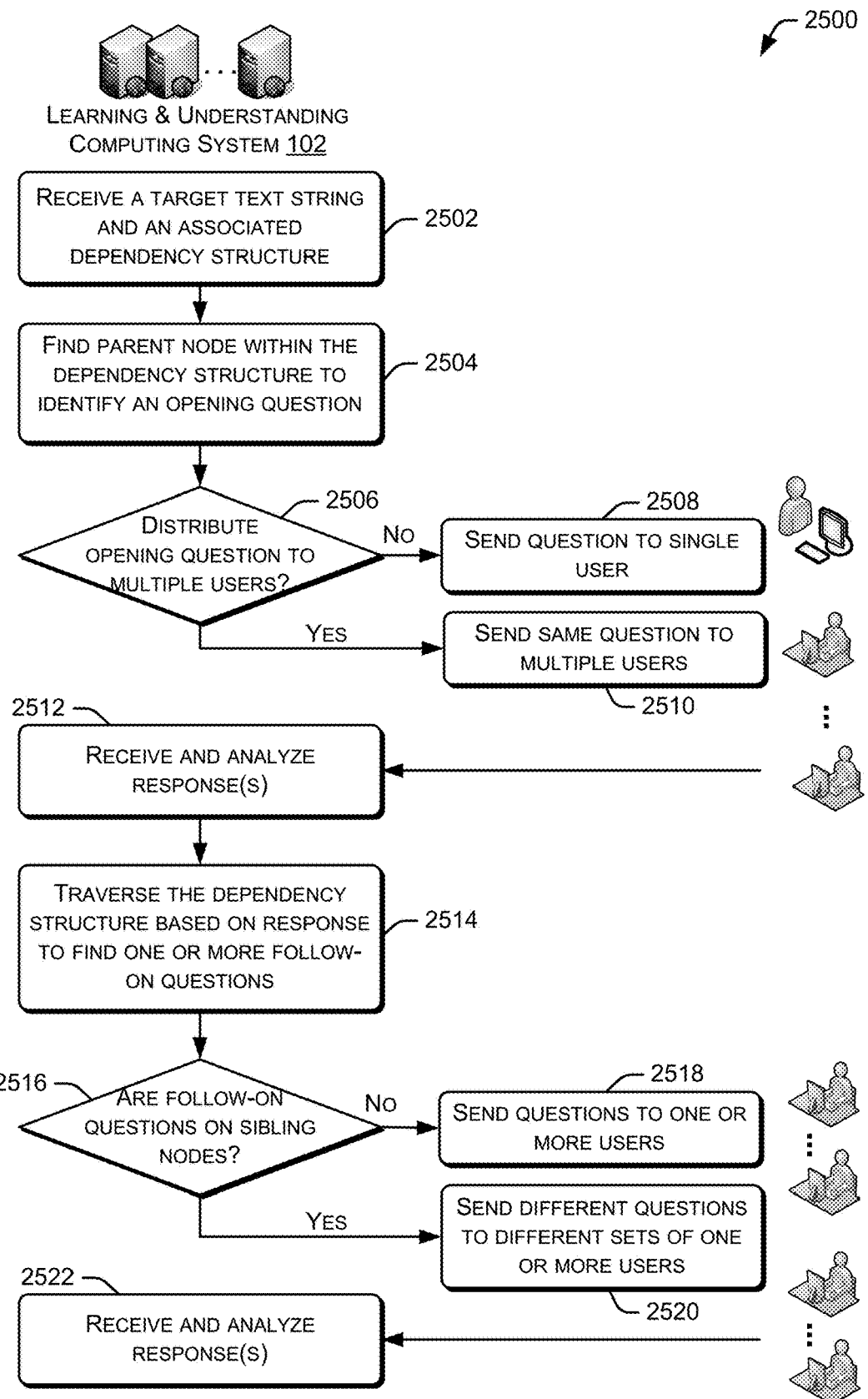
FIG. 25 is a flow diagram showing a process for distributing questions during dialog sessions across multiple users.

FIG. 25 shows a process 2500 for distributing questions during dialog sessions to multiple users. The process 2500 is described with reference to the system architecture 100 and the dialog engine 142 of FIGS. 1, 4, 5, and 16, and 22. The process 2500 may be executed by the computing system 102, and specifically by the dialog engine 142.

At 2502, a target text string and an associated dependency structure are received. The text string may be a sentence, for instance, or other phrase or clause. The dependency structure is a tree-type data structure in which children nodes represents possible follow-on questions depending upon answers to the parent node. One dependency structure is shown for discussion purposes in FIG. 17.

At 2504, a root or parent node is first found within the dependency structure to identify an opening question in a sequence or series of questions to be asked during a dialog session. For instance, with reference to FIG. 23, the dialog engine may initiate a dialog session to discover the word sense of "fall" and one parent node in the corresponding dependency structure may represent an opening question of "What is the sense of 'fall' in 'A big raindrop fell on Chloe's face'?". At 2506, the dialog engine determines whether to send that question to one or more users. If one user (i.e., the "no" branch from 2506), the question dispatcher sends the question to a single user, at 2508. On the other hand, if multiple users (i.e., the "yes" branch from 2506), the question dispatcher sends the same question to multiple users, at 2510. Multiple users may be selected in situations where the system desires to survey the users, such as when the questions are offering multiple choice answers with many possible answers. A majority of one choice may serve as the appropriate answer.

At 2512, one or more responses are received from the user(s) and analyzed. Based on these answers, at 2514, the structure crawler of the dialog engine traverses the dependency structure to find one or more follow-on questions. In some cases, this involves moving down the tree-type structure from the parent node to one or more child nodes. If multiple children nodes are at the same branch, the associated follow-on questions may be considered independent of one another. Accordingly, at 2516, it is determined whether the follow-on questions represented in the dependency structure are associated with sibling nodes. If they are (i.e., the "no" branch from 2516), the question may be sent to one or more users, at 2518. Conversely, if there are multiple sibling nodes (i.e., the "yes" branch from 2516), the different follow-on questions may be distributed to different sets of one or more users per set, at 2520.

At 2522, one or more responses are received from the users and further analyzed. If more questions can be asked about the same sentence or text string, the process 2500 continues with further traversing of the dependency structure, at 2514. If all questions within the dependency structure have been pursued, the process 2500 may continue with a new text string at 2502.

Illustrative Story Model

After all of the user questions are asked and the responses are processed, the knowledge integration engine 136 does the final alignment of the story model with the current world model. The knowledge integration engine 136 has gained a sufficient degree of confidence and is ready to output the story model 132 for storage and indexing. The story model 132 evolves throughout the process to its final state, as will now be illustrated with reference to FIG. 26.

Figure 26:
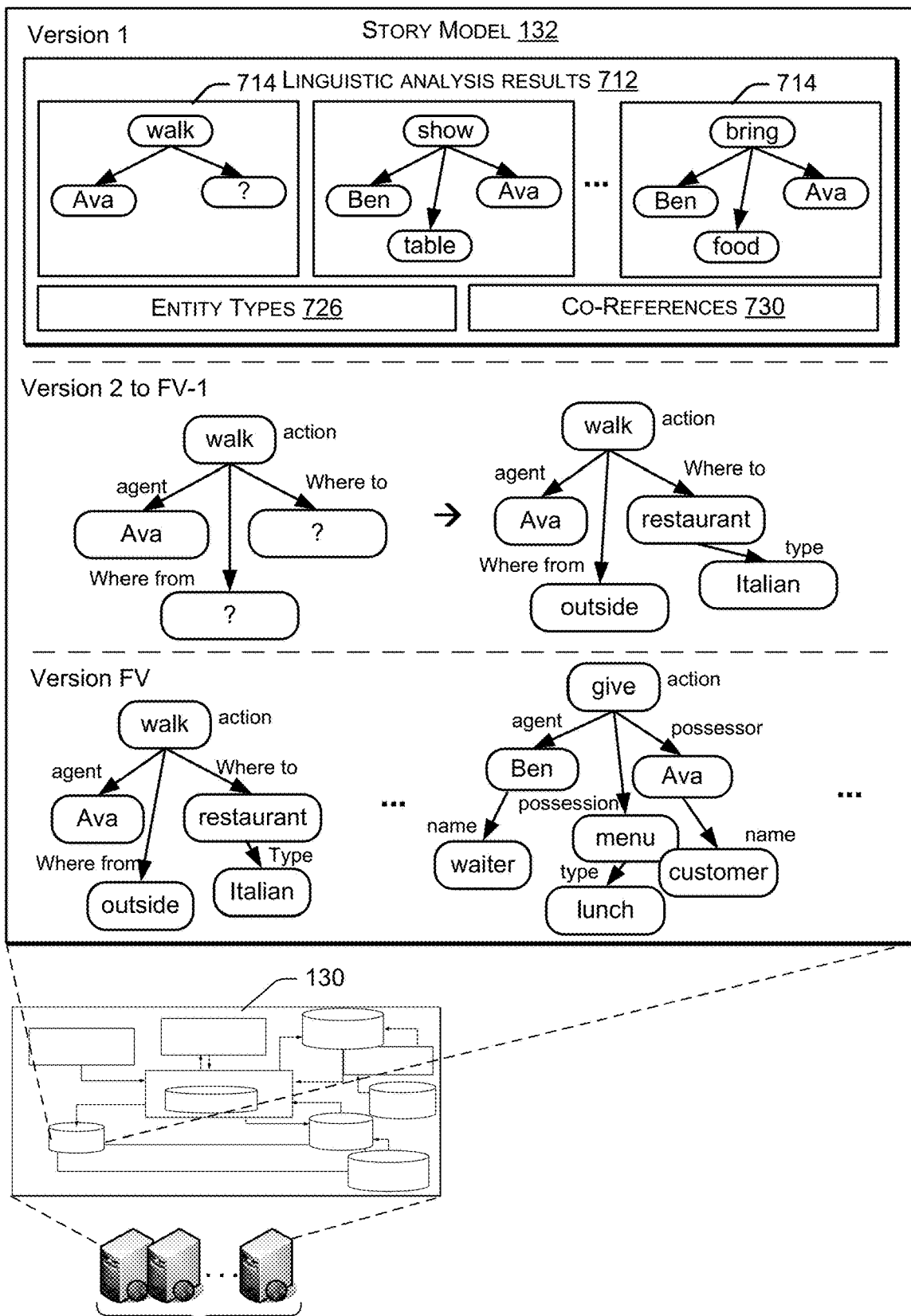
FIG. 26 is a block diagram that illustrates the story model and how the data structures contained in the story model evolve over time as a result of the syntactic processing, semantic processing, and human interaction.

FIG. 26 shows an exemplary illustration of the story model 132 and how the story model evolves over time as a result of the processes described herein. For each story, the story model 132 is initially populated with the linguistic analysis results 712 containing the linguistic structures 714, entity types 726 and co-reference chains 730 derived from the syntactic parse of the story. This is illustrated for explanation purposes in FIG. 26 as "version 1". Through the semantic processing, inferring, and human dialog sessions, additional information about the story is learned. Semantic structures and frames representing the story are iteratively revised to fill in more nodes and to add more relationships. This is represented in FIG. 26 by the versions 2 through FV-1 (i.e., next to last final version). Early, in version 2 for example, the system might discover that an action for "walk" includes information pertaining from where the person walked and to where he/she is going. Accordingly, a semantic structure is created and information is sought to fill in the nodes. Over time, the system may further learn that the person, Ava, was walking to a restaurant, and that restaurant was an Italian restaurant.

After most or all of the semantic structures and frames are filled in, and confidences about the semantic structures and frames rise to a sufficient threshold, and the user has confirmed much or all of the assumptions, a final version may be generated as represented by the version FV (final version) in FIG. 26. The final version FV includes finished semantic structures and frames that are completely filled in. Words have their correct sense, and relationships between them are true and correct. Further, information not implicit in the story has been inferred and added. At this point, the story model is deemed to be satisfactorily aligned with the current world model. For further confidence, the system may further pose reading comprehension questions to the users so that they can confirm whether the system's understanding is correct. The final version of the story is stored and indexed. All of its knowledge is also contained in the current world model which continues to evolve as more stories are consumed.

Growth of Computing System's Understanding

Figure 27:
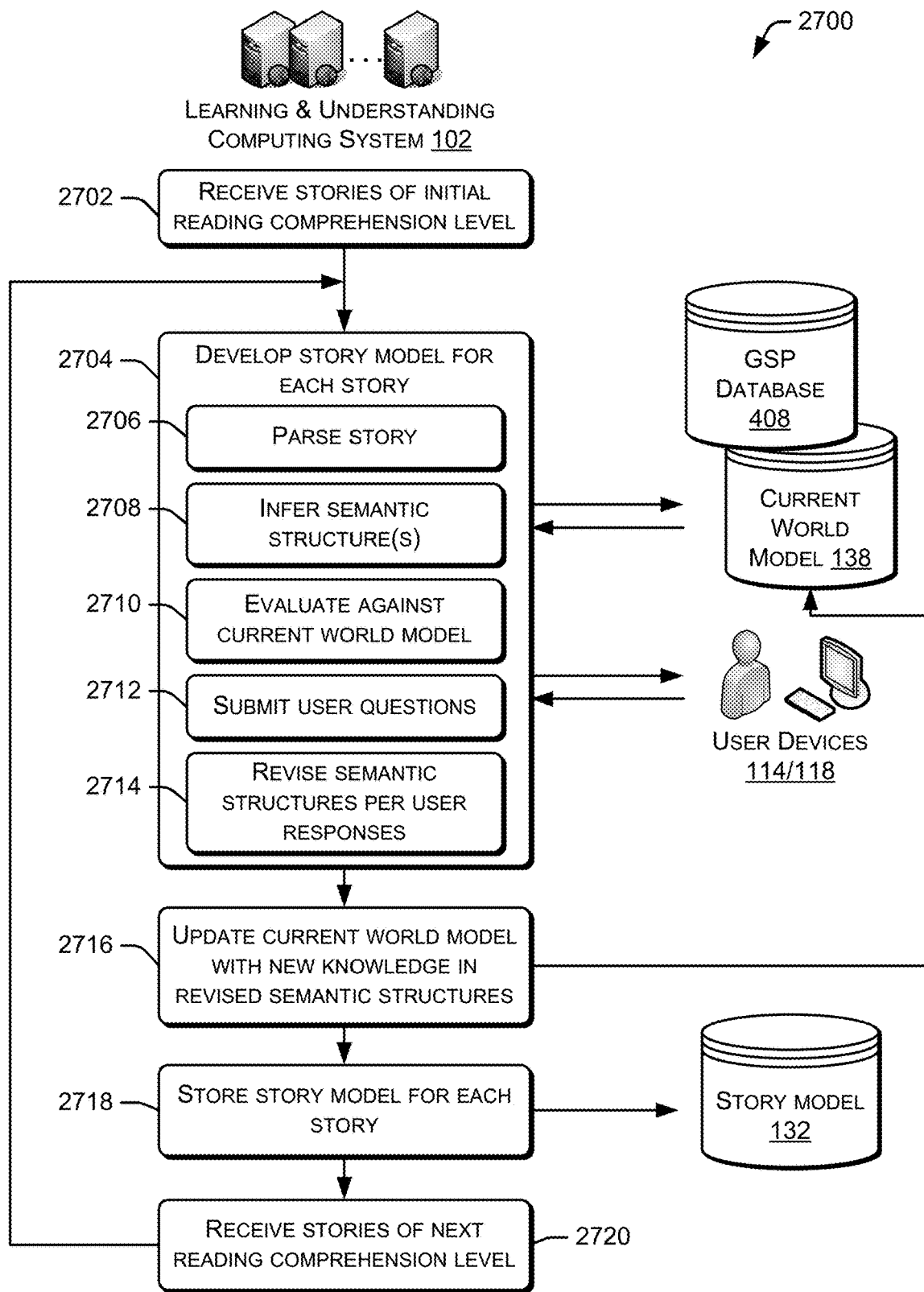
FIG. 27 is a flow diagram showing a process for growing computer understanding over time through processing and inferring increasingly more difficult natural language stories and human interaction.

FIG. 27 shows a process 2700 for growing computer understanding over time through the iterative processing of increasingly more difficult natural language stories and the engagement of humans to evaluate, improve, and validate the system's understanding. The process 2700 is performed by the learning and understanding computing system 102. Generally, semantic structures, such as GSPs and frame structures, are inferred using the inference processes described above to generate representations of the stories. The inference process uses information maintained in the current world model 138, as well as other resources throughout the system (GSP database 408, induced knowledge resources 412, etc.). Dialog sessions are conducted with one or more human users to evaluate the semantic structures as understandings of the stories. Any knowledge learned through the inference process and human dialog is stored in the current world model as revised and expanded semantic structures. As more stories are ingested and processed, the current world model expands over time, thereby increasing the system's understanding. With the expanded knowledge, the computing system becomes capable of handling more difficult subject matter with higher reading comprehension levels.

According to one implementation, at 2702, multiple stories of an initial reading comprehension level are received by the computing system 102 over a first period of time. For instance, the computing system 102 may ingest easy texts to start, such as early stage reading levels of pre-school, kindergarten, or early grades. The stories may be accompanied by a number of reading-comprehension questions. At 2704, for each story, a story model is developed to represent the story. The development of the story model includes the processes described previously. For instance, at 2706, the story is parsed to syntactically analyze the story and produce linguistic analysis results (e.g., syntactic parse, predicate-argument structure, entity type assignment, co-reference) for each sentence. This may be performed, for example, by the story parsing engine 134.

At 2708, one or more semantic structures are inferred as a representation of each parsed sentence by semantically processing the syntactic representation of the parsed sentence. In one implementation, the knowledge integration engine 136, knowledge induction engine 140, and belief representation and reasoning framework 144 perform various tasks in support of this act 2708 to create an initial semantic representation, in terms of a small number of semantic primitives, using the linguistic analysis results. These modules draw upon the system resources, such as the current world model 138 of what is true about the world, the GSP database 408, and the induced knowledge resources 412 induced automatically from large language corpora 410, as described above in more detail. At 2710, the evolving story model is evaluated against the current world model to determine, in part, where the story model does not contain a high-confidence semantic representation that fits well with the known frames in the current world model 138.

At 2712, a dialog session is established with one or more human users who have also read the story to probe the user's understanding of the story, and/or to improve, test, or challenge the system's understanding of the story. The questions are submitted to the user devices 114/118 and presented to the user for review and consideration. At 2714, responses are received from the user devices and used to revise semantic structures. The users' answers may be applied to update the system's understanding of the story expressed in the current world model 138 of what is true about the world. The dialog engine 142 may be used to facilitate the dialog session and the knowledge integration engine 136 may be used to revise the semantic structures according to the user feedback.

At 2716, the current world model 138 is updated with any new knowledge learned from the dialog session and any revisions to the semantic structures. This knowledge may be used to further create new, uninstantiated GSP structures that are stored in the GSP database 408. As the computing system 102 reads and processes more stories, more GSP structures (both uninstantiated and instantiated) are created over time and the resources in the GSP database 408 and the knowledge in the current world model 138 increase over time. The current world model 138 can be made up of a collection of frames, which are probability distributions over propositions (including but not limited to GSPs). As the computing system 102 reads and understands more text, it creates new frames that are used to interpret the stories.

At 2718, the story model for the current story is stored in the story model data store 132 and maintained by the computing system 102. The story models may be used in the future for inferring or understanding other stories, some with higher reading comprehension levels.

At 2720, the computing system 102 continues to receive and process additional stories of increasing complexity, such as stepping up to the next reading comprehension level. With each ingested new story, the computing system 102 again develops a story model (at 2704) which involves inferring meaning from the story and testing its understanding with humans. As the story model is developed, the system 102 updates the current world model 138 with new knowledge (at 2716) and stores the story model for future use (at 2718). This process is repeated over and over so that over time the learning and understanding computing system 102 builds up a large and increasingly sophisticated knowledge base expressed as knowledge data structures of entities and propositions, such as through an associated set of instantiated generative semantic primitives and frame structures.

Figure 28:
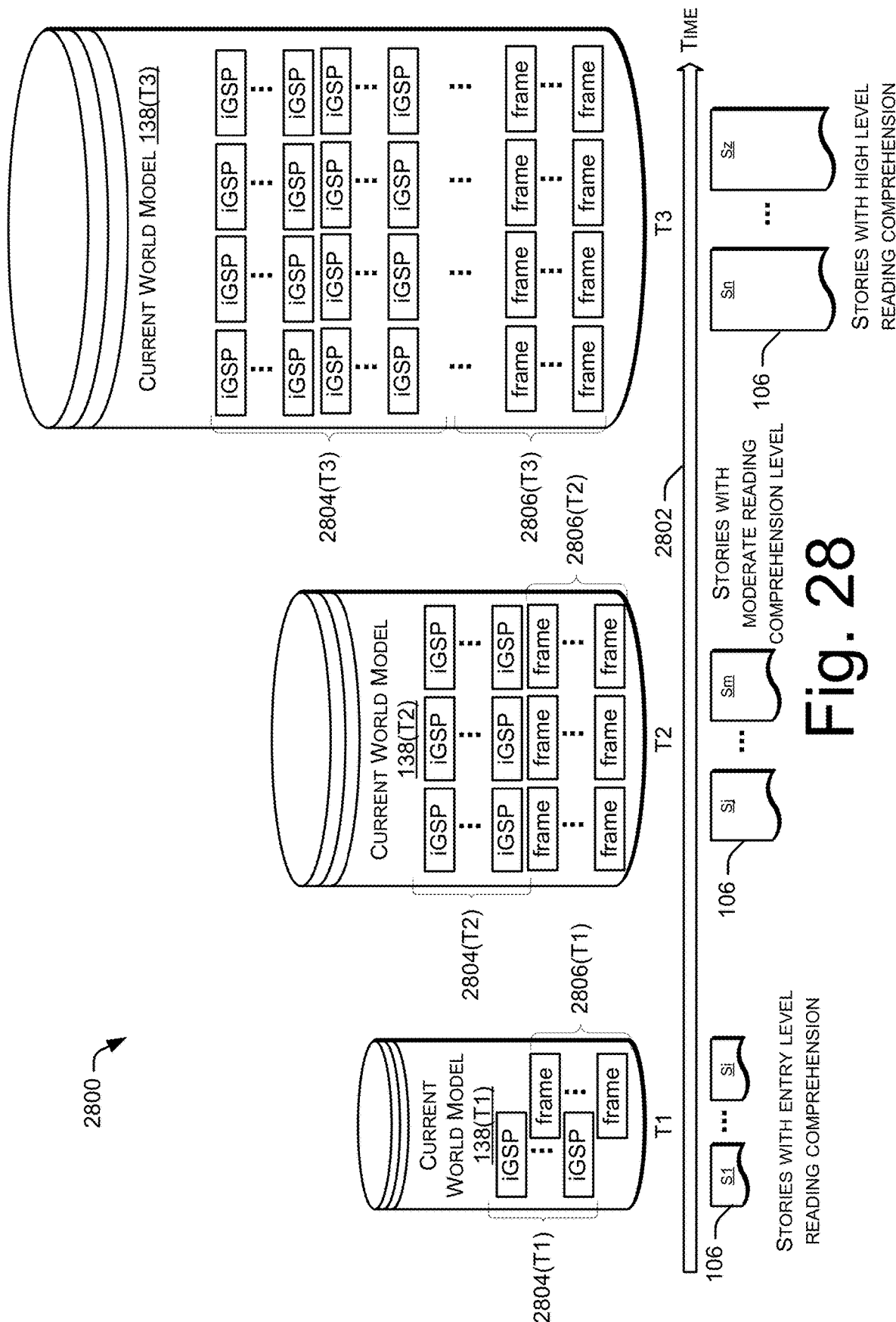
FIG. 28 is a diagrammatic illustration showing how knowledge, embodied as semantic structures in a current world model, grows over time as more stories of increasing difficulty are subjected to syntactic processing, semantic processing, and human evaluation through dialog.

FIG. 28 is a diagrammatic illustration 2800 showing how knowledge, embodied as semantic structures in a current world model 138, grows over time as more stories of increasing reading comprehension levels are subjected to syntactic processing, semantic processing, and human evaluation through dialog. At an early or initial instance along a timeline 2802, the learning and understanding computing system 102 reads relatively easy stories S1-Si (reference generally as 106) with an initial or entry level reading comprehension. These stories may be appropriate, for example, for kindergarten students or early grade school students. The current world model 138 may be pre-populated with some semantic structures or built from scratch. At time T1, the current world model 138(T1) is shown having a relatively smaller set of instantiated GSP structures 2804(T1) and frame structures 2806(T1).

Over time, the system 102 reads and processes more stories Sj-Sm, which are more complex than the entry level stories S1-Si. For instance, the stories Sj-Sm may be considered moderate reading comprehension level, such as upper grade school or perhaps middle school and junior high. At time T2, the current world model 138(T2) expands with more knowledge, as shown by substantially more sets of instantiated GSP structures 2804(T2) and frame structures 2806(T2).

Similarly, continuing over time, the system 102 reads and processes even more stories Sn-Sz, which are more complex than the previous stories S1-Sm. These stories Sn-Sz may represent texts of higher reading comprehension levels, such as those found in high school or at the university level. At time T3, the current world model 138(T3) is expanded to house significantly more sets of instantiated GSP structures 2804(T3) and frame structures 2806(T3).

Accordingly, the computing system's understanding of language is a time dependent, probabilistic network of beliefs as expressed through these semantic structures. The network expands over time as the computing system reads and understands more stories. The system's understanding may be represented through many different forms of visualization, which allow end users and developers to explore the system's understanding and learn more about how the system works and is working.

Figure 29:
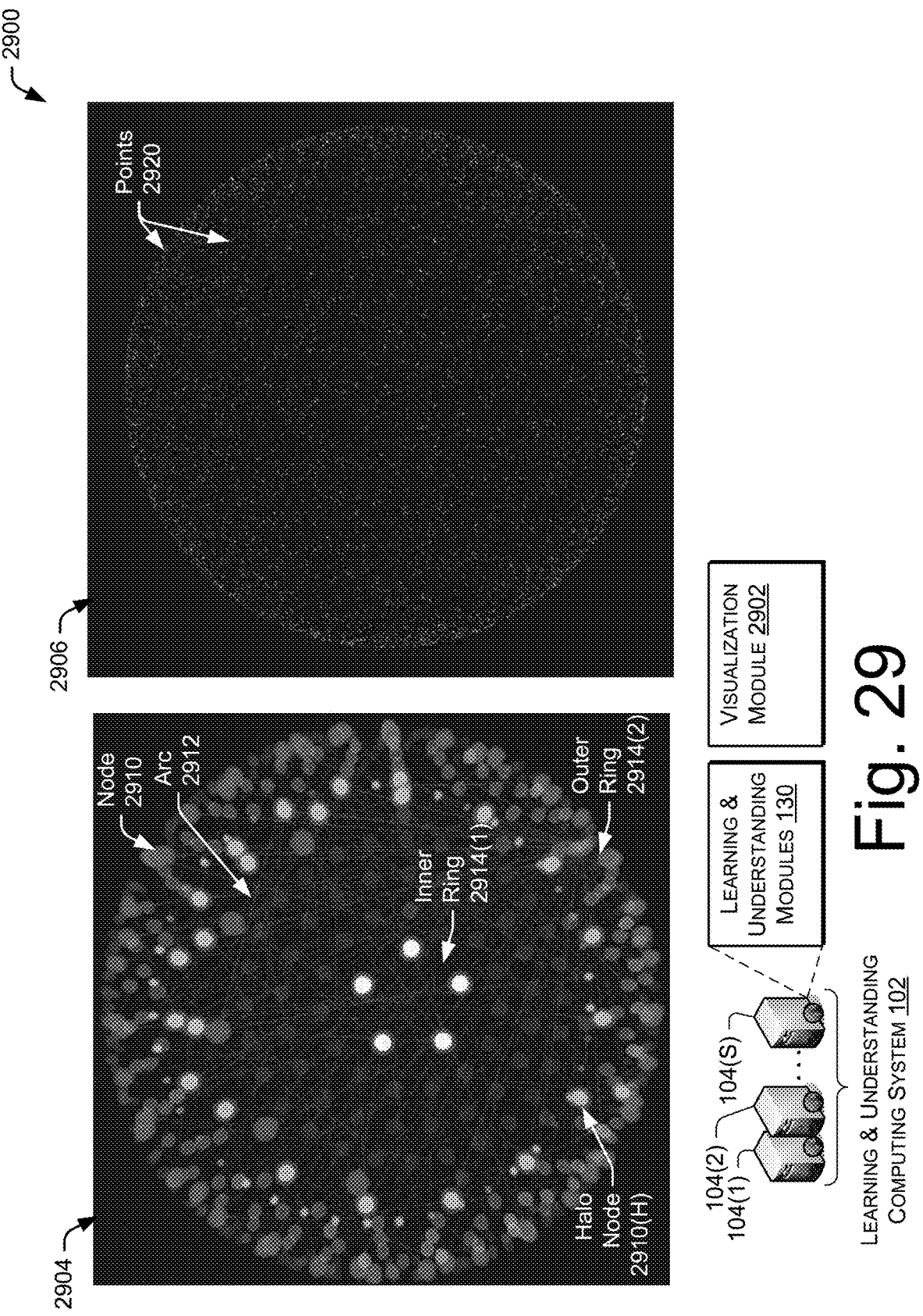
FIG. 29 shows an example set of visualizations that illustrates the dynamic process of incrementally formulating a network of probabilistic beliefs and iteratively refining its global logical consistency.

FIG. 29 shows one example set of visualizations 2900 that illustrates the dynamic process of incrementally formulating a network of probabilistic beliefs and iteratively refining its global logical consistency. In one implementation, the learning and understanding computing system 102 includes a visualization module 2902 that generates visualizations of the system's understanding. These visualizations include a first or story level visualization 2904 that illustrates a network of beliefs about a single story and a story galaxy visualization 2906 that illustrates relationships amongst many constellations of stories. The visualization module 2902 enables user controls, such as a zoom control that allows the user to zoom in to a single story view 2904 (or even nodes therein) or zoom out from the single story view 2904 to the galaxy visualization 2906, as well as any range of views in between.

In the illustrated example, the single story visualization 2904 consists of layers or rings of nodes 2910 and arcs 2912. Each node 2910 represents a logical hypothesis about what belief is true. Each arc 2912 extends between a pair of nodes and conveys a relationship indicating that one belief supports the truth of another with some probability. The nodes are arranged in layers or rings 2914 to represent different classes of beliefs. For example, beliefs about the existence of specific sentences in a narrative might be one ring. Beliefs about the possible meanings of words or phrases might be the next ring. An inner ring 2914(1) and an outer ring 2914(2) are called out in FIG. 29 to show the existence of such rings. The nodes 2910, arcs 2912, and rings 2914 may be further color coded to differentiate them throughout the visualizations.

In another implementation, each layer or ring has one or more subrings or substructures to allow for the illustration of an arbitrary number of beliefs (nodes) and supports (arcs) in that layer or ring. In one implementation, the nodes and their attached arcs in a layer or ring animate to illustrate that as new data is considered by the underlying driver or algorithm in one of the modules 130, new hypothetical beliefs are added to the network ring. For example, rings may spin, split, collapse and/or vary their node density to allow for more hypotheses.

A change in the appearance of a node 2910 or arc 2912 may represent, for example, the confidence with which it is believed. For example, the opacity of a node or edge might be a function of the system's confidence that the corresponding belief is true. Beliefs considered absolutely true would be completely opaque whereas beliefs considered absolutely false would be completely invisible. Beliefs considered somewhere between those two extremes would have a corresponding transparency.

A change of appearance may further illustrate the system's inference process. For example, a halo highlight around a node, such as node 2910(H), can indicate its being considered true to explore what other beliefs are implicated and a similar highlight on an arc can illustrate the implication itself.

In the illustrated example, the galaxy visualization 2906 contains a plurality of points 2920, where each point represents a zoomed-out view of a story visualization 2904 for a particular language problem. Through the animation of zooming out to the galaxy view 2906 and then back in to the single story view 2904, one can see and learn how the system is pursuing the understanding of many language problems at once and that the visualization can change its focus.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
    forming, by a computing system, a semantic representation of a natural language story, the semantic representation using knowledge stored in a current world model that expresses beliefs about how natural language is understood, wherein the semantic representation includes multiple generative semantic primitive (GSP) structures, the multiple GSP structures include one or more predicates and one or more roles that indicate one or more beliefs regarding an understanding of the natural language story, wherein the current world model is developed over time through processing of multiple natural language stories;
    generating, by the computing system, one or more questions to evaluate the semantic representation;
    maintaining a dependency structure for linear dialogs to identify questions that are independent from one another;
    submitting, from the computing system to a separate user computing device, the one or more questions for presentation to a human user;
    receiving, by the computing system from the separate user computing device, one or more responses indicative of input from the human user when answering the one or more questions;
    iterating through the dependency structure based at least in part on the one or more responses to identify a set of next questions and branch conditions indicating that at least two next questions of the set of next questions are independent of one another;
    learning, by the computing system, at least one new GSP structure that indicates a new belief regarding the understanding of the natural language story, the new belief having an above threshold probability of being included in the multiple GSP structures that is associated with a theme or a context of the natural language story based at least in part on the one or more responses received from the separate user computing device; and
    revising, by the computing system, the semantic representation of the natural language story based at least in part on the one or more responses received from the separate user computing device and the at least one new GSP structure.

2. The computer-implemented method of claim 1, wherein forming the semantic representation comprises:
    performing a syntactic analysis of the natural language story to produce one or more linguistic analysis results; and
    creating multiple semantic structures to represent the natural language story in part by using the one or more linguistic analysis results and knowledge induced from large language corpora, wherein creating the multiple semantic structures includes creating the multiple GSP structures by defining the one or more predicates and the one or more roles for the multiple GSP structures.

3. The computer-implemented method of claim 2, wherein the one or more questions pertain to the one or more linguistic analysis results.

4. The computer-implemented method of claim 2, wherein the one or more questions pertain to an ability of the multiple semantic structures to represent the natural language story.

5. The computer-implemented method of claim 1, wherein generating the one or more questions comprises:
building the dependency structure to provide a dialog context for interpreting and answering a question, the dependency structure being derived from data in the semantic representation; and
forming the one or more questions in a natural language.

6. The computer-implemented method of claim 5, wherein the dependency structure comprises a tree-type data structure with root nodes and branches to children nodes that can be logically traversed to ask opening and follow-on questions.

7. The computer-implemented method of claim 1, wherein submitting the one or more questions comprises sending the one or more questions in a format that can be presented visually on the separate user computing device in a graphical user interface.

8. The computer-implemented method of claim 7, wherein the graphical user interface comprises a first area having a dialog interface to represent a dialog between the human user and the computing system and a second area adjacent to the first area, the second area having a story aid interface that depicts a portion of the natural language story and an associated understanding of the portion.

9. The computer-implemented method of claim 1, further comprising updating the current world model with information pertaining to the semantic representation as revised.

10. A computer-implemented method, comprising:
processing, over time by a computing system, multiple natural language stories to produce a current world model that includes a collection of generative semantic primitive (GSP) structures to express beliefs about how natural language is understood, wherein a GSP structure of the collection of GSP structures includes a predicate and one or more roles, wherein the collection of GSP structures is associated with a theme or a context of the multiple natural language stories;
maintaining the current world model in a datastore of the computing system;
receiving, by the computing system, a natural language story;
maintaining a dependency structure for linear dialogs to identify questions that are independent from one another;
engaging in a dialog session with a human user to receive input from the human user for use by the computing system to evaluate an extent to which the beliefs of the current world model produce an understanding of the natural language story, wherein engaging in the dialog session includes iterating through the dependency structure based at least in part on the input to identify a set of next questions; and
revising, by the computing system, the current world model by adding at least one new GSP structure with at least one of a new predicate or one or more new roles based at least in part on the input from the human user and the at least one new GSP structure having an above threshold probability of being included with a particular collection of GSP structures that is associated with a particular theme or a particular context of the natural language story.

11. The computer-implemented method of claim 10, wherein engaging in a dialog session comprises:
generating, by the computing system, one or more questions to evaluate the beliefs;
submitting, from the computing system to a separate user computing device, the one or more questions for presentation to the human user; and
receiving, by the computing system from the separate user computing device, one or more responses indicative of the input from the human user when answering the one or more questions.

12. The computer-implemented method of claim 11, wherein generating the one or more questions comprises:
building the dependency structure to provide a dialog context for interpreting and answering a question, the dependency structure being derived from data pertaining to the beliefs; and
forming the one or more questions in a natural language.

13. The computer-implemented method of claim 12, wherein the dependency structure comprises a tree-type data structure with root nodes and branches to children nodes that can be logically traversed to ask opening and follow-on questions.

14. A computing system, comprising:
a datastore containing a current world model that expresses beliefs about how natural language is understood;
one or more processors to access the current world model maintained in the datastore; and
memory coupled to the one or more processors, the memory storing computer executable instructions that, when executed by the one or more processors, perform acts comprising:
processing multiple natural language stories over time, the processing including performing syntactic analysis on the multiple natural language stories and subsequently inferring semantic structures as representations of the multiple natural language stories, in part by using information maintained in the current world model and results from the syntactic analysis, wherein inferring the semantic structures includes creating multiple generative semantic primitive (GSP) structures by defining a predicate and one or more roles for at least one GSP structure of the multiple GSP structures, wherein the processing includes:
processing, over a first time period, a first story of the multiple natural language stories having a first reading comprehension level;
inferring one or more first semantic structures as representations of the first story;
processing, over a second time period after the first time period, a second story of the multiple natural language stories having a second reading comprehension level that is more difficult than the first reading comprehension level; and
inferring at least one second semantic structure as a representation of the second story based at least in part on expanding at least one of the one or more first semantic structures to include a new semantic structure;
maintaining a dependency structure for linear dialogs to identify questions that are independent from one another;
conducting dialog sessions with multiple different human users to aggregate multiple responses from the multiple different human users to evaluate the semantic structures as understandings of the multiple natural language stories, wherein evaluating the semantic structures includes at least one of adding a new GSP structure or redefining at least one of the predicate or the one or more roles for an existing GSP structure; and modifying the current world model in the datastore over time to include the semantic structures inferred from the multiple natural language stories and evaluated by the multiple different human users, the semantic structures including the one or more first semantic structures inferred during or after the first time period and the at least one second semantic structure inferred during or after the second time period.

15. The computing system of claim 14, wherein conducting the dialog sessions comprises:
generating, by the computing system, multiple questions to evaluate the semantic structures;
submitting, from the computing system to separate multiple user computing devices, the multiple questions for presentation to the multiple different human users;
receiving, by the computing system from the separate multiple user computing devices, multiple responses indicative of input from the multiple different human users when answering the multiple questions; and
iterating through the dependency structure based at least in part on the multiple responses to identify a set of next questions and branch conditions indicating that at least two next questions of the set of next questions are independent of one another.

16. The computing system of claim 15, wherein generating the multiple questions comprises:
building the dependency structure to provide a dialog context for interpreting and answering a question, the dependency structure being derived from data pertaining to the beliefs; and
forming the multiple questions in a natural language.

17. The computing system of claim 16, wherein the dependency structure comprises a tree-type data structure with root nodes and branches to children nodes that can be logically traversed to ask opening and follow-on questions.

18. A computing system, comprising:
one or more processors; and
memory coupled to the one or more processors, the memory storing computer-executable modules comprising:
a knowledge integration engine to form semantic structures that provide a semantic representation of a natural language story, wherein the semantic structures include generative semantic primitive (GSP) structures defined with predicates and roles to express a first understanding of the natural language story; and
a dialog engine to facilitate a dialog session with a human user to evaluate an extent to which the semantic structures represent the natural language story by generating and submitting one or more questions to a separate user computing device used by the human user and collecting one or more responses from the separate user computing device indicative of input from the human user, wherein the dialog engine includes a dialog dispatcher to break up the dialog session into sub-dialog sessions and maintains a dependency structure for linear dialogs to identify questions that are independent from one another, wherein the dialog dispatcher includes a structure crawler to iterate through the dependency structure based on the one or more responses to identify a set of next questions; and
wherein the knowledge integration engine updates the semantic structures to include at least one of adding a new GSP structure or redefining an existing GSP structure to express a second understanding of the natural language story based in part on the one or more responses, wherein adding the new GSP structure or redefining the existing GSP structure increases the extent to which the semantic structures represent the natural language story.

19. The computing system of claim 18, wherein the knowledge integration engine is configured to form the semantic structures in part by using one or more linguistic analysis results to form a syntactic analysis of the natural language story and knowledge induced from large language corpora.

20. The computing system of claim 18, wherein the dialog engine submits the one or more questions in a format that can be presented visually on the separate user computing device in a graphical user interface.

21. The computing system of claim 18, wherein the dialog engine generates the one or more questions by building the dependency structure to provide a dialog context for interpreting and answering a question, the dependency structure being derived from data in the semantic representation.

* * * * *

UNITED STATES PATENT AND TRADEMARK OFFICE
CERTIFICATE OF CORRECTION

PATENT NO. : 10,621,285 B2
APPLICATION NO. : 15/464076
DATED : April 14, 2020
INVENTOR(S) : David Ferrucci et al.

Page 1 of 1

It is certified that error appears in the above-identified patent and that said Letters Patent is hereby corrected as shown below:

On the Title Page

Item (71) Applicant:, change:
"Westport,"
To:
--Wilton,--.

Item (72) Inventors:, change the following:
"David Ferrucci, Westport, CT (US);
Mike Barborak, Westport, CT (US);
David Buchanan, Westport, CT (US);
Greg Burnham, Westport, CT (US);
Jennifer Chu-Carroll, Westport, CT (US);
Aditya Kalyanpur, Westport, CT (US);
Adam Lally, Westport, CT (US);
Stefano Pacifico, Westport, CT (US);
Chang Wang, Westport, CT (US)."
To:
--David Ferrucci, Wilton, CT (US);
Mike Barborak, Fairfield, CT (US);
David Buchanan, Pleasantville, NY (US);
Greg Burnham, Brooklyn, NY (US);
Jennifer Chu-Carroll, Dobbs Ferry, NY (US);
Aditya Kalyanpur, Fort Lee, NJ (US);
Adam Lally, Stamford, CT (US);
Stefano Pacifico, New York, NY (US);
Chang Wang, White Plains, NY (US).--.

Signed and Sealed this
Eleventh Day of August, 2020

Andrei Iancu
*Director of the United States Patent and Trademark Office*